Dec. 23, 1958   R. L. ABBRECHT ET AL   2,865,568
RECORD-CONTROLLED COMPUTING RECORDING SYSTEM
Filed Dec. 7, 1955                     26 Sheets-Sheet 1

INVENTORS R. L. ABBRECHT
E. VROOM
BY
ATTORNEY

INVENTORS R. L. ABBRECHT
E. VROOM
BY
ATTORNEY

INVENTORS R. L. ABBRECHT
E. VROOM
BY
ATTORNEY

Dec. 23, 1958  R. L. ABBRECHT ET AL  2,865,568
RECORD-CONTROLLED COMPUTING RECORDING SYSTEM
Filed Dec. 7, 1955  26 Sheets-Sheet 7

INVENTORS R. L. ABBRECHT
E. VROOM
BY
ATTORNEY

Dec. 23, 1958   R. L. ABBRECHT ET AL   2,865,568
RECORD-CONTROLLED COMPUTING RECORDING SYSTEM
Filed Dec. 7, 1955   26 Sheets-Sheet 10

INVENTORS R. L. ABBRECHT
E. VROOM
BY
ATTORNEY

INVENTORS R. L. ABBRECHT
E. VROOM
BY
ATTORNEY

Dec. 23, 1958   R. L. ABBRECHT ET AL   2,865,568
RECORD-CONTROLLED COMPUTING RECORDING SYSTEM
Filed Dec. 7, 1955   26 Sheets-Sheet 18

INVENTORS R. L. ABBRECHT
E. VROOM
BY
ATTORNEY

Dec. 23, 1958  R. L. ABBRECHT ET AL  2,865,568
RECORD-CONTROLLED COMPUTING RECORDING SYSTEM
Filed Dec. 7, 1955  26 Sheets-Sheet 21

INVENTORS  R.L. ABBRECHT
           E. VROOM
BY

ATTORNEY

Dec. 23, 1958   R. L. ABBRECHT ET AL   2,865,568
RECORD-CONTROLLED COMPUTING RECORDING SYSTEM
Filed Dec. 7, 1955   26 Sheets-Sheet 22

INVENTORS R.L. ABBRECHT
E. VROOM
BY
ATTORNEY

Dec. 23, 1958    R. L. ABBRECHT ET AL    2,865,568
RECORD-CONTROLLED COMPUTING RECORDING SYSTEM
Filed Dec. 7, 1955    26 Sheets-Sheet 23

INVENTORS R.L. ABBRECHT
              E. VROOM
BY
                    ATTORNEY

Dec. 23, 1958  R. L. ABBRECHT ET AL  2,865,568
RECORD-CONTROLLED COMPUTING RECORDING SYSTEM
Filed Dec. 7, 1955  26 Sheets-Sheet 24

INVENTORS R. L. ABBRECHT
E. VROOM
BY
ATTORNEY

Dec. 23, 1958   R. L. ABBRECHT ET AL   2,865,568
RECORD-CONTROLLED COMPUTING RECORDING SYSTEM
Filed Dec. 7, 1955   26 Sheets-Sheet 25

FOUR LINE DETAILED INITIAL ENTRY (TOLL CALL)

TWO LINE MESSAGE UNIT INITIAL ENTRY (LOCAL CALL)

ANSWER TIME ENTRY (ALL CALLS)

DISCONNECT TIME ENTRY (ALL CALLS)

INVENTORS R. L. ABBRECHT
E. VROOM
BY
ATTORNEY

Dec. 23, 1958  R. L. ABBRECHT ET AL  2,865,568
RECORD-CONTROLLED COMPUTING RECORDING SYSTEM
Filed Dec. 7, 1955  26 Sheets-Sheet 26

INVENTORS R. L. ABBRECHT
E. VROOM
BY
ATTORNEY

United States Patent Office 2,865,568
Patented Dec. 23, 1958

2,865,568

RECORD-CONTROLLED COMPUTING
RECORDING SYSTEM

Richard L. Abbrecht, Maspeth, N. Y., and Edward Vroom, Brooklyn, Conn., assignors to Bell Telephone Laboratories, Incorporated, New York, N. Y., a corporation of New York Application December 7, 1955, Serial No. 551,489

29 Claims. (Cl. 235—61.8)

This invention relates to computing devices, and more particularly to an assembler-computer which computes the total time of customer uses of a plurality of facilities from records containing data appertaining to the time each use began, the time each use terminated, and the identification of each customer who used one or more of said facilities. These time usages are then assembled on records for groups of customers together with the identification of each customer, which records may then be utilized by well-known devices to compute charges for the uses incurred.

In its exemplary embodiment, the invention is disclosed herein in respect to an automatic message telephone accounting system, wherein records of telephone calls are automatically recorded at the central office and are later processed by a series of machines in an accounting center which compute and print subscribers' bills in accordance with the information on the records.

More particularly this invention relates to an automatic telephone message accounting system in which three entries are perforated on a tape in response to the completion of a call over a dial telephone system. An initial entry is perforated after the calling subscriber has dialed the called number. An answer entry is perforated at the time the called party picks up his receiver to answer the telephone. A disconnect entry is perforated at the termination of the call.

This invention further relates to an assembler-computer which, in processing the records produced in response to the completion of each call made over a telephone dial system, assembles and sorts the information on said records into a logical order and computes the chargeable time for each call. This computed information is then sorted and distributed to various output records in accordance with a predetermined plan.

An object of the invention is to provide means for facilitating the preparation of customer bills on automatic accounting machines.

Another object of the invention is to provide a single machine which will process the records produced in response to each use by a customer of a telephone switching system and which will also compute therefrom the chargeable time pertaining to each use.

Another object of the invention is the provision of an assembler-computer in an automatic message accounting system which processes the output tapes produced by recording equipment in the central office, and while performing this processing, computes the chargeable time of each telephone call placed from said office by any one of a plurality of subscribers.

Another object of the invention is the provision of means whereby the assembler-computer perforates information pertaining to each call, including the computed chargeable time, on to a selected one of a plurality of output tapes in accordance with a preselected plan of distribution.

A feature of the invention is the provision of an elapsed time computer which, in determining the chargeable time for a call, takes the answer time of the call from the tape entry currently being read, and subtracts it from the disconnect time of the same call, as obtained from an entry previously read and stored in a register circuit. The register circuit is then released and the computed chargeable time is entered into the same register for subsequent use.

Another feature of the invention is the provision of a multipurpose storage register which receives and stores the disconnect time of a telephone call, which, when the answer entry is read transmits this stored disconnect time to a chargeable time computer and releases, which receives and stores the computed chargeable time from the computer, and which transmits the stored computed chargeable time to an output perforator upon the reading of an initial entry on the tape for the same call.

Another feature of the invention is the entering of the answer time of a call having a certain index number into a computer and, simultaneously, entering the disconnect time of the same call, as manifested by the same index number, from a register into the computer which then performs a subtraction operation and enters the chargeable time of the call into the same register in which the disconnect time was previously stored.

Another feature is the provision of a computer which first computes the elapsed conversation time of a call as determined by the simultaneous application thereto of information pertaining to the answer and disconnect times for said call, and secondly, subtracts a fixed amount of time from the computed elapsed conversation time of each call in order to obtain a chargeable conversation time for which the customer will be billed. The fixed allowance of time made in favor of the subscriber for each call is for the purpose of offsetting any delay caused by the recording equipment at the central office in perforating the answer and disconnect time of each call.

Another feature of the invention is the selection of a register having a certain index number upon the reading of an initial entry having the same index number so that the register enters the computed chargeable time stored therein into an output tape perforator which then perforates said chargeable time on to a tape.

The present invention may be more fully understood from the following detailed description of a preferred exemplary embodiment thereof when read with reference to the accompanying drawings in which.

Figure 11:
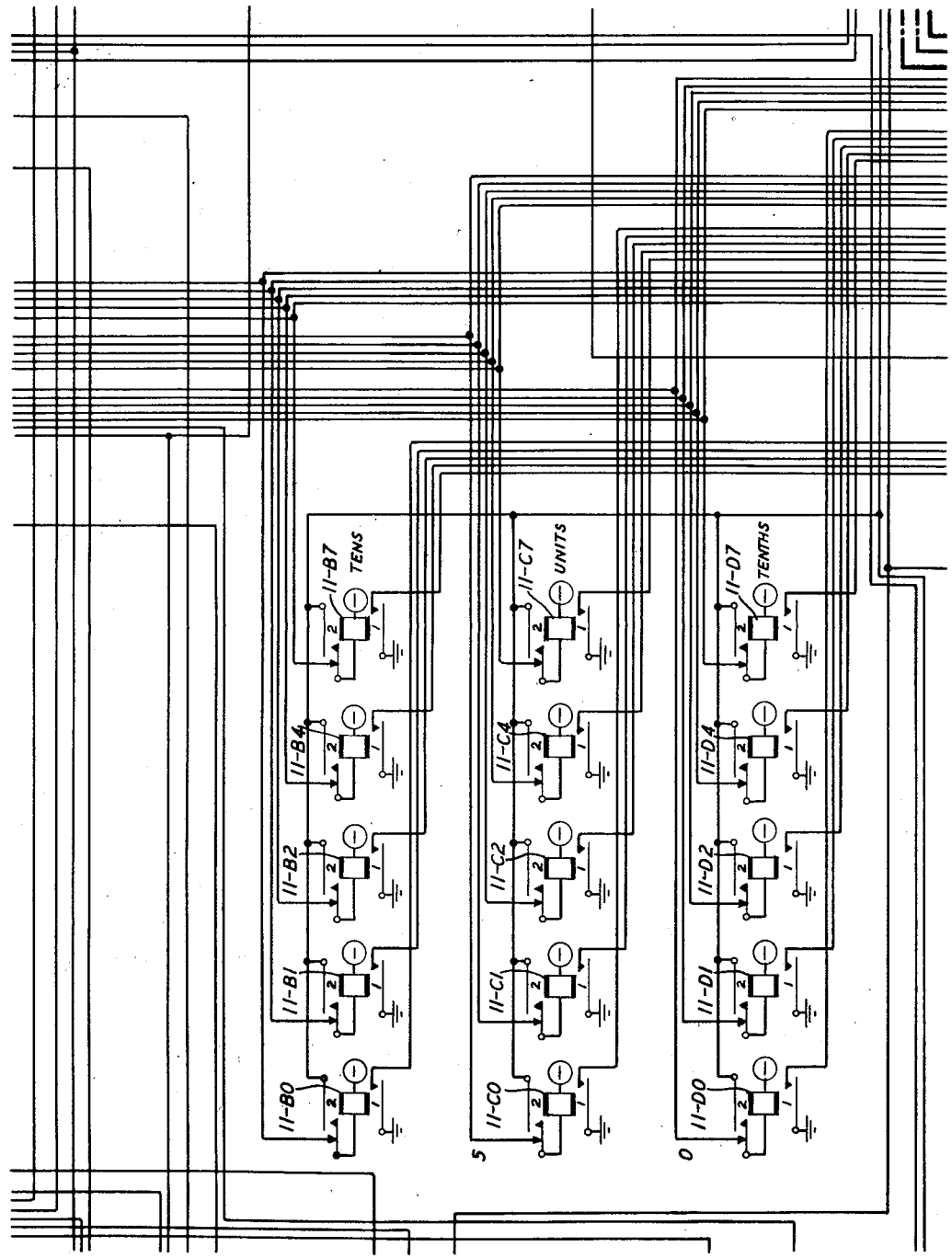
Figure 12:
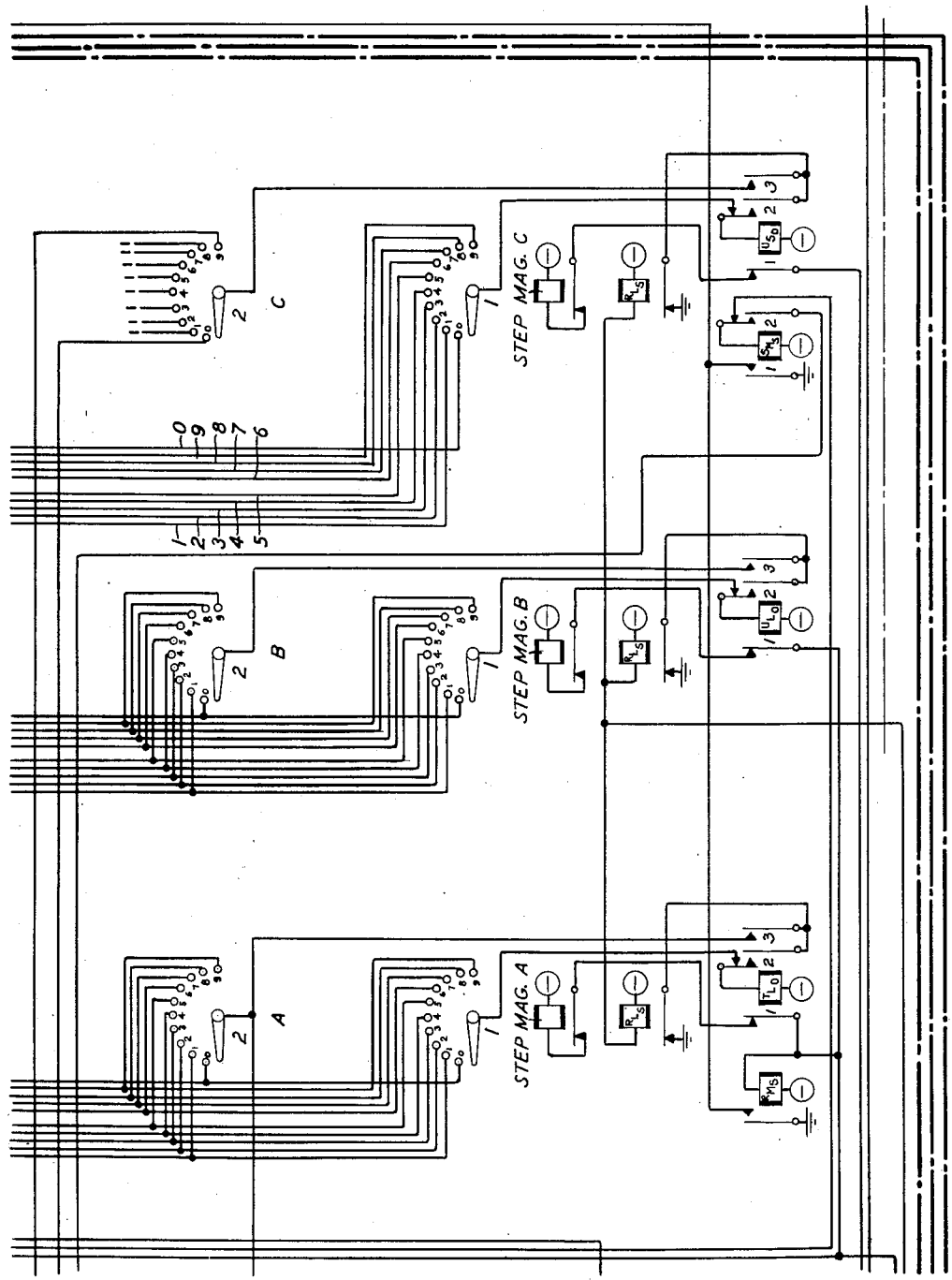
Figure 13:
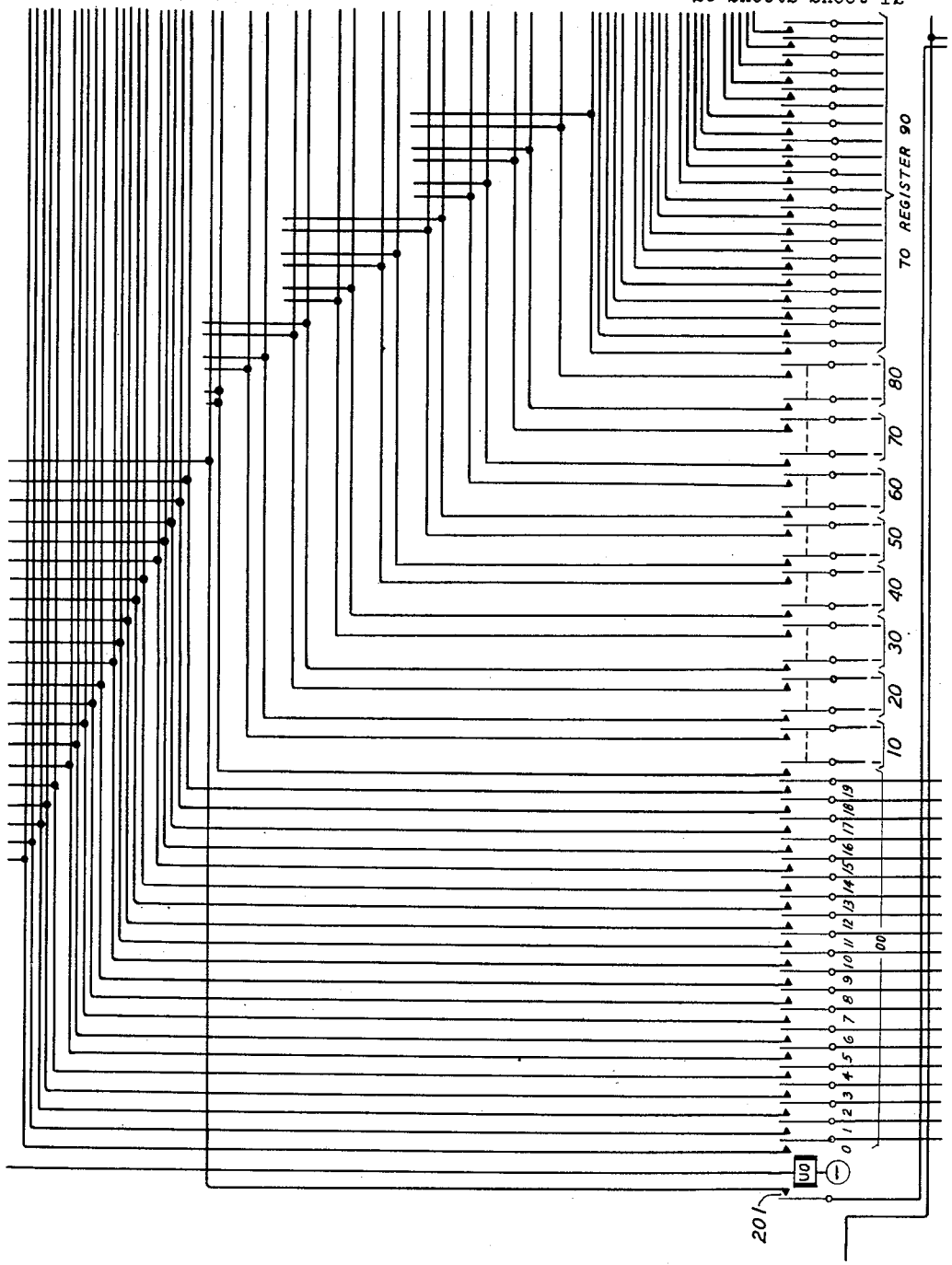
Figure 14:
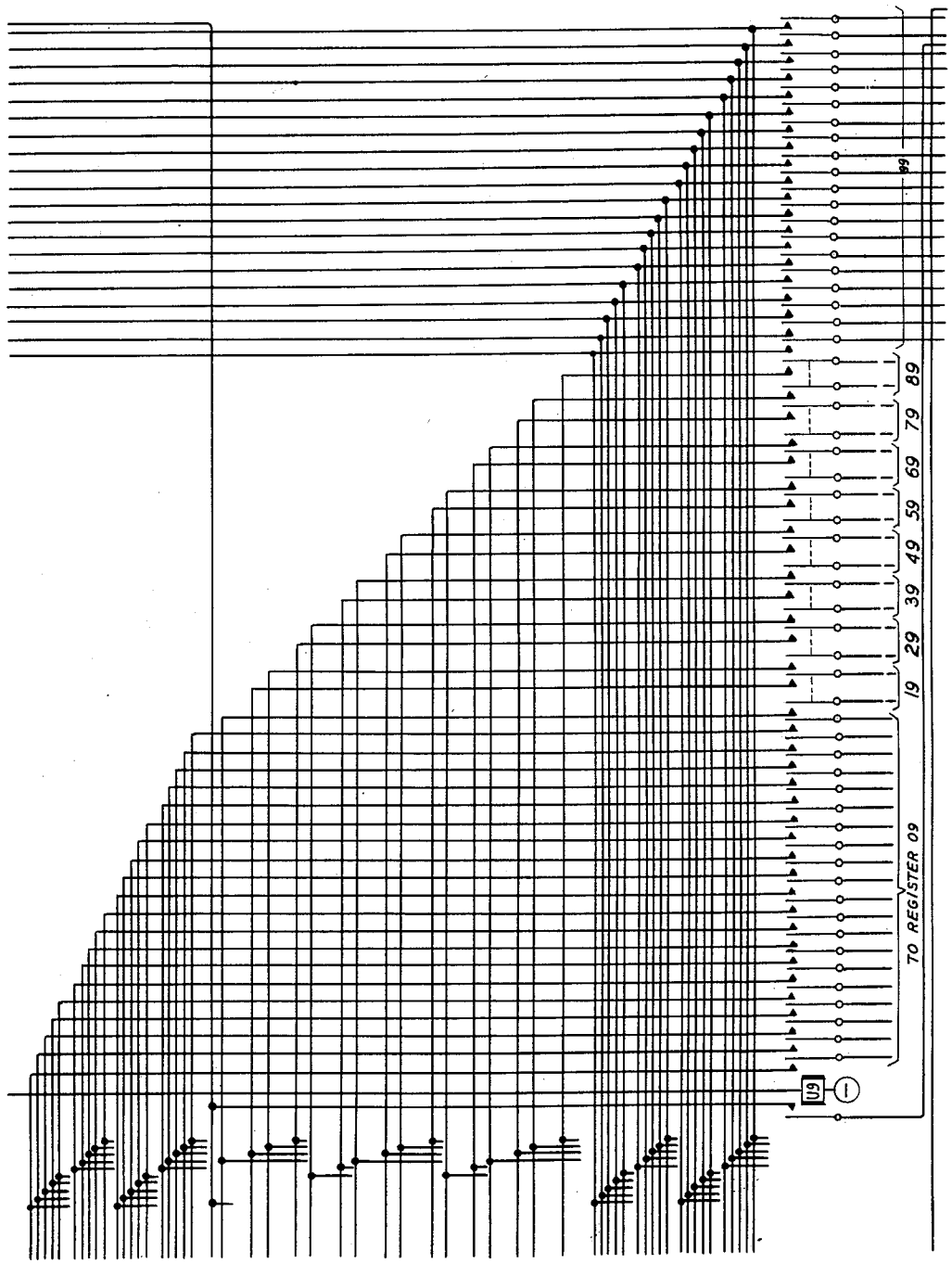
Figure 15:
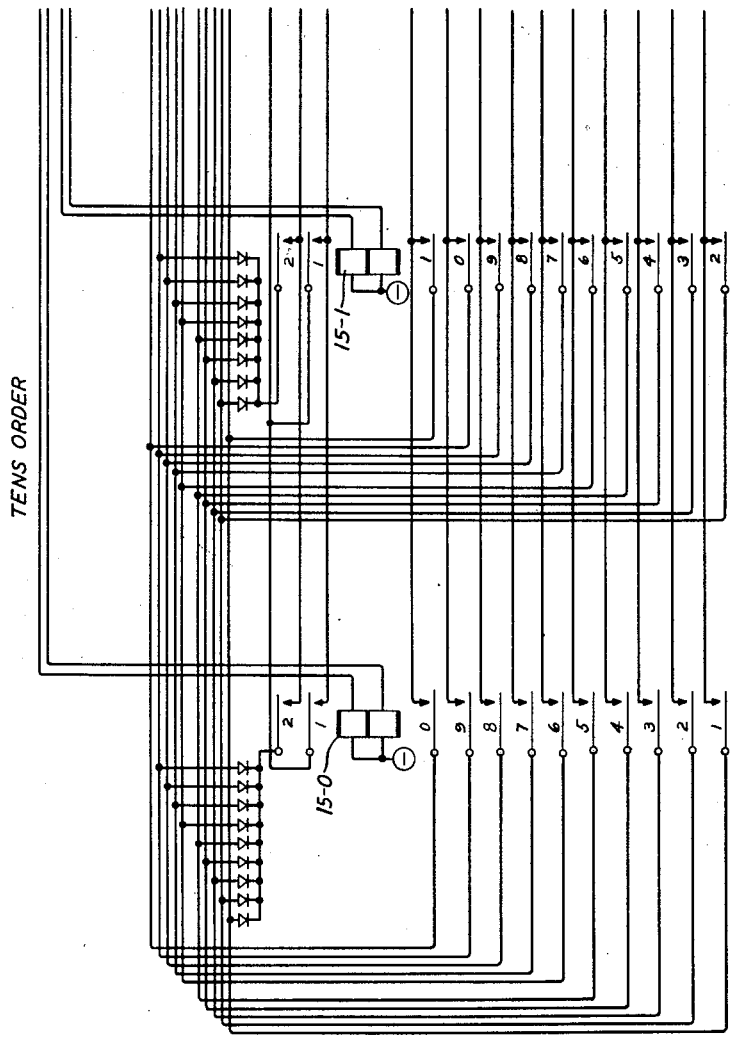
Figure 16:
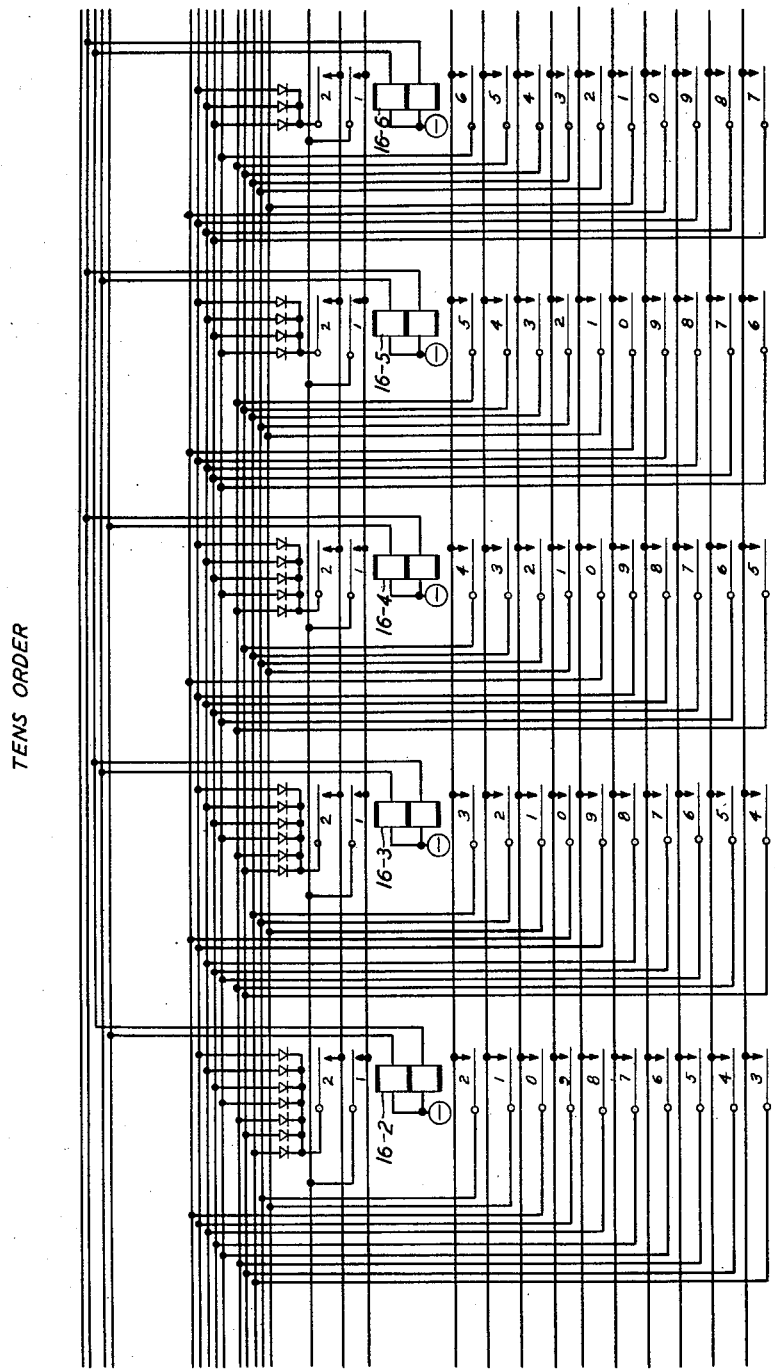
Figure 17:
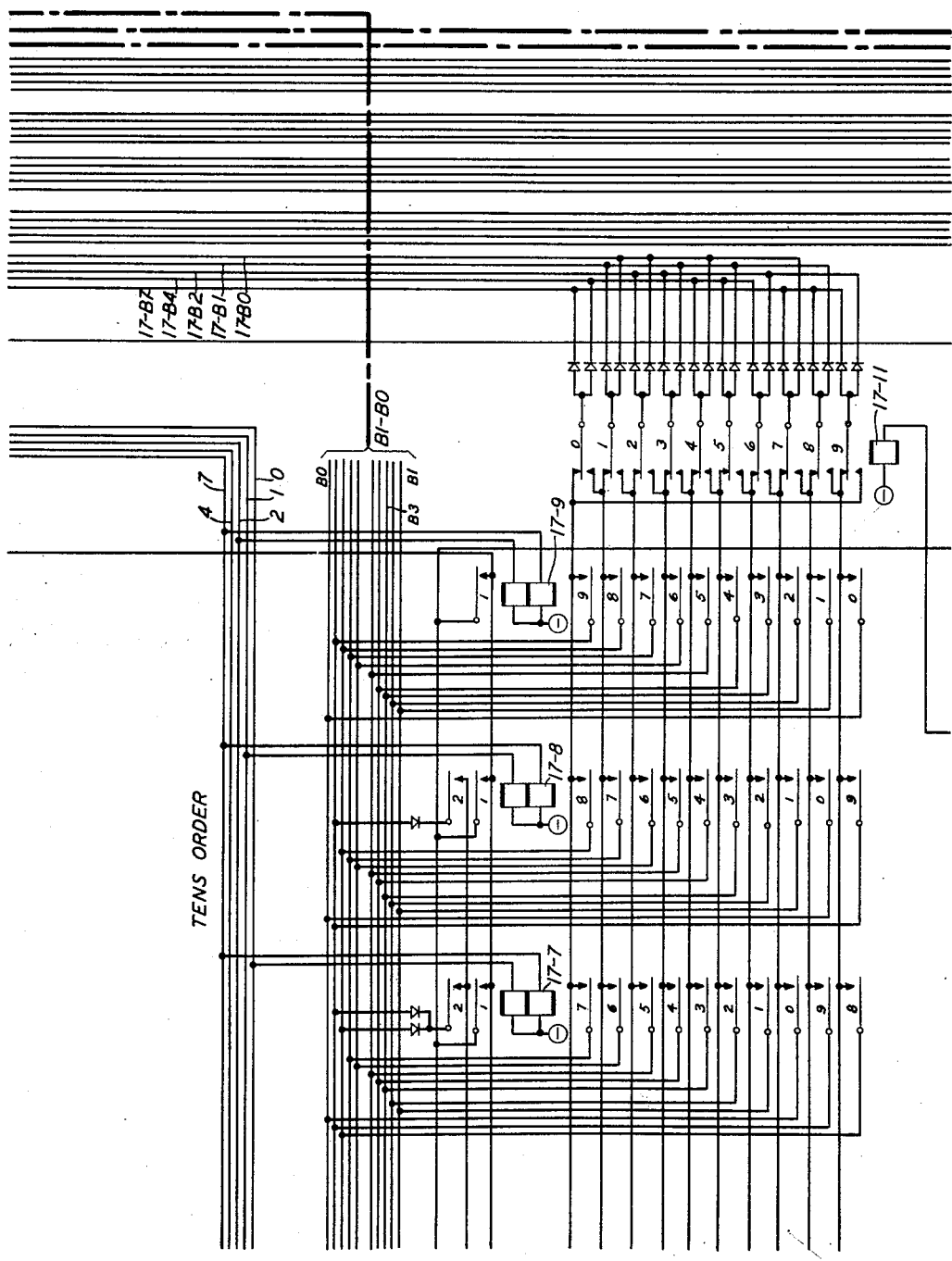
Figure 18:
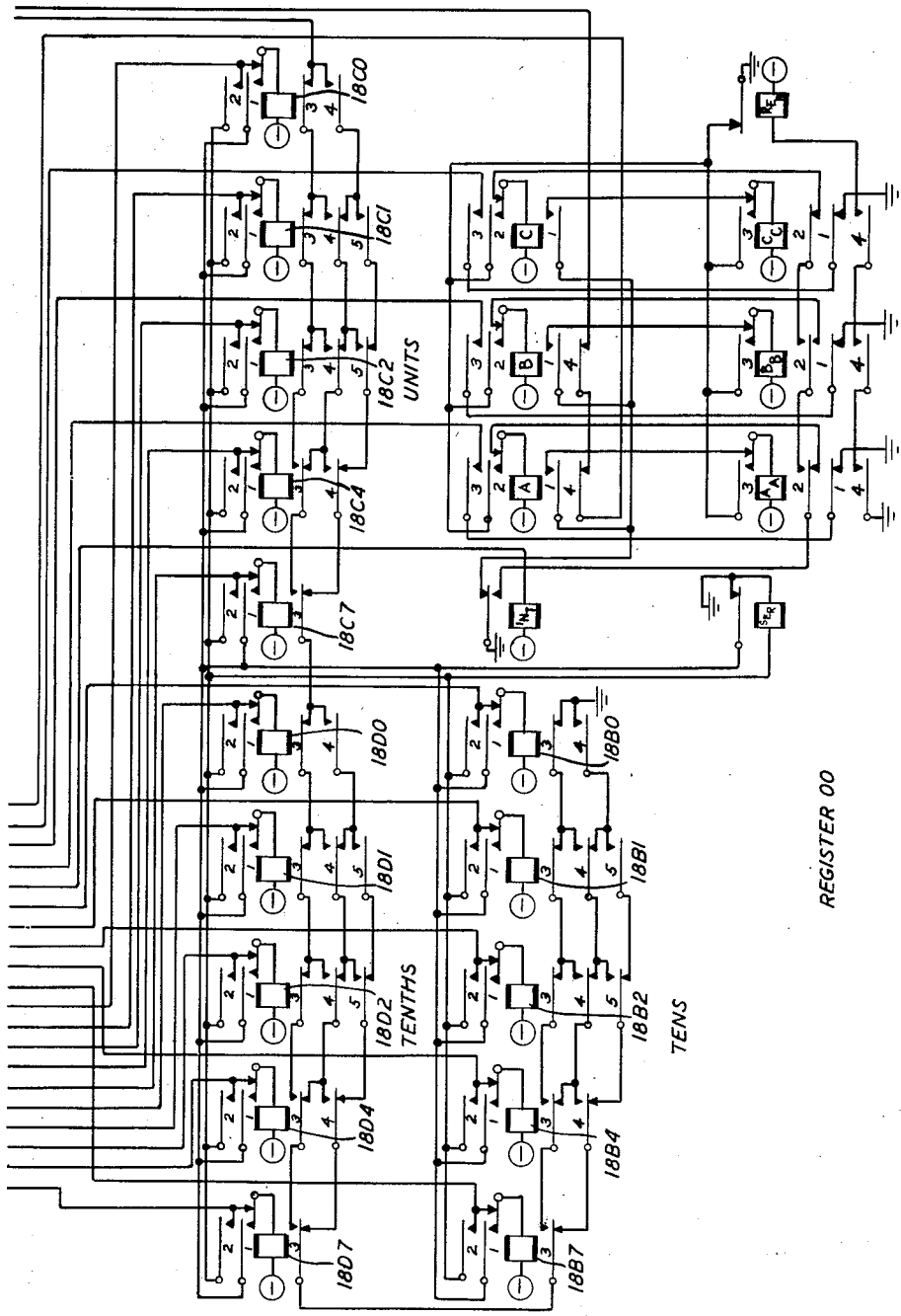
Figure 19:
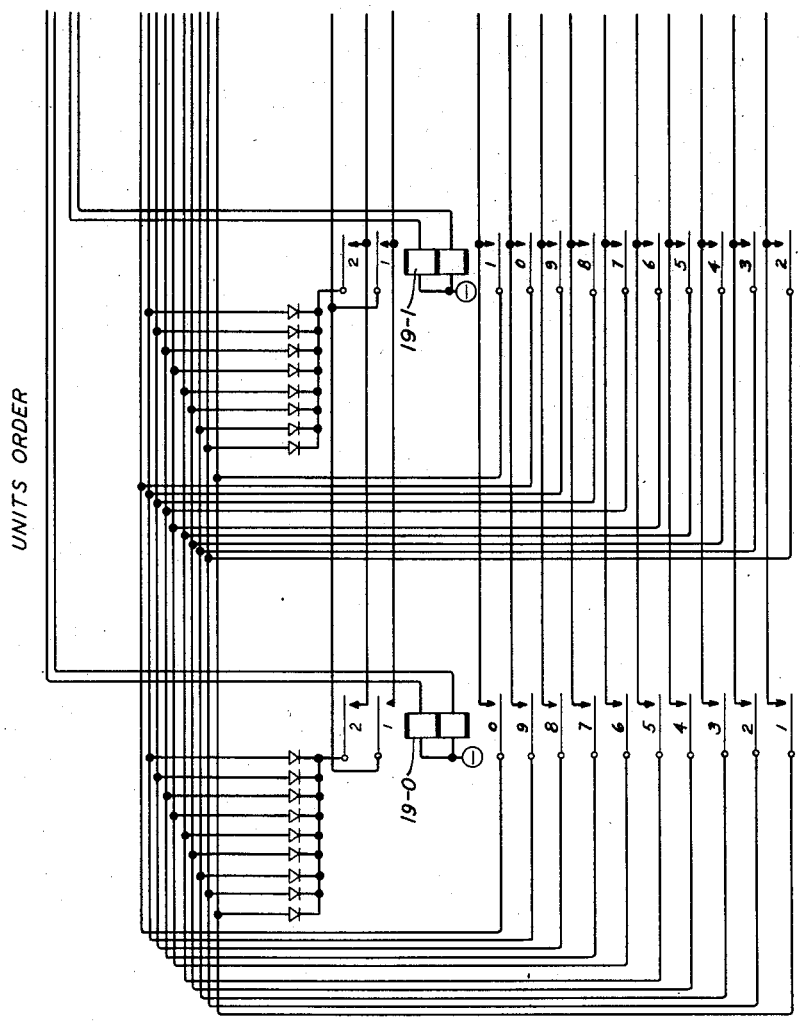
Figure 20:
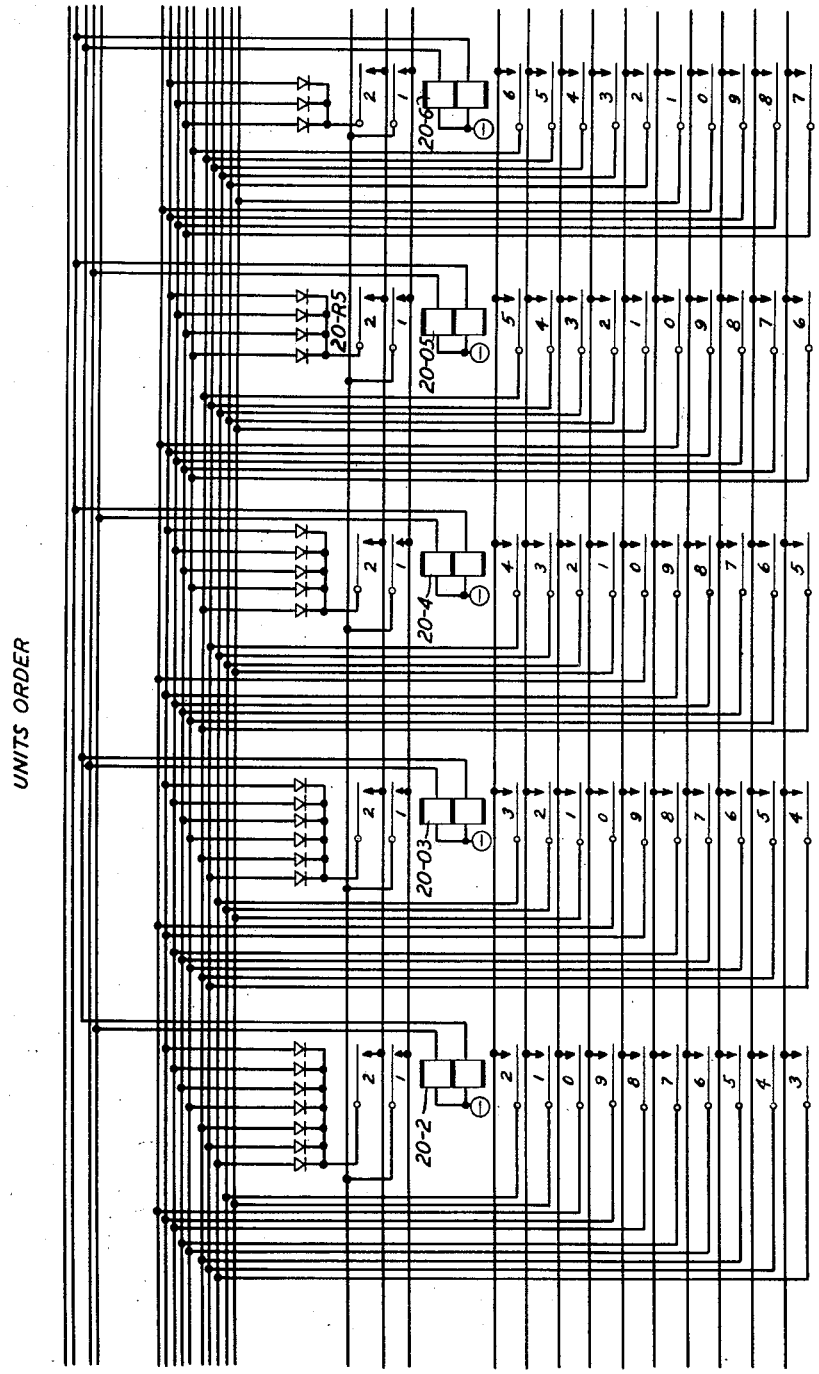
Figure 25:
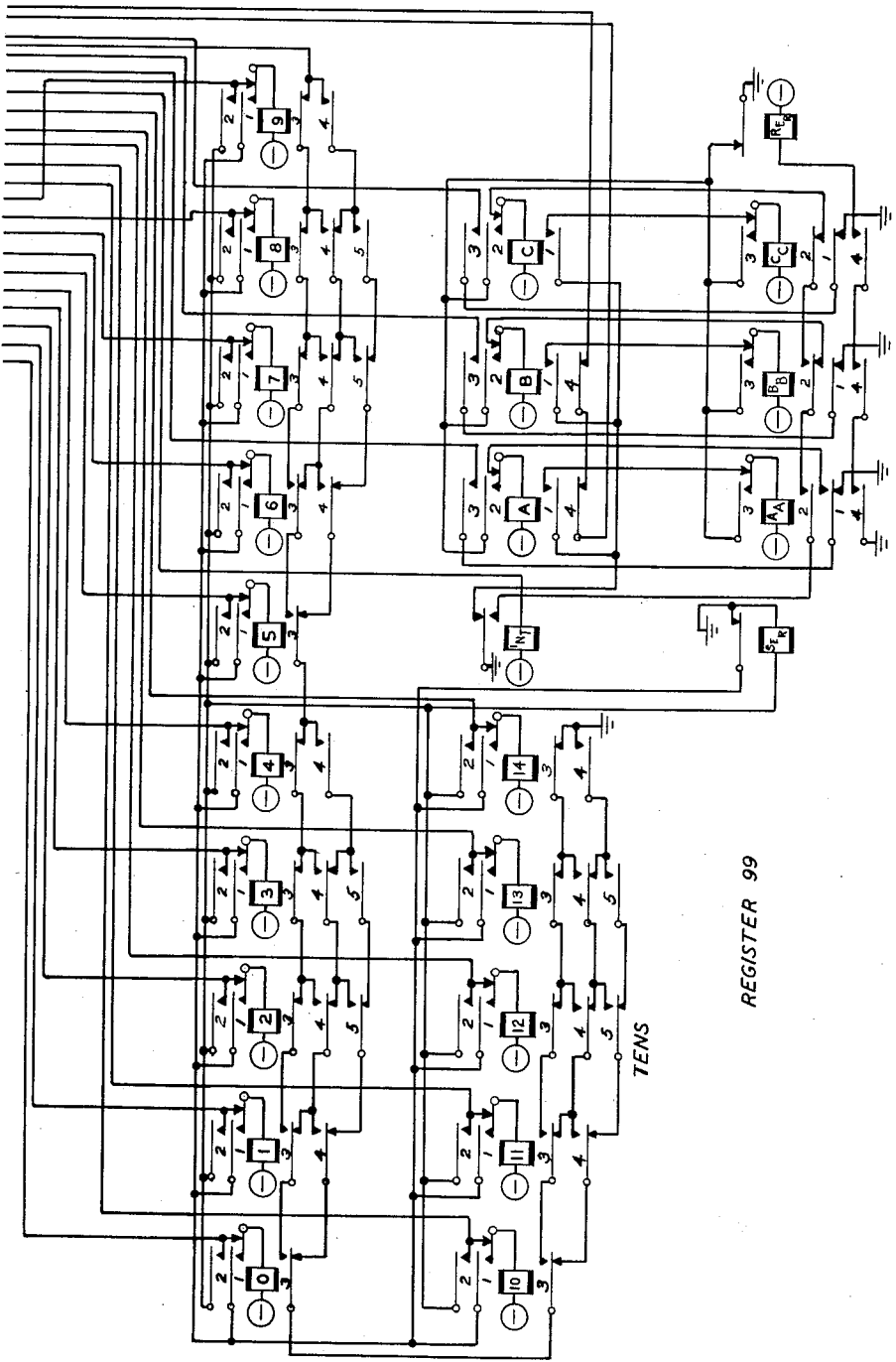
Figure 26A:
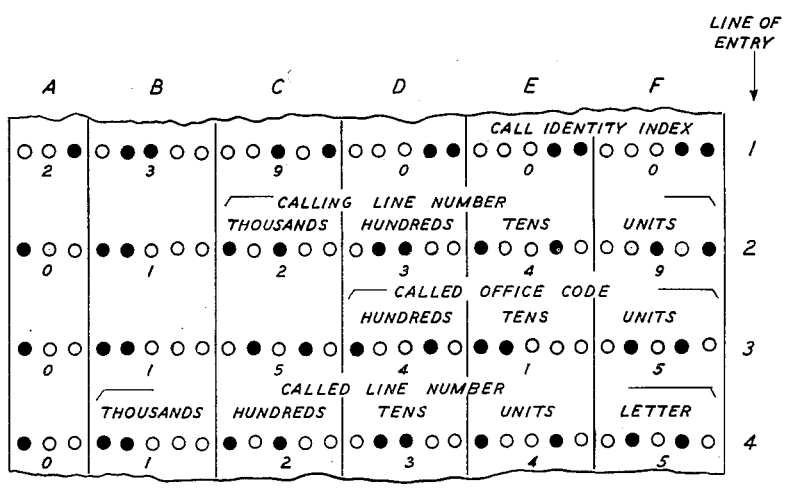
Figure 27:
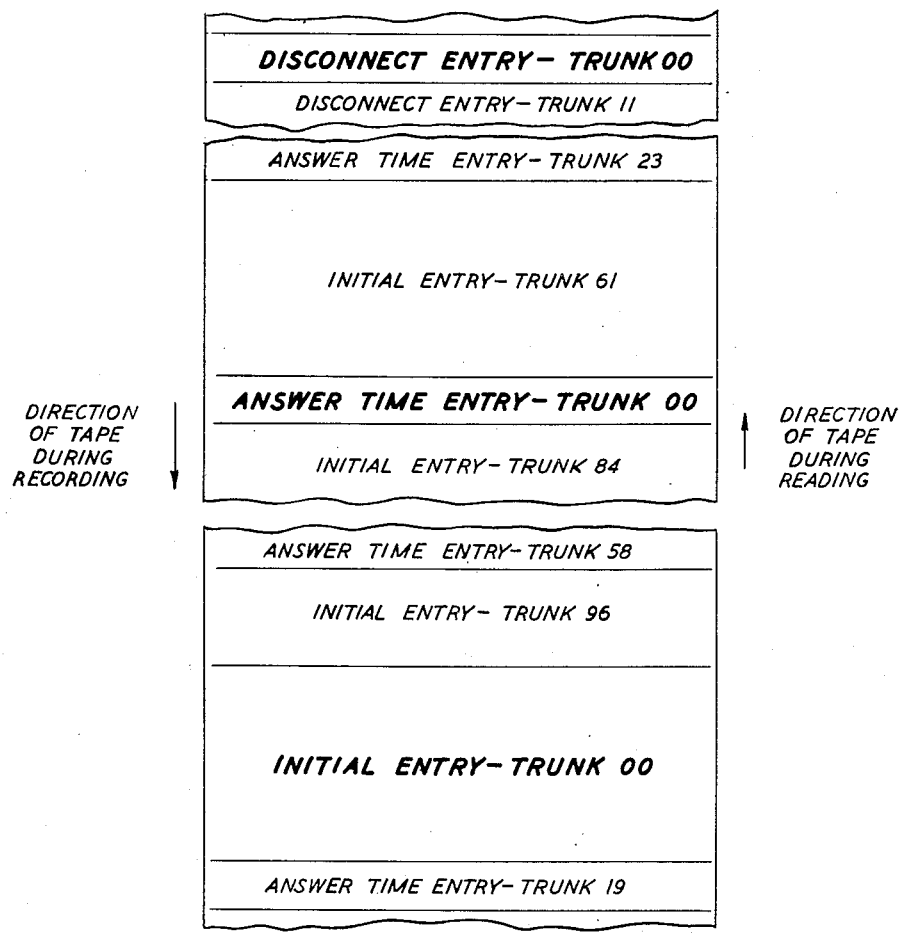

Figs. 6, 7, 8, 9, and 10 show relay switching control circuits;

Fig. 11 shows part of the chargeable time computer;

Fig. 12 shows part of the memory circuit;

Figs. 13 and 14 show additional relay switching control circuits;

Figs. 15, 16, and 17 show part of the chargeable time computer;

Figs. 18 and 25 show two storage register circuits;

Figs. 19, 20, 21, 22, 23, and 24 show a portion of the time computer;

Figs. 26A . . . 26D inclusive, show the various types of tape entries that can be processed by the present invention; and Fig. 27 shows a tape section that might be used with the present invention.

This invention represents a further advancement in the automatic message accounting machine art wherein a series of record-controlled accounting machines cooperate to prepare, or to aid, in the preparation of subscribers' telephone bills. In the present day automatic message accounting systems, perforated tapes are produced at the central offices in response to the completion, or the attempted completion, of a call by a subscriber. Three entries designated an initial entry, an answer entry and a disconnect entry are perforated on a tape for each completed call. These three entries combined contain sufficient information to allow the succeeding record-controlled accounting machines to charge the cost of the call to the proper subscriber. This information includes the answer time of the call, the disconnect time of the call, as well as the identity of the calling party. Also, included is the identity of the called party number for toll calls.

Each tape produced at a central office, together with the perforator that produced the tape, is associated with a plurality of trunks, say 100 trunks. As a result of this arrangement, information pertaining to calls made over any and all of the 100 trunks is perforated on the same output tape. Each call entry has information recorded therein which identifies the number of the trunk which handled the call. This enables the entries for one call over a certain trunk to be distinguished from those pertaining to calls over other trunks.

During periods of time when calls are being made over a plurality of the trunks simultaneously, the three entries pertaining to the same call will be separated from one another by the various entries for the calls appearing on any of the other 99 trunks. This condition will be the rule and not the exception and, therefore, the only time that the three entries for one call will be adjacent one another on the tape will be when no calls were handled by any of the other 99 trunks during the duration of this call. It should be noted, however, that the three entries for any one call appear in the correct order timewise on the tape even though they are separated from one another by entries pertaining to other calls.

The tapes produced by the recorders at the central offices are collected and transported, at selected intervals, to a processing center, called the automatic message accounting center, abbreviated as AMA accounting center. An examination of the tapes as they arrive at such center shows that the information thereon is in a scattered form and must be rearranged before it can be used in the preparation of subscribers' bills. For example, considering the entries on one tape, we find that the entries thereon appear in no orderly fashion insofar as the calling subscriber's telephone number is concerned, and that the three entries pertaining to a single call are separated from one another by the entries for other calls established over the other trunks at the same time.

In present day commercial practices, the recorder tapes are first processed in two stages by a machine called an assembler. This machine rearranges the call entries so that the three entries for each call are adjacent one another on the output tape of the second assembler stage. Also, the entries are arranged on the output tape of this stage so that they appear in numerical ascending consecutive sequence as determined by the identification number of the trunks which handled the calls. In practice, each trunk will have an identification number of 00 through 99 for a group of 100 trunks.

The first assembler stage reads the entries on the recorder tapes and reperforates each entry on to one of ten output tapes in accordance with the units digit of the trunk identification number, hereinafter called the trunk identity index, as contained in each entry. Thus, at the end of the first assembler stage, the entries on the central office recorder tapes have been reshuffled and put on to ten new tapes in accordance with the units digit of the trunk identity index, for each entry. An examination of the output tapes of the first assembler stage shows that tape 0, for instance, has all the entries thereon for all the calls handled by trunks 00, 10, 20, 30, etc. Tape 5 has the entries for all the calls handled by trunks 05, 15, 25, etc. The other output tapes similarly have entries perforated thereon for the calls handled by other trunks in accordance with the call identity index of each trunk.

The ten output tapes of the first assembler stage are spliced together in ascending consecutive numerical sequence beginning with tape 0 and are processed by the second assembler stage which distributes the input entries to one of ten output tapes in accordance with the tens digit of the trunk identity index. As the second assembler stage reads the first section of the spliced input tape, wherein are contained the entries for calls handled by trunks 00, 10 through 90, the entries thereon are reperforated on to ten new output tapes in accordance with the tens digits of the trunk identity index so that, considering output tape 0 of this stage, for example, we find that it now has perforated thereon the entries for all calls handled by trunk 00. The three entries for each call handled by this trunk are now adjacent one another on the new output tape and, in addition, the entries for the different calls appear in the order in which the calls were served by the trunk.

As the second section of the spliced input tape is read by the second assembler stage, wherein are contained the entries for the calls handled by trunks 01, 11 through 91, these entries are similarly distributed and reperforated on to the proper output tapes. Again, considering output tape 0, we find that it now has perforated thereon all the call entries for trunk 00 followed by all the call entries for trunk 01.

The entries on the remaining portions of the spliced input tape for the second assembler stage are read and distributed in a similar fashion to the proper output tapes so that at the end of processing, considering again tape 0, we find that it now has perforated thereon all the call entries handled by trunks 00 through 09. Tape 1 has perforated thereon all the entries for trunks 10 through 19. The remaining tapes, tapes 2 through 9, have perforated thereon the call entries for trunks 20 through 99, respectively.

These ten output tapes from the second assembler are spliced in consecutive ascending numerical sequence beginning with tape 0 so that, considering the newly spliced tapes as a single entity, we find that it now has perforated thereon the call entries handled by trunks 00 through 99 and in that order. Also, the three entries for each call are adjacent one another.

Considering the two assembler stages as a whole, we find that they have taken the central office tapes with entries thereon in a scattered form and redistributed said entries on to the output tape of the second assembler stage so that said entries are now arranged in consecutive ascending numerical order according to trunk number. In addition, the three entries for each call are adjacent one another.

The next processing stage comprises a computer which reads the three entries for each call, subtracts the answer time from the disconnect time, and reperforates a new entry in which is contained the message unit charge for a local call, and the chargeable conversation time for a toll call. Also included in each entry perforated by the computer is information identifying the calling subscriber for both local and toll calls, and identifying the called subscriber for toll calls. Other additional information not material to the present discussion may also be contained in each output entry of the computer. The computer also performs an initial sorting operation by distributing its output entries on to different tapes in accordance with the value of one of several different prechosen digits in its input entries.

The output tapes of the computer are then subjected to processing by additional machines which, together, facilitate the task of preparing subscriber telephone bills.

The present day automatic message accounting system provides a speedier and more efficient billing system at a greatly reduced cost. Nevertheless, it is obvious that any new machine which would still further increase speed and efficiency and/or still further reduce the cost of the billing process would represent a desirable and significant advancement in the art. The present invention meets these objectives in that it provides a machine which combines the functions of the present day two assembler stages as well as the computer stage, and which performs in a single operation the separate operations performed by each of these three stages. The present invention processes the central office tapes and computes the chargeable conversation time for each call after reading the disconnect entry and answer entry associated therewith. Then, as the initial entry for the same call is read, the chargeable conversation time, along with certain other information, is perforated on to a selected one of ten output tapes in accordance with the units digit of the calling party's number.

It is believed that it would be advantageous at this point to discuss briefly the input tape which the machine of the present invention is designed to process. This tape is identical in all physical aspects to the AMA tapes used heretofore and which are adequately described in the prior art. Patent 2,558,476 to W. W. Carpenter et al., June 26, 1951, shows a tape whose physical and structural characteristics are identical to the input tape of the present invention. Reference is hereby made to this patent for a detailed description of the tape.

Fig. 26 of the drawings shows the various types of tape entries the present invention was designed to process. Each entry is shown thereon as it appears on a perforated tape. Each digit of an entry except the (A) or control digit is recorded in the well known two-out-of-five code. In addition, the numerical value of each perforated digit has been shown for the sake of clarity, together with the functional designation represented by each position on the tape.

Fig. 27 shows in diagrammatic form a sample input tape of the type that could be processed by the present invention.

It is fully described in the W. W. Carpenter et al. patent referred to hereinbefore how perforator recorders at the central office perforate three entries on the tape in response to every completed call. It is sufficient to point out herein that the three entries produced are: an initial entry, which is produced as the switching equipment establishes a connection between the calling line and the called line; an answer entry, which is perforated in response to the called party's answering the telephone, and a disconnect entry, which is produced after either party replaces his receiver at the end of the call.

The answer and disconnect entries are the same whether the call is a local call or a toll call. There are two different initial entries however, each of which contains information peculiar to the type of call it represents. The two different types of initial entries together with an answer entry and a disconnect entry are shown in detail in Figs. 26A through 26E of the drawings.

Fig. 26A illustrates a typical four-line initial entry for a toll call made by a subscriber to a called area whose identity on the entry is given in a one-digit code. Entries of this type are made at calling offices whose subscribers have limited toll dialing facilities, such as the facility to dial nearby toll areas only. An A digit of 2 in the first line indicates an initial entry. The B digit of 3 in the first line indicates that the entry is a toll entry and not a message unit entry. The C digit of 9 in the first line represents certain information that is useful in determining the charge for the call. The D digit in the first line is not used in the present invention and is therefore a 0. The E and F digits in the first line identify and distinguish the particular trunk that served this call from the rest of the trunks in the group of 100 trunks.

An A digit of 0 in the second line indicates that the line is not the first line of an entry. The B digit of the second line is the office index of the calling line, which index is a single digit that represents in coded form the two letters and first digit of the calling office. The C, D, E, and F digits of the second line represent the thousands, hundreds, tens, and units digits, respectively, of the calling line number. An A digit of 0 in the third line indicates that the line is not the first line of an entry. The B digit of the third line indicates in coded form the particular geographical area in which the called office is located. The C digit of the third line, which is the called number index, contains in coded form information indicating the number of digits in the called number. The D, E, and F digits of the third line indicate the hundreds, tens, and units digits, respectively, of the called office code. This information would represent the two letters and first digit of the called offices in most of our larger cities today. An A digit of 0 in the fourth line indicates that the line is not the first line of any entry. The B, C, D, E, and F digits of the fourth line represent the thousands, hundreds, tens, units and station letter, if any, respectively, of the called line number.

Figure 26B:
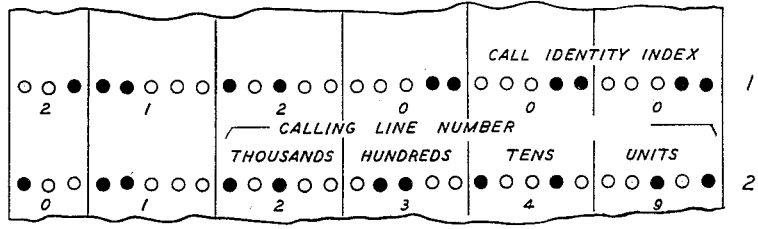

Fig. 26B illustrates a typical entry for a message unit or a local call. An A digit of 2 in the first line indicates that the line is the first line of an initial entry. The B digit of 1 in the first line indicates that the entry represents a message unit call. The C digit of this line contains information similar to that contained in the C digit in line 1 of the previously described tool call entry. The D digit in this line is not used in this entry and is therefore a 0. The E and F digits in this line contain information identical to that contained in the E and F digits of the first line of the previously-described toll call entry. An A digit of 0 in the second line indicates that the line is not the first line of an entry. The information contained in the B digit of this line is identical to the information contained in the B digit in line 2 of the previously described toll call entry. The information contained in the C, D, E, and F digits of this line is identical to that previously described for the C, D, E, and F digits of line 2 of the toll entry.

Figure 26C:
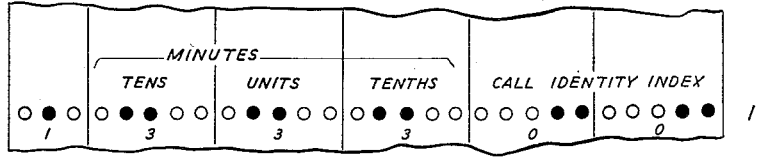
Figure 26D:
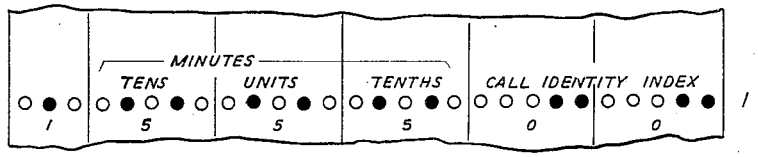

Figs. 26C and 26D illustrate typical answer and disconnect entries. It should be noted that these entries are identical to each other in all respects except that the time in the two entries for each call will be different. This similarity between the answer and disconnect entry for any one call causes no difficulty whatsoever to the processing equipment. It is explained in detail later how the entries are read in a definite order by the processing equipment and, how it is the order in which each entry is read that determines whether it is to be treated as an answer or as a disconnect entry.

Fig. 27 illustrates a sample of a central office tape section showing how the three entries for a single call may be arranged on the tape. For convenience in discussion it is assumed throughout this entire description that the call in which we are interested is handled by trunk 00. The designation 00 serves to identify this one trunk and to enable the machine to distinguish it from each and every one of the remaining 99 trunks in the group of 100 trunks whose call entries may appear on this tape since each recorder, as has been stated before, is associated with a maximum of 100 trunks. The entries for the various calls are shown in diagrammatic form on Fig. 27 with the three entries for our assumed call over trunk 00 being shown in heavy letters and characters. These three entries are shown separated from one another and are interspersed among entries for calls appearing on other trunks within the group of 100 trunks. The three entries for a single call will seldom, if ever, be adjacent one another on the central office output tape. The only time this could ever occur would be when no call was initiated, answered, or disconnected on any of the other trunks within this group of trunks during the period in which trunk 00 handled our assumed call.

The tape shown on Fig. 27 moves in the direction indicated by the arrow on the left side of the tape during the time the various call entries were perforated thereon. In other words, the tape moves in a downward direction with reference to Fig. 27 so that the initial entry for trunk 00, the answer entry and the disconnect entry for the same trunk, are perforated in that order.

The tapes move in opposite direction as they are processed in the accounting center. This is shown by the arrow on the right-hand side of the tape in Fig. 7 which indicates that the tape travels in an upward direction, with respect to Fig. 27, during the time the information thereon is read. The tape is processed in a direction opposite from that in which it was recorded because two substantial advantages accrue therefrom. The first advantage is that the tape can be processed by merely unreeling it from the reel on to which it was wound during recording. This enables the tapes to be used in the condition in which they arrive from the central offices without the necessity of going through a rewinding operation as is necessary in the case of movie film, which must always be projected in the same direction.

The second advantage accruing from processing the tapes in the reverse direction is that it greatly simplifies the necessary circuitry in the processing machine. This simplification results because the requirement for storage registers is minimized. This is easily explained. A reference to Fig. 26 shows that the answer entry and the disconnect entry both are relatively simple and contain little information in comparison with the initial entries. The answer entry and the disconnect entry contain only two items of information pertaining to the call, time information, and trunk number information. By reading the tapes in the reverse direction, the machine has only to concern itself with and store these two items of information. As soon as the answer entry is read, the recorded time of the answer entry is subtracted from the recorded time of the disconnect entry and the difference, the chargeable conversation time, is entered into a storage register for use when the initial entry is read. Information pertaining to the chargeable conversation time is thus available when the initial entry is read and is perforated in the output entry along with the various items of information obtained from the initial entry. A minimum of storage registers are required when the initial entry is read last since the many items of information in this entry can be directly reperforated on the output tape under the direct control of the reading mechanism.

The information in the initial entry could not be read and directly reperforated on to an output tape if the initial entry were read first since the computed elapsed conversation time would not be available until all three entries are read. Therefore, elaborate storage means would have to be provided to store and retain the various items of information in the initial entry for reperforation on the output entry when the elapsed conversation time is available upon reading the disconnect entry. The necessity of providing a register to store the initial entries if the tape is read directly instead of in reverse would increase the cost of the equipment without any compensating advantage.

Fig. 27 shows that between the initial entry and the answer entry for trunk 00, as well as between the answer entry and the disconnect entry for the same trunk, are a number of entries pertaining to other trunks. Obviously, some means must be provided of insuring that the machine will associate only the three entries for each call together and will not associate wrong entries together such as, for example, the initial entry for trunk 00 with the answer entry for trunk 58, or the answer entry for trunk 00 with the disconnect entry of trunk 11. The call identity index, which is a two-digit code and contained in the E and F digits of the first line of every entry on the tape, identifies the particular trunk that served each call. These digits enable the machine to distinguish one trunk from the other 99 trunks in the group of 100 trunks associated with each recorder.

The present circuit is arranged so that certain parts thereof are exclusively associated with and are designed to process data from certain individual trunks. Therefore, the call identity index number in the first line of each entry enables the machine to channel the information therein to the particular portion of the circuit that was designed to be associated with entries containing this call identity index number. Consequently, it may be said that the call identity index number enables the machine to channel the information contained in each entry to its related portion of the circuit which then proceeds to determine whether or not the particular entry now being read is a disconnect entry, an answer entry, or an initial entry.

The first entry read on the sample tape section shown in Fig. 27 is a disconnect entry for trunk 00. The assembler-computer channels the information from this entry to that portion of the circuit exclusively reserved for trunk 00 which then ascertains that the entry just received is a disconnect entry by means that are explained in detail hereinafter. The assembler-computer functions in a similar manner upon reading the next entry shown in Fig. 27 except that, of course, the information therefrom is fed to that portion of the circuit reserved for trunk 11. When the answer entry for trunk 23 is read, the assembler-computer sends the information contained therein to the proper circuit, which proceeds to compute the chargeable conversation time of the call represented by this entry, the disconnect entry for this trunk having been previously read and stored. Sufficient information is available to make this calculation at this time inasmuch as an answer entry for a call is read after the disconnect entry has been read. This relationship is later described in detail for the call handled by trunk 00.

An initial entry for trunk 61 is read next. The initial entry is the last of the three entries for each call to be read and, therefore, the disconnect and answer entry for this call will have already been read and the elapsed conversation time computed. This elapsed conversation time is obtained from a storage section of the assembler-computer and is reperforated on to an output tape along with certain items of information which are obtained from the initial entry now being read. Once the output entry for this call is perforated, the portion of the circuit individually associated with trunk 61 is reset and is in a condition to handle the information pertaining to the next call handled by trunk 61.

The next entry read is the answer entry for trunk 00. The answer time is fed to that portion of the circuit individually associated with trunk 00. This answer time, together with the disconnect time which was obtained from the previous disconnect entry for trunk 00 and which was previously entered and stored into this same portion of the circuit, enables the assembler-computer to compute and store the chargeable conversation time of the call. In this computation a fixed time allowance is made in favor of the subscriber to offset any delay in perforation caused by the central office recording equipment. The next entry read is an initial entry for trunk 84.

The machine performs in a manner similar to that already described with respect to the initial entry for trunk 61. When the answer entry for trunk 58 is read, the machine performs in a manner similar to that already described with respect to the answer entry for trunk 00. As the initial entry for trunk 96 is read, the machine performs in a manner similar to that already described in connection with the initial entry for trunk 84.

The next entry read on the tape is the initial entry for trunk 00. As the assembler-computer reads the first line of this entry, the trunk identity index 00, manifested by the E and F digits, enables the machine to ascertain that it is currently storing the computed chargeable conversation time for a call established over this trunk. It takes this chargeable conversation time from the storage section of its circuit and perforates it on an output tape together with other items of information. Once the output entry is perforated, the portion of the circuit exclusively associated with trunk 00 is reset and is in condition to handle the data for the next call over trunk 00.

The next entry read is an answer entry for trunk 19 and the machine functions in a manner similar to that already described for answer entries of previous calls. The machine continues to function in a manner similar to that already described and processes the remaining entries on the tape, including the answer entry for trunk 19.

Figure 2:
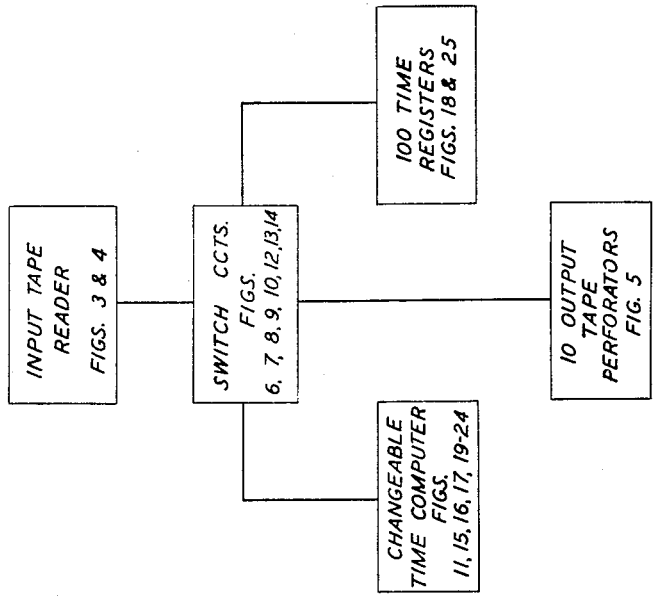
Fig. 2 shows a functional block diagram of the present invention.

In Fig. 2 the circuit of the present invention is functionally divided into an input tape reader, a group of switching circuits, 100 time registers, ten output tape perforators, and a chargeable time computer. This subdivision of the various portions of the circuit enables a brief functional description to be made at this time before the details of the circuit are considered. The input tape reader, shown in diagrammatic form in Fig. 2 and shown in detail in Figs. 3 and 4, reads the entries on the input tape wherein information is contained in a one-out-of-three code in the A portion of the tape and in a two-out-of-five code in the B, C, D, E, and F portions of the tape as is fully described in the hereinbefore-mentioned patent to W. W. Carpenter et al.

Figure 1:
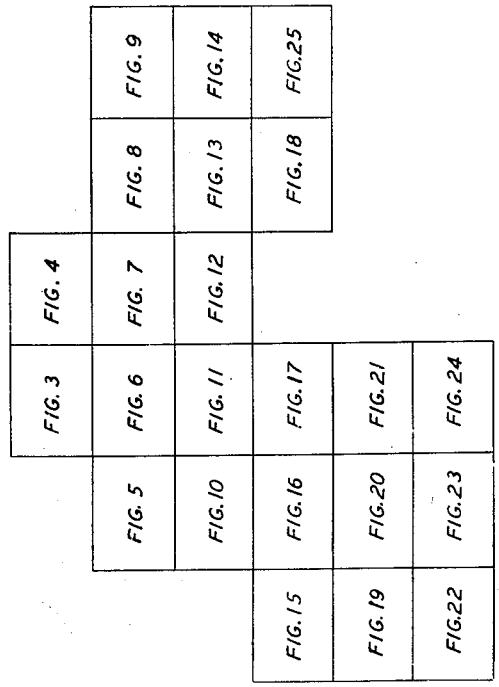
Fig. 1 shows how Figs. 3 through 25 should be placed to form a complete circuit of the present invention.

The tape reader is substantially similar to the reader disclosed in the hereinbefore-mentioned W. W. Carpenter et al patent and, therefore, is not described in detail herein. There are, however, two minor distinctions between the present tape reader and that disclosed in the W. W. Carpenter et al. patent that are worthy of mention. Fig. 1 of the W. W. Carpenter et al patent shows each reader pin to have only one contact associated therewith and operated thereby. The present reader is somewhat different in this respect in that many of the reader pins have a plurality of contacts associated therewith. This obviates the necessity of the usual reading relays and enables the reader contacts themselves to perform the circuit functions formerly performed by the reading relays of the W. W. Carpenter et al. patent. An additional number of contacts are associated with many of the reader pins in order to enable the reader to provide output information on a one-out-of-ten decimal basis as well as on the usual two-out-of-five code basis. This feature eliminates the need for expensive and complicated code translators.

The relationship between the parts diagrammatically shown on Fig. 2 may be best described with reference to the three entries for the call on trunk 00 shown in Fig. 27. The first entry for this call read by the tape reader is the disconnect entry for trunk 00. As this entry is read, the switching circuits are selectively energized by the call identity index digits so that they interconnect the tape reader with the one register in the group of 100 time registers that is exclusively associated with trunk 00. This interconnection enables the tape reader to enter the disconnect time, as obtained from the disconnect entry, into the proper time register.

There are 100 time register circuits in the present invention, as shown in the functional block diagram of Fig. 2. This provides an individual register circuit for each one of the 100 different trunks whose call entries may appear on each input tape. Each register is functionally designated with the digits of the trunk number with which it is exclusively associated. Accordingly, the register circuit which receives the entries from trunk 00 is likewise designated 00.

The machine continues its processing and nothing further of interest, with respect to this call, takes place until its answer entry is read. At this time, the digits 00 in the call identity index selectively operate the switching circuits to interconnect the input tape reader with the chargeable time computer. This interconnection enables the reader to enter the answer time from the answer entry into the chargeable time computer circuit. At the same time, the switching circuits interconnect the chargeable time computer with the time register circuit 00 wherein the disconnect time for trunk 00 is stored. This register enters the disconnect time stored therein into the chargeable time computer and then releases. The computer now computes the chargeable time of the call by subtracting the answer time from the disconnect time and then enters the resultant into the same register in which the disconnect time was previously stored. The chargeable time computer circuit and the switching circuits now release and the machine continues to process entries on the tape pertaining to other calls.

Nothing further of interest with respect to the call now appearing on trunk 00 occurs until the initial entry for this trunk is read. The information in the first line of the initial entry is used only for control purposes, as explained hereinafter, and is not reperforated. The units digit of the calling party's number, which is manifested by the F digit of the second line of this entry, selectively energizes the switching circuits so that they interconnect the tape reader with one of ten output tape perforators. The call identity index digits 00 in the initial entry cause the switching circuits to be selectively energized for interconnecting the selected output tape perforator with the time register in which the computed elapsed conversation time is stored. This interconnection enables the register to perforate the computed chargeable conversation time on the selected output tape. The interconnection between the tape reader and output tape perforator enables the reader to control the perforator so that the information in the initial entry is reperforated on to the output tape along with the computed chargeable conversation time. At this time the register associated with trunk 00 releases along with the switching circuits and the machine is then in condition to process the entries for the next call handled by trunk 00.

The distribution of the output entries on to ten different output tapes in accordance with the units digit of the calling party's number is part of the over-all processing plan wherein the information on the tapes is reshuffled a number of times in order to obtain final tape on which the entries appear in ascending consecutive numerical sequence according to the last four digits of the calling party's telephone number.

The foregoing description of how the present invention processes the three entries for a completed call over trunk 00 discussed only the entries on the tape pertaining to trunk 00. It should be remembered, however, that it is entirely possible that entries for many other completed calls could have been processed during the period in which the three entries for our hypothetical call over trunk 00 were processed. Thus, if this previously described call over trunk 00 was of a rather long duration it is not only possible, but also probable, that a number of completed calls over other trunks would have been made during the duration of call 00. On the other hand, if the duration of the call over trunk 00 was very short, it is questionable whether an entire call could have been handled by another trunk during this time.

In this connection, the present invention can accurately process the call entries for 100 different trunks, and the entries pertaining to calls on one trunk have absolutely no effect upon the processing of entries on the remaining trunks. This feature is provided by virtue of the fact that the common control equipment such as the switching circuits, the chargeable time computer, and the output tape perforators, are associated with any particular call entry only during the period of time that that particular entry is being read. Once an entry has been read and the information therein stored in the appropriate time register associated therewith, the aforementioned common control equipment is released and made available for operation by the next call entry on the tape, regardless of what trunk the next call entry may be associated with. This relationship between the 100 time register circuits and the common control equipment enables the present invention to process the entries for a plurality of calls, some of which may have taken place simultaneously, or at least have been overlapping in part.

Figure 3:
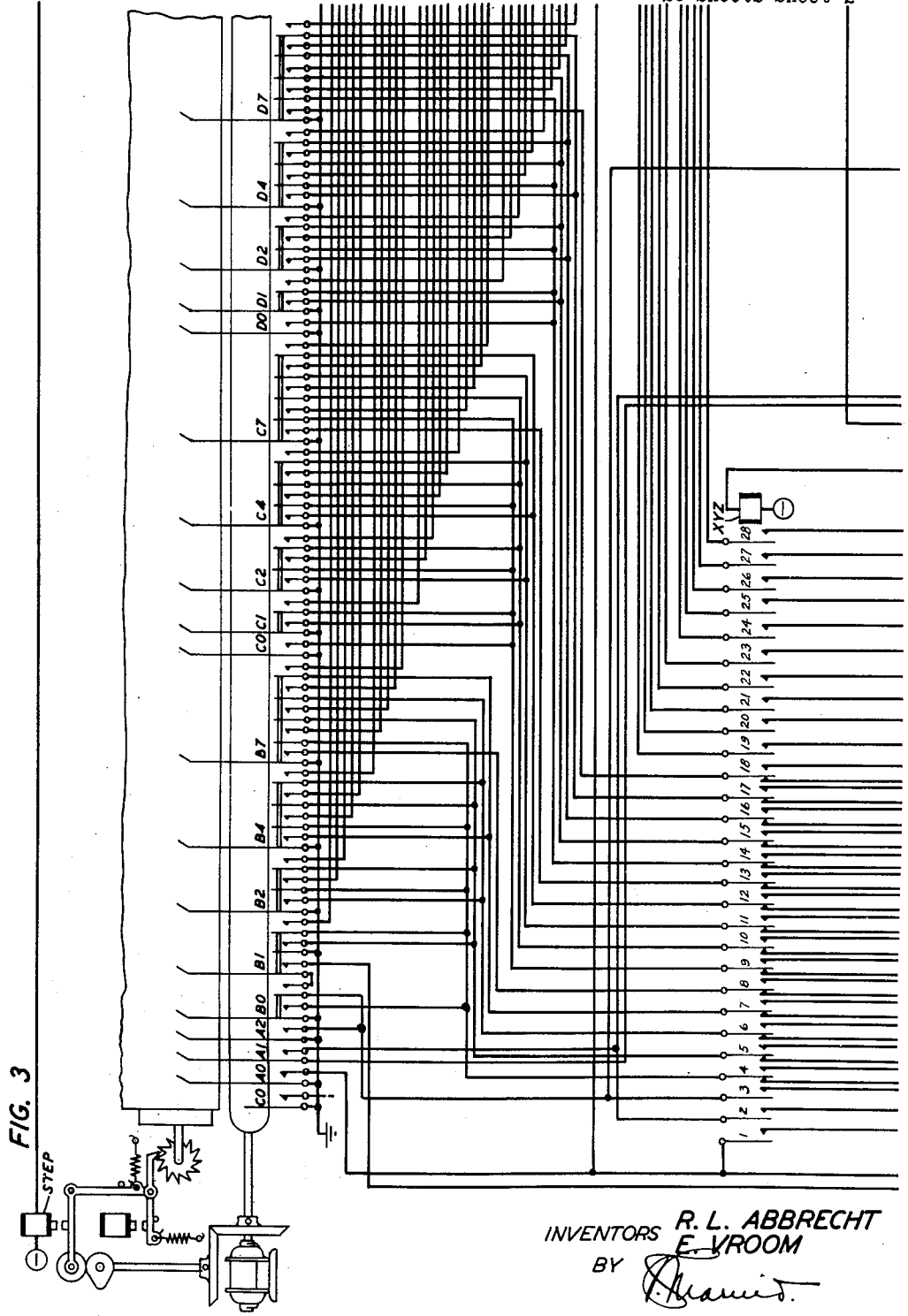
Figs. 3 and 4 show the input tape reader.
Figure 4:
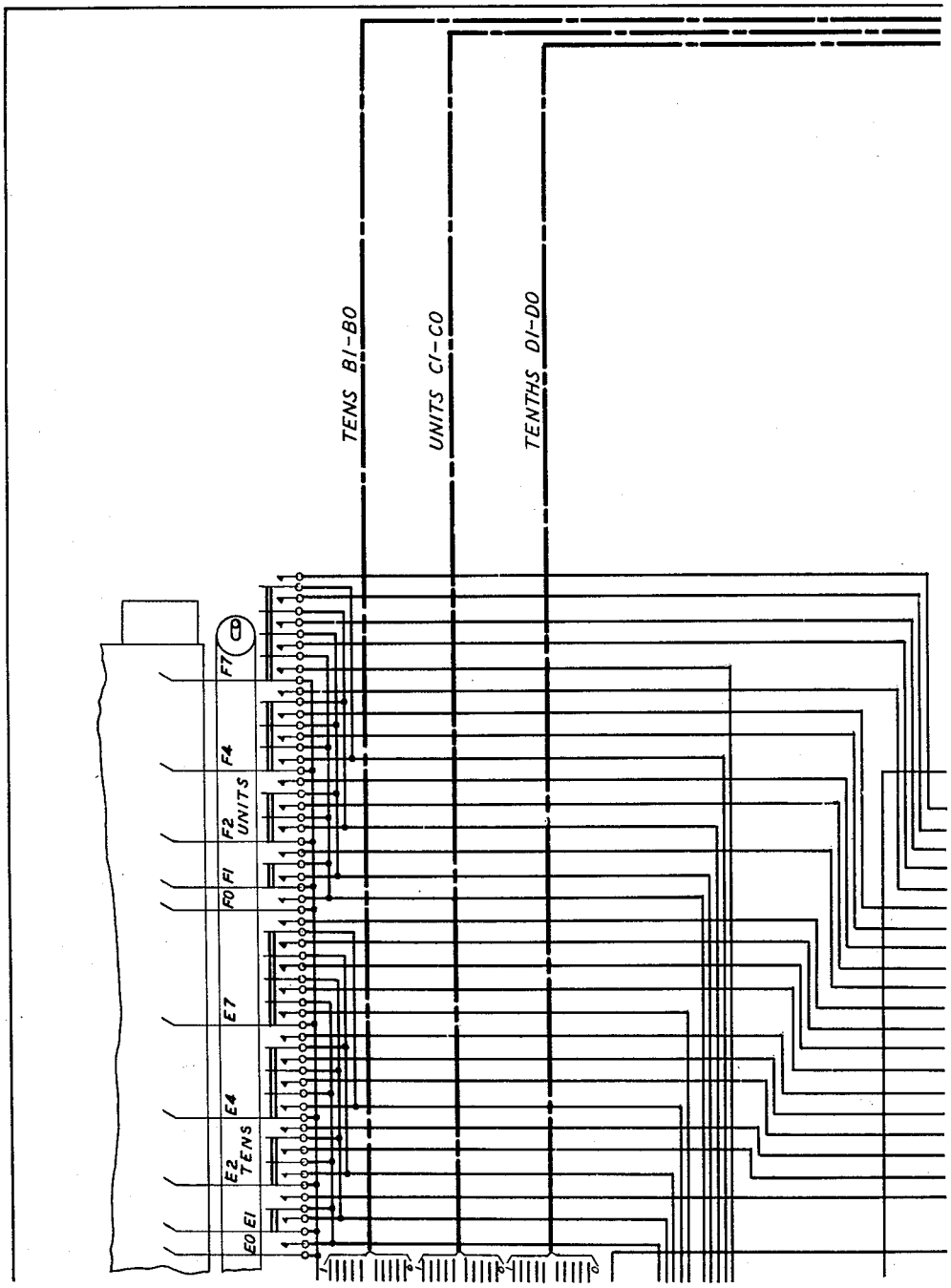

The reader used in the present invention is shown in detail in Figs. 3 and 4 and, as already stated, is similar in many respect to the reader shown in the foregoing-mentioned patent to W. W. Carpenter et al. Briefly, it includes a constantly rotating motor which causes the 28 reader pins, shown on Figs. 3 and 4, to move in and out of the tape perforations in a reciprocating fashion continuously under control of the motor. The reader pins are designated A0, A1, A2, B0, B1, B2, B4, and B7, and similarly with respect to pins C0 through F7, with the letter designation of each set of pins indicating the portion of the tape, as shown in Fig. 26, with which the set of pins is associated, and the numerical suffix following the letter designation of each pin being of a value which, when added to the value of another pin in the same group entering a perforation in the record, will give the two-out-of-five code expression of the digit indicated by the two perforations. This is true for all digits except "0" which is represented by the digits 4 and 7. The continuous reciprocating action causes each pin to close its contacts if it meets a portion of the tape having a perforation therein. Conversely, each pin does not close its contacts if its associated portion of the tape has no perforation therein.

The advancement of the tape in the reader mechanism is under the coadjuvant control of the motor and the relay STEP shown on the upper left-hand corner of Fig. 3. The relationship between the motor and relay STEP is such that the ratchet wheel shown associated with the tape drum in Fig. 3, the tape drum, and the tape, are all rotated by the operation of the motor as long as relay STEP is released. The tape advances one row of perforations for each cycle of the reader pins when this relay is unoperated. When relay STEP is operated, it controls the ratchet wheel and other mechanisms which interconnect the motor with the tape drum so that the rotation of the motor has no effect upon the drum. However, the reciprocating action of the reader pins is unaffected by relay STEP, and they continue their reciprocating action whether the tape is advancing or whether it is stationary.

In the following detailed description of the invention the operation of the circuit is described in connection with an assumed call handled by trunk 00. It should be remembered that during the interval of time in which the disconnect, answer, and initial entries for our hypothetical call over trunk 00 are being processed, the machine could process any number of entries for calls appearing on any one of the other 99 trunks.

*Processing of a disconnect entry*

The first entry read for the call over trunk 00 is a disconnect entry of the type shown in Fig. 26D. This entry has a 1 in the A digit and has the tens, units, and tenths of the disconnect time in minutes in the B ,C, and D digits of the tape, respectively. The A digit of 1 indicates that the entry now being read is an answer or a disconnect entry and not an initial entry. Assuming, for purposes of discussion only, that the call was disconnected at 55.5 minutes after the hour, the digits 555 will be contained in the B, C, and D positions, respectively, of the tape. The call identity index 00 for trunk 00 is contained in the E and F digits.

The digits 1–5–5–5–0–0, contained in the disconnect entry now being read by the reader pins A—F, cause the contacts associated with each of said pins to apply a ground to various parts of the circuit to selectively operate the various parts thereof in accordance with the information being read. The E digit of 0, which is the tens digit of the call identity index, applies a ground through the reader pin contacts E4 and E7 operated, through the break contacts 11 of relay RBR to operated relay T0. The F digit of 0, the units digit of the call identity index, causes the reader pin contacts F4 and F7 to apply a ground through break contacts 1 on relay RBR, through make contacts 1 on relay T0, to operate relay U0 (Fig. 13). The operation of relay U0 closes its 201 different contacts, the first 20 of which interconnect register 00 with the rest of the circuit. The operation of relay U0 does not interconnect registers 10, 20 through 90 with the rest of the circuit since none of relays T1, T2 through T9 are operated at this time. For example, considering register 90 (not shown), it is seen that the paths to interconnect this register with the main body of the circuit are closed through the contacts of relay U0 operated, but are opened at the contacts of relay T9 which is normal at this time. None of the registers 09 through 99 are interconnected with the rest of the circuit since neither the U9 relay nor any of the other relays associated therewith are operated at this time to effect the necessary interconnection. For the same reason, none of registers 01 through 91, 02 though 92, . . . 08 through 98 are now interconnected with the remainder of the circuit.

The ten relays T0 through T9, together with the ten relays U0 through U9, provide a switching circuit that is selectively operable to interconnect any one of the 100 registers with the remainder of the circuit. This selection circuit is under the control of the contacts associated with the E and F digits in the tape. By means of these digits the circuit is selectively operated to interconnect its main portion with the register associated with the trunk identified by said digits.

The E reader pin contacts selectively operate one of the relays T0 through T9 in accordance with the numerical value of the E digit. The operation of one of these relays, relay T0 as hereinbefore described, closes the contacts associated therewith to interconnect the main portion of the circuit with contacts 0 through 19 on each of relays U0 through U9. At this time, any registers 00 through 09 can be connected to the reader depending upon which one of relays U0 through U9 is operated in response to the value of the F digit. It has already been described how an F digit of 0 causes the operation of relay U0, which interconnects register 00 with the reader pin contacts. If the F digit has a value other than 0 such as a 9, for instance, relay U9 instead of relay U0 would operate and register 09 (not shown), rather than register 00, would be connected to the reader.

The operation of relay U0 closes a ground from break contacts 3 on relay BRC (Fig. 6), through make contacts 26 of relay T0, through make contacts 15 on relay U0, to operate relay INT (Fig. 18). The operation of relay INT closes a ground over its make contacts, through break contacts 2 of relay AA, to operate relay A (Fig. 18) which locks over its make contacts 2 to ground on the break contacts of relay RER.

The operation of relay A closes a ground from break contacts 1 on relay AA, through make contacts 3 on relay A, through make contacts 16 on relay U0, through contacts 27 on relay T0, to operate relay RC1 (Fig. 6) which interconnects the 15 reader pin contacts in the B, C, and D sections of the reader with 15 relays in register 00. This interconnection enables the reader pin contacts to selectvely energize relays in said register 00 in accordance with the disconnect time contained in sections B, C, and D of the disconnect entry.

The disconnect time which has been assumed to be 55.5 minutes, is represented by perforations in the B1, B4, C1, C4, D1, and D4 positions of the tape, which, in turn, cause the operation of the similarly designated reader pin contacts. The operation of these reader pin contacts causes the operation of relays 18–B1, 18–B4, 18–C1, 18–C4, 18–D1, and 18–D4 in register 00 to represent the disconnect time of 55.5 minutes after the hour. The path over which each of these relays operates is described in detail hereinafter. A comparison of the B, C, and D reader pin contacts with the register circuit 00 shows that for every one of these reader pin contacts there is a correspondingly designated relay in said register. The operation of each reader pin contact causes the operation of its correspondingly designated relay in said register. For example, a perforation in section B4 of the tape causes the contacts associated with reader pin B4 to operate which, in turn, causes relay 18–B4 to operate. With respect to the designation of relay 18–B4, the digits 18 indicate the figure number of the drawings on which the relay is located, while the designation B4 serves to functionally associate this relay with certain elements in other portions of the circuit such as, for example, reader pin contact B4 in Fig. 3. Many of the other circuit elements, including relays, through the entire circuit are designated in a similar manner.

The path over which relay 18–B1 operated extends from a ground supplied through the B1 reader pin contacts operated, through break contacts 5 of relay XYZ, through make contacts 2 of relay RC1, through break contacts 14 of relay STR, through break contacts 14 of relay COM, through make contacts 24 of relay T0, through make contacts 13 of relay U0, to operate relay 18–B1. The path over which relay 18–B4 operates extends from ground through reader pin contacts B4, through break contacts 7 of relay XYZ, through make contacts 4 of relay RC1, through break contacts 12 of relay STR, through break contacts 12 of relay COM, through make contacts 22 of relay T0, through make contacts 11 of relay U0, to the winding of relay 18–B4. The path over which relay 18–C1 operates extends from ground through the reader contacts C1, through break contacts 10 of relay XYZ, through make contacts 7 of relay RC1, through break contacts 9 on relay STR, through break contacts 9 on relay COM, through make contacts 19 on relay T0, through make contacts 8 on relay U0, to the winding of relay 18–C1. The path over which relay 18–C4 operates extends from ground through the operated contacts on reader pin contacts C4, through break contacts 12 of relay XYZ, through make contacts 9 of relay RC1, through break contacts 7 on relays STR and COM, through make contacts 17 on relay T0, through make contacts 6 on relay U0, to the winding of relay 18–C4. Relay 18–D1 operates from the ground supplied by reader pin contacts D1 operated, through break contacts 15 on relay XYZ, through make contacts 12 on relay RC1, through break contacts 4 on relays STR and COM, through make contacts 14 on relay T0, and over make contacts 3 on relay U0 to the winding of relay 18–D1. Relay 18–D4 operates from the ground supplied through the operated contacts associated with reader pin D4, through break contacts 17 on relay XYZ, through make contacts 14 on relay RC1, through break contacts 2 on relays STR and COM, through make contacts 12 on relay T0, through make contacts 1 on relay U0, to the winding of relay 18–D4. Relays 18–B1, 18–B4, 18–C1, 18–C4, 18–D1, and 18–D4 operated, lock over their respective make contacts 1, through the break contacts of relay SER, to ground.

All the relay operations described so far take place during a single closure of the reader pin contacts as their associated reader pins read the perforations on the tape. The contacts that operated as the pins entered the perforations release as the pins disengage themselves from the tape, with the result that the operating ground which was formerly supplied to various parts of the circuit by these contacts is removed. This results in the release of relays T0 and U0 which break the operating paths for relays RC1 (Fig. 6) and INT in the register circuit, thereby effecting their release. Relay A in the register circuit remains operated over the locking path previously described. The release of relay INT completes a path from ground over its break contacts through make contacts 1 on relay A, to the winding of relay AA, which now operates and locks over its make contacts 3 to a ground on the break contacts of relay RER.

Relay STEP is not operated at this time and therefore, the rotation of the motor advances the tape drum and the tape one step as the reader pins are withdrawn from the tape. The reader is now in the position to read the next entry on the tape as the reader pins enter its perforations.

A study of the condition of the circuit at this time shows that with the exception of the operated relays in register 00, the entire circuit is in exactly the same condition it was before the disconnect entry for trunk 00 was read. Therefore, it can be said that the reading of this disconnect entry has no effect upon the circuit with the exception of register 00. This register is exclusively associated with trunk 00 and, therefore, the condition in which it may be at the time an entry for another trunk is read can have no effect upon the machine's ability to process entries pertaining to other trunks.

Nothing further occurs, with respect to the call handled by trunk 00, until the answer entry for this call is read. Until then, the relays in register 00 that are locked operated will remain in this condition no matter how many entries pertaining to other trunks are read and entered into other registers in the meantime.

*Processing of an answer entry*

As the answer entry for the call on trunk 00 is read, the digits 00 in the call identity index entry cause the E and F reader pins to close the contacts associated therewith so that a ground is supplied over the circuit previously described to operate relays T0 and U0. The operation of relays T0 and U0 closes the path previously described from ground on break contacts 3 of relay BRC to reoperate relay INT. The reoperation of relay INT closes a ground from its make contacts, through make contacts 2 of relay AA, through break contacts 2 of relay BB, to operate relay B, which locks over its contacts 2 make to a ground on the contacts of relay RER.

Sufficient information is now available to the machine to enable it to compute the chargeable conversation time by subtracting the answer time, in the entry now being read, from the disconnect time stored in register 00. The following description explains in detail how the switching circuits interconnect the reader pin contacts with the chargeable time computer, how the switching circuits interconnect the register 00 with the chargeable time computer, how the computer subtracts the answer time from the disconnect time, how the register 00 releases as it transmits the disconnect time to the computer, and how the computer reoperates register 00 to store therein the computed chargeable conversation time.

The foregoing functions of the assembler-computer which must be performed upon the reading of an answer entry require a period of time in excess of one reader cycle. As a result, provision is made within the circuit to halt the feeding of the tape and to provide a steady holding ground for various parts of the circuit which otherwise would be dependent upon the pulsating ground supplied by the reader pin contacts as their reader pins cyclically engage perforations in the tape. The circuit shown in Fig. 12 is operated upon the reading of an answer entry in a manner described hereinafter in order to provide the necessary holding grounds for the various parts of the circuit during the period of the time required to process the answer entry.

The operation of relay B closes a ground from break contacts 1 of relay B closes a ground from break contacts 1 of relay BB, through make contacts 3 of relay B, through make contacts 17 of relay U0, through contacts 28 of relay T0, through break contacts 1 of relays TL0 and UL0 (Fig. 12) to operate the step magnet of rotary switches A and B, respectively.

Figure 6:
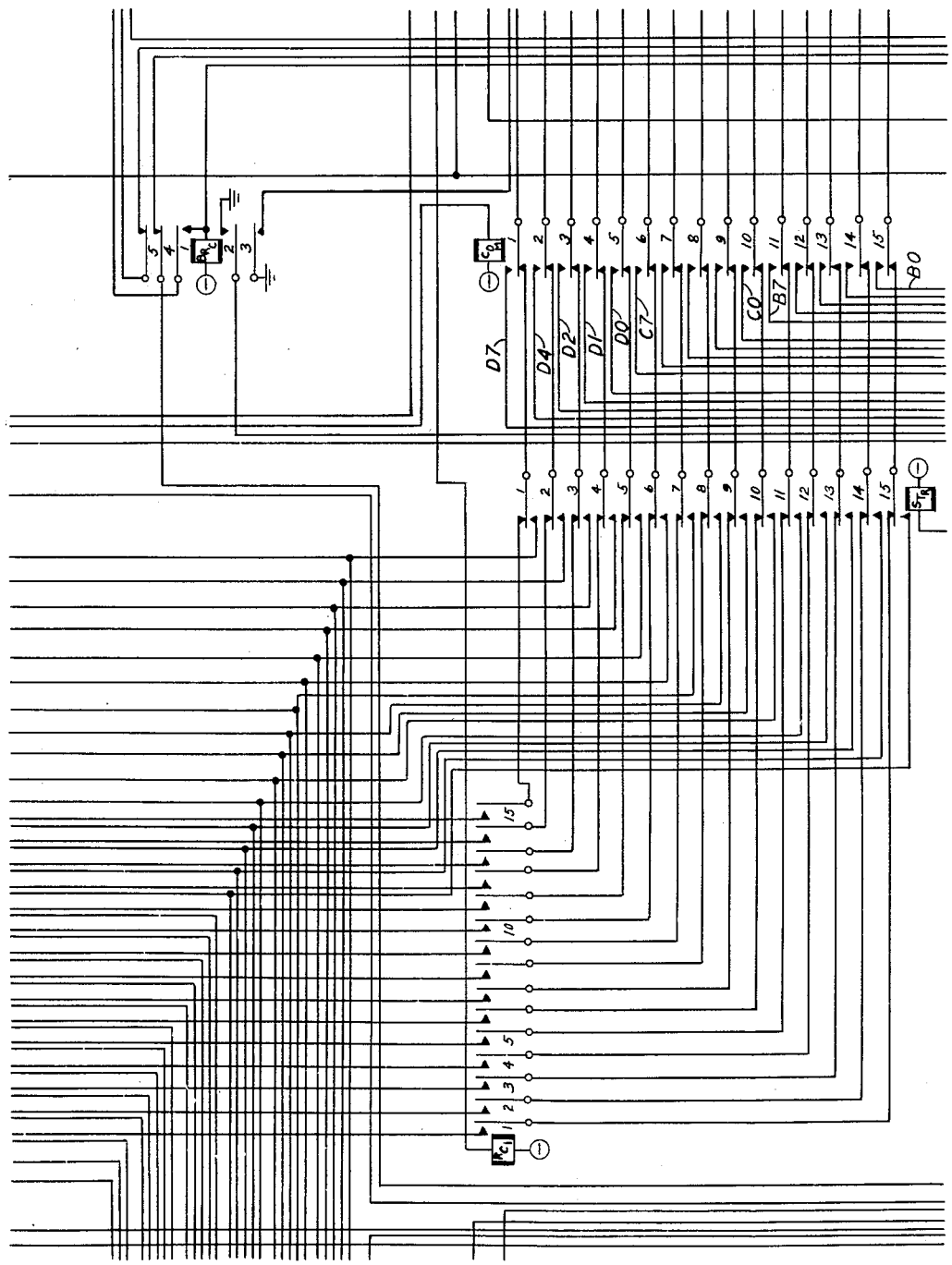
Figure 7:
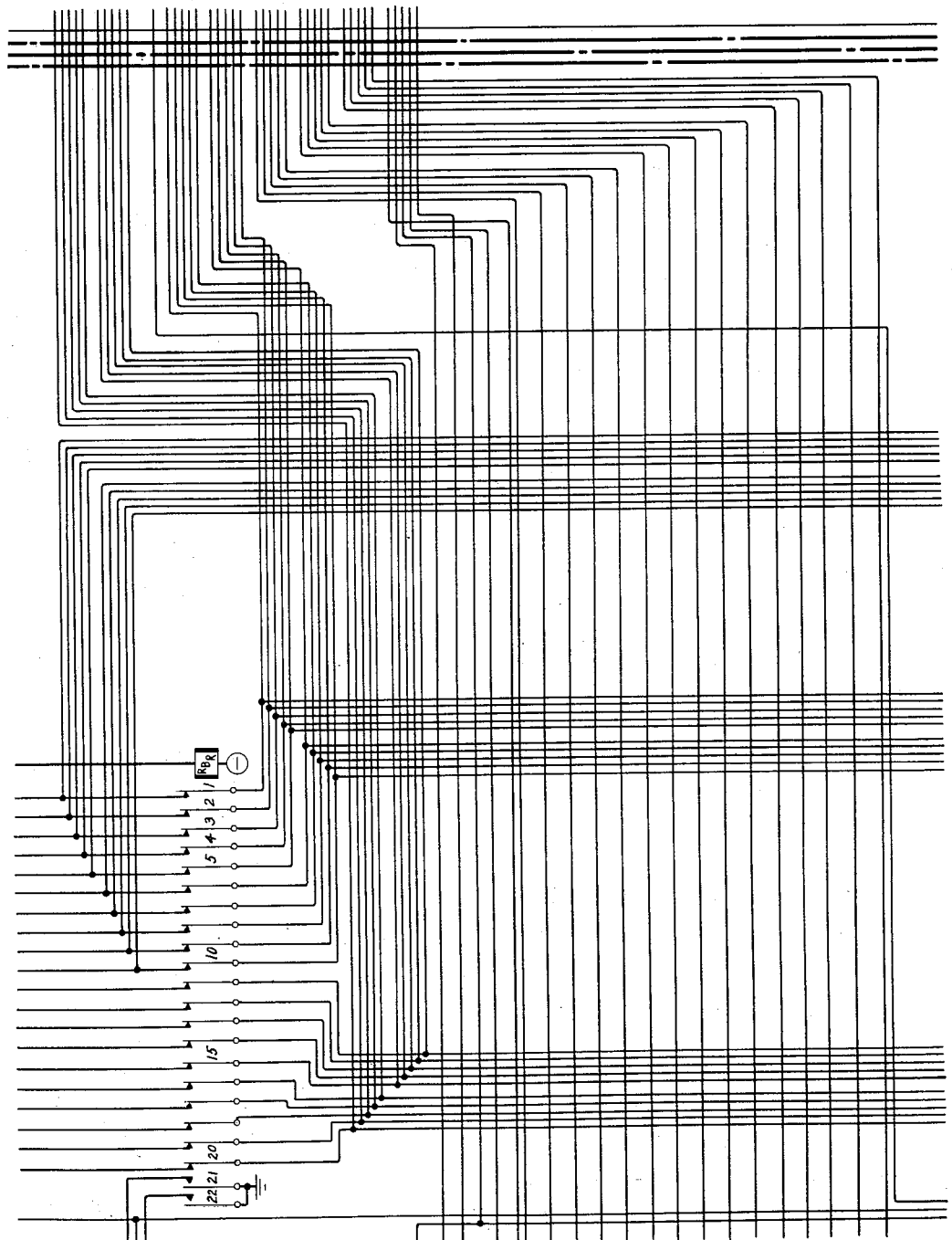
Figure 8:
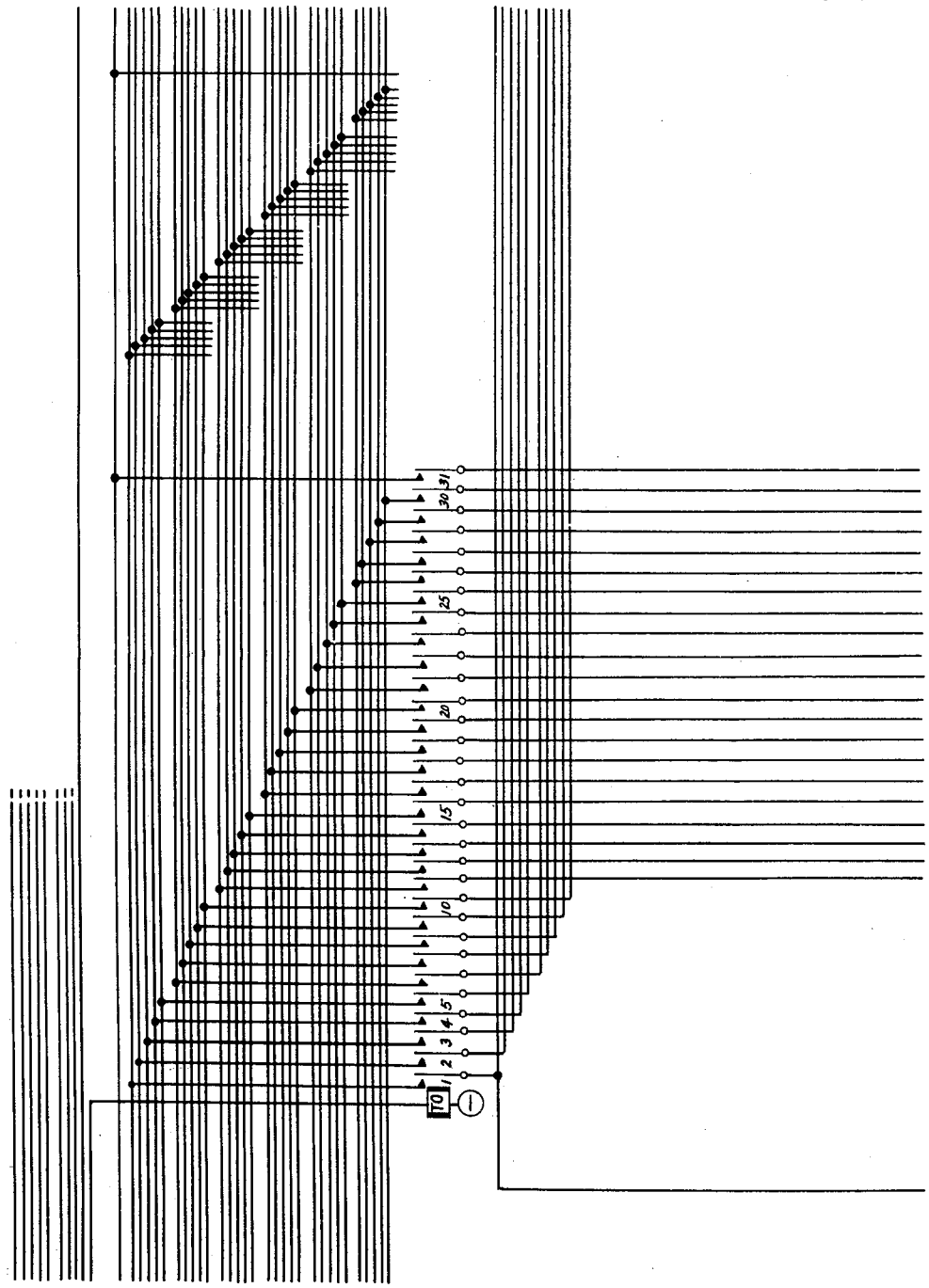
Figure 9:
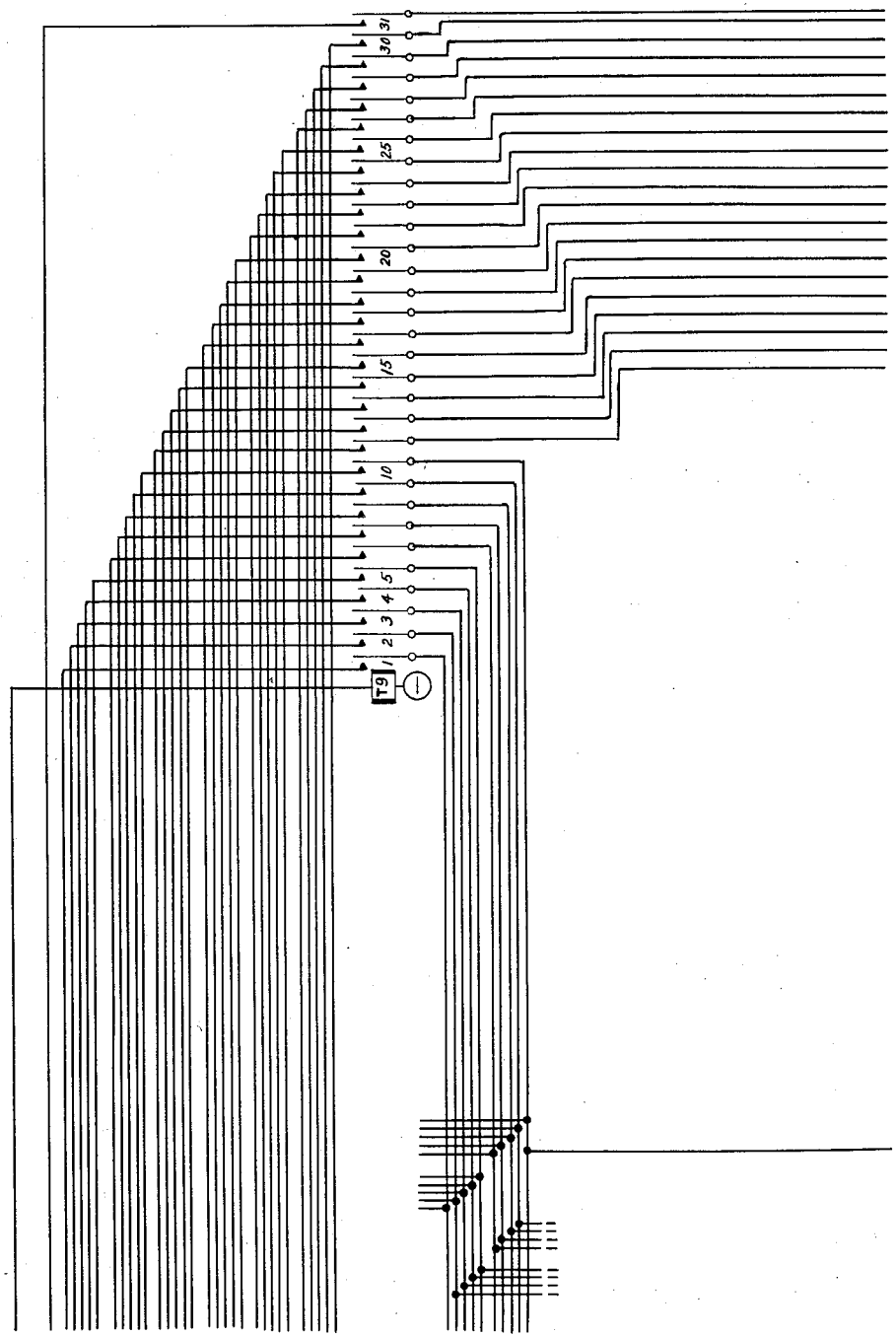

The ground on make contacts 28 of relay T0 is also extended through reader pin contacts A1 to operate relay COM (Fig. 6). The answer and disconnect entries are the only ones that have an A digit of 1 in the first line, therefore, the operating path for relay COM is extended through the A1 reader pin contacts to insure that the relay will only be operated during the processing of a disconnect or answer entry. The function of relay COM is explained in detail hereinafter.

The ground on make contacts 28 of relay T0 also operates relay RMS (Fig. 12). The operation of relay RMS closes a ground over an obvious path to operate relay STEP in Fig. 3, which, in turn, energizes the ratchet mechanism associated therewith so that the tape does not advance in response to the rotation of the reader motor.

The ground supplied through break contacts 1 of relays TL0 and UL0 enables step magnets A and B, respectively, to operate through their self-interrupted contacts and to rotate the switches associated therewith. The stepping action of these switches continues until each rotates to a position in which the lower wiper of each switch engages the stationary contact on which a ground potential has been placed by the same reader pin contacts that supplied the grounds to operate relays T0 and U0. In the present example, the contacts in position 0 in arc 1 of both switches are supplied with a ground potential at this time by the reader pin contacts that operated relays T0 and U0. The ground on contact 0 arc 1 of rotary switch A operates relay TL0 over an obvious circuit as soon as it steps to this position. The operation of relay TL0 closes a locking path for itself from the ground on the break contact of the release magnet RLS associated with rotary switch A, through the make contacts 2 of relay TL0, to the winding of relay TL0 which is now held operated. The operation of relay TL0 removes the ground from the self-interrupting contacts of step magnet A so that it ceases its operation and stops the switch in position 0. The ground on contact 0 arc 1 of switch B operates relay UL0 which locks operated to a ground supplied from the break contacts of the release magnet RLS of rotary switch B, through make contacts 2 of relay UL0. The operation of break contacts 1 of relay UL0 removes the ground from the step magnet of rotary switch B so that it stops in its position 0.

The operation of relay TL0 supplies a ground from the break contacts of the release magnet RLS for rotary switch A, through make contacts 3 of relay TL0, to the winding of relay RBR (Fig. 7) which operates and disassociates the E and F reader pin contacts from the register circuits. The operation of relay TL0 also applies a ground over part of the same path, through contacts 0 of arc 2 of the A rotary switch, to the winding of relay T0, to hold it operated as relay RBR releases and breaks the path over which relay T0 originally operated. The operation of relay TL0 also supplies a ground to prepare a locking path for various relays in Fig. 10.

The operation of relay UL0 closes a ground from the break contacts of relay RLS associated with the B switch, through make contacts 3 on relay UL0, through contacts 0 on arc 2 of switch B, through make contacts 1 of relay T0, to the winding of relay U0, to hold it operated when relay RBR operates and breaks the path over which relay U0 originally operated.

Rotary switches A and B remain in their respective positions 0, which positions jointly correspond to trunk 00, and thereby supply the holding grounds already described to various parts of the circuit during the period of time required to process the answer entry. As already mentioned, the circuit in Fig. 12 is necessary because the reader pin contacts, due to the constant reciprocating action of the reader pins, cannot supply a holding ground for the length of time required to process the answer entry. Rotary switches A and B do not release until the machine is completely finished with the processing of the answer entry and has entered the computed elapsed conversation time back into register 00.

The operation of relay COM over the path previously described in response to the operation of relay B (Fig. 18) disconnects register 00 from the reader pin contacts and interconnects it with the 15 relays shown in Fig. 11 so that the operated relays in each group of the 18–B–, 18–C–, and 18–D– relays in register 00, whose operated condition represents the disconnect time, operate the functionally related relays in Fig. 11. The operation of the six relays in Fig. 11 by their correlatives in register 00 controls the operation of certain relays in the computer circuit shown in Figs. 15 through 17 and 19 through 24, which compute the chargeable conversation time from the answer time received from the reader pin contacts and from the disconnect time received from register 00. Fig. 11 comprises nothing more than a code translator that receives the information from register 00 on a two-out-of-five code basis, translates it to its decimal equivalent, and operates the proper one out of ten relays in each order of the computer.

Since the disconnect time is assumed to be 55.5 minutes after the hour, relays 18–B1, 18–B4, 18–C1, 18–C4, 18–D1 and 18–D4, are operated and locked as already described. Each of these relays locks over its contacts 1 make to the ground on the break contacts of relay SER. The closure of make contacts 2 and the opening of make contacts 1 on each of these relays removes the battery potential from their operating path, which battery potential was formerly supplied through the windings of each of the relays, and in turn connects a resistance ground thereto through the winding of relay SER. This resistance ground is extended through contacts 2 of relays 18–D4, 18–D1, 18–C4, 18–C1, 18–B4, and 18–B1, through make contacts 1, 3, 6, 8, 11, and 13, respectively, of relays U0, through make contacts 12, 14, 17, 19, 22, and 24, respectively, of relay T0, through make contacts 2, 4, 7, 9, 12, and 14, respectively, of relay COM, to the windings of relays 11–D4, 11–D1, 11–C4, 11–C1, 11–B4, and 11–B1, respectively, which now operate by virtue of the fact that the other side of their windings is connected to a negative battery potential. Each of these operated relays locks over their make contacts 2 to the previously described ground supplied by relay BB. Relay SER (Fig. 18) operates at this time since it is connected in series with the six relays in Fig. 11 which just operated. The operation of relay SER releases relays 18–B1, 18–B4, 18–C1, 18–C4, 18–D1, and 18–D4 by breaking the path over which they were locked operated to ground on the break contact of relay SER. The operated relays in Fig. 11 remain locked operated and do not release as their correlatives release in register 00.

The six operated relays in Fig. 11 represent, in a two-out-of-five code, the disconnect time of the call, which has been assumed to be 55.5. Make contacts 1 on each relay in Fig. 11 is interconnected with a number of the relays in the three orders of the computer shown in Figs. 15 through 17 and 19 through 24 in such a manner that one, and only one, relay will operate in each of the three orders of the computer as determined by the digital value represented by each pair of operated relays in the tens, units, and tenths groups of relays in Fig. 11. The tens order of the computer (Figs. 15 through 17), the units order of the computer (Figs. 19 through 21), and the tenths order of the computer (Figs. 22 through 24) each has ten relays therein designated 0 through 9, respectively, which relays are designated as 15–0, 15–1 through 17–9, 19–0 through 21–9, and 22–0 through 24–9 in accordance with the figure number on which each relay is located. The relationship between the designations of these relays, which are arranged to operate on a decimal basis, and the designation of the relays in Fig. 11, which are arranged to operate on a two-out-of-five code basis, is such that the relay in each order of the computer will operate whose numerical designation equals the sum of the two operated relays in the same order in the translator of Fig. 11.

Make contacts 1 on each of relays 11-B1, 11-B4, 11-C1, 11-C4, 11-D1, and 11-D4 extend a ground over an obvious circuit to operate relays 16-5, 20-5, and 23-5 in the tens, units, and tenths order of the computer, respectively. These same contacts also extend a ground to various other relays in each of the three orders of the computer circuit. However, each relay in the computer is designed so that it will operate only when both of its windings are energized. Therefore, only relays 16-5, 20-5, and 23-5 operate at this time since only they have both of their windings energized by the operated relays in the translator circuit of Fig. 11. None of the other relays that are connected to make contacts 1 on one of the operated relays in Fig. 11 operate at this time since one, and only one, of their windings are now energized. For example, one winding on each of relays 15-1, 16-3, and 17-8 is connected to make contacts 1 on relays 11-B1 over the same path that one winding of relay 16-5 is connected thereto. However, only relay 16-5 out of this group of relays operates since it is the only one that currently has both of its windings energized. The other winding on each of relays 15-1, 16-3, and 17-8 is connected to make contacts 1 on unoperated relays in Fig. 11. For example, the other winding of relay 17-8 is connected to make contacts 1 on relay 11-B7 which is not operated at this time.

The cable designated B1-B0 in Fig. 17 is connected at one end to contacts on the relays in the tens order of the computer in Figs. 15 through 17, and at its other end to the B reader pin contacts. These contacts translate the information on the B section of the tape from a two-out-of-five code to a one-out-of-ten decimal code and apply a ground potential to the proper wire in the group of ten wires B1-B0. The relationship between the ten wires in cable designated C1-C0 on Fig. 21 in the units order of the computer and the C reader pin contacts, as well as the relationship between the ten wires in cable designated D1-D0 on Fig. 24 in the tenths order of the computer and the D reader pin contacts, is identical to that between the B reader pin contacts and the wires in cable B1-B0 for the tens order of the computer.

Let it be assumed that the answer time of the call is 33.3 minutes after the hour, as indicated in Fig. 26C. Therefore, wires B3, C3, and D3 will have a ground potential placed on them by the contacts associated with the B, C, and D reader pins which now read the answer time of 33.3. The ground on wire B3 is extended through make contacts 3 of relay 16-5 operated in the tens order of the computer, through break contacts 2 of relay 17-11, through the two diodes connected to this contact on relay 17-11, to leads 17-B2 and 17-B0.

The whole group of diode rectifiers connected to the contacts of relay 17-11 comprises a code translator which translates the digital output of the computer to a two-out-of-five code. The group of wires 17-B0 through 17-B7 are designated so that the last digit of the designation represents the numerical value of each wire in the two-out-of-five code. The letter portion of the designation functionally associates each wire with certain relays in register 00.

The contacts on relay 17-11 have been functionally designated in such a manner that the numerical value of the designation equals the numerical output of this order of the computer when the tens digit of the answer entry, as supplied by the reader pin contacts, is subtracted from the tens digit of the disconnected entry, as supplied from the translator relays in Fig. 11. For example, the tens digit 3 in the answer time was subtracted from the tens digit 5 in the disconnect time, and the difference 2 manifests itself in the form of a ground potential on contacts 2 of relay 17-11. This ground potential is supplied from the B reader pin contacts over the cable designed B1-B0. This ground, which manifests the digit 2 in the decimal system, is applied through the two diode rectifiers associated with this contact to wires 17-B0 and 17-B2 as the two-out-of-five code representation of the digit 2. The ground on wires 17-B0 and 17-B2 extends through make contacts 15 and 13, respectively, of relay COM, through contacts 25 and 23, respectively, of relay T0, through contacts 14 and 12, respectively, of relay U0, to the windings of relays 18-B0 and 18-B2, respectively, which now operate and lock over their make contacts 1 to the ground supplied from the break contacts of relay SER. Relay SER, which was formerly operated, released when the translator relays (Fig. 11) lock operated and open their operating circuits. Relays 18-B0 and 18-B2 operated indicate that the tens digit of the computed chargeable conversation time is 2.

Operated relays 11-C4 and 11-C1 in the translator circuit apply a ground over their make contacts 1 to energize both windings of relay 20-5 in the units order of the computer. This relay now operates since both of its windings are energized. Certain other relays in the same order of the computer have one of their windings energized at this time. However, these other relays do not operate since, as has been said before, they are designed so that they do not operate until both of their windings are energized. Operated relay 20-5 indicates that the units digit of the disconnect time is 5.

Figure 21:
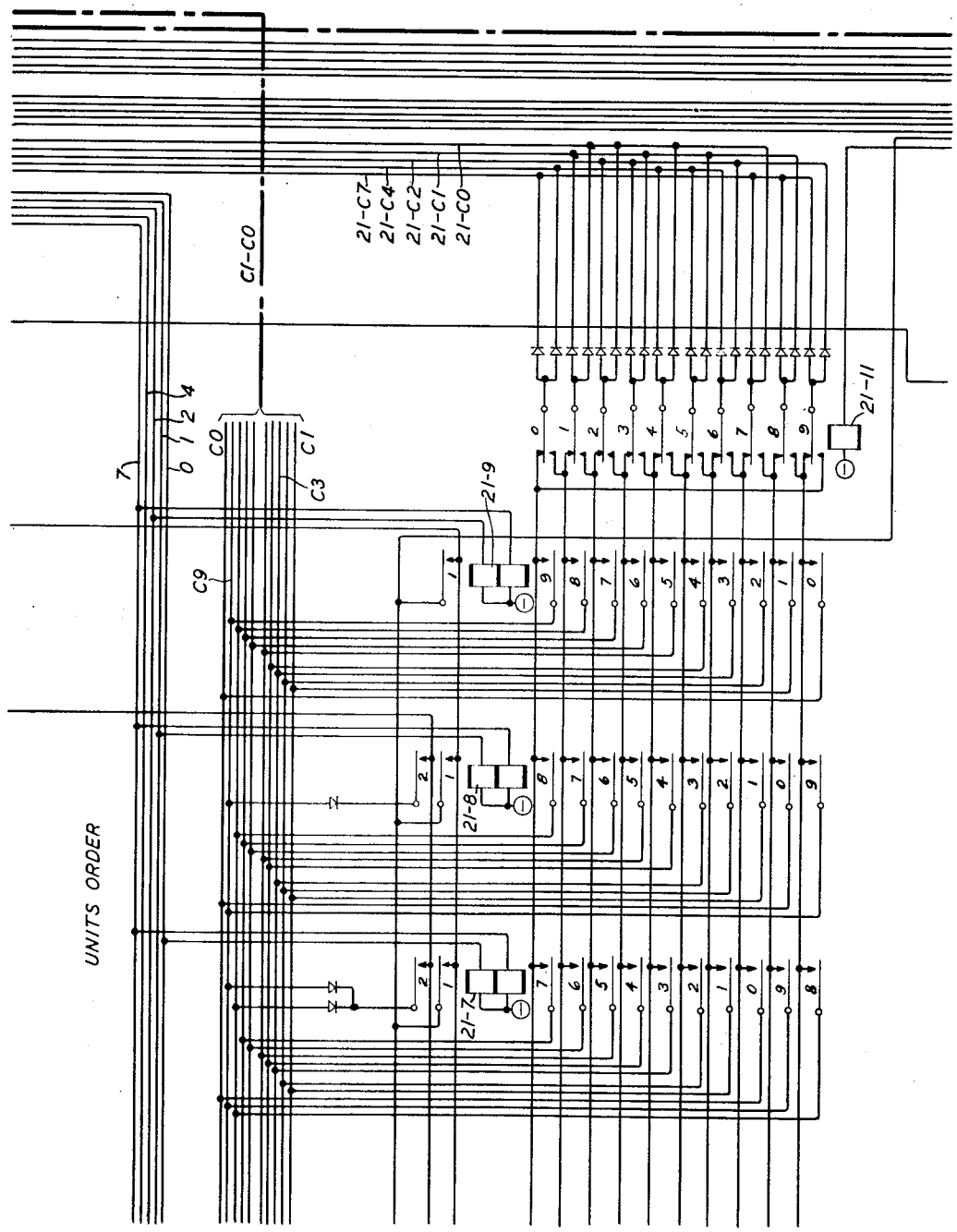

The answer time entry of 33.3 causes the reader pin contacts associated with the C portion of the reader to apply a ground to lead C3 in the group of wires designated C1-C0, which group of leads begins on Fig. 4 and ends on Fig. 21. This ground is extended through make contacts 3 on relay 20-5, over make contacts 2 on relay 20-11, and through the two diodes connected thereto, to leads 21-C0 and 21-C2. The ground on break contacts 2 of relay 20-11 indicates that the difference between the units digit of 3 in the answer time and the units digit 5 in the disconnect time is 2. The ground on leads 21-C0 and 21-C2 represents, in a two-out-of-five code, the digit 2 in the units order of the chargeable conversation time.

The ground on leads 21-C0 and 21-C2 is extended over make contacts 10 and 8, respectively, of relay COM, over contacts 20 and 18, respectively, of relay T0, over contacts 9 and 7, respectively, of relay U0, to the windings of relays 18-C0 and 18-C2, respectively, both of which operate and lock to the ground supplied from the break contacts of relay SER. Relays 18-C0 and 18-C2 operated indicate that the units digit of the chargeable conversation time is 2.

Make contacts 1 of relays 11-D1 and 11-D4 operated, extend a ground to both windings of relay 23-5 in the tenths order of the computer which now operates since both of its windings are energized. Operated relay 23-5 indicates that the tenths digit of the disconnect time is 5.

Figure 22:
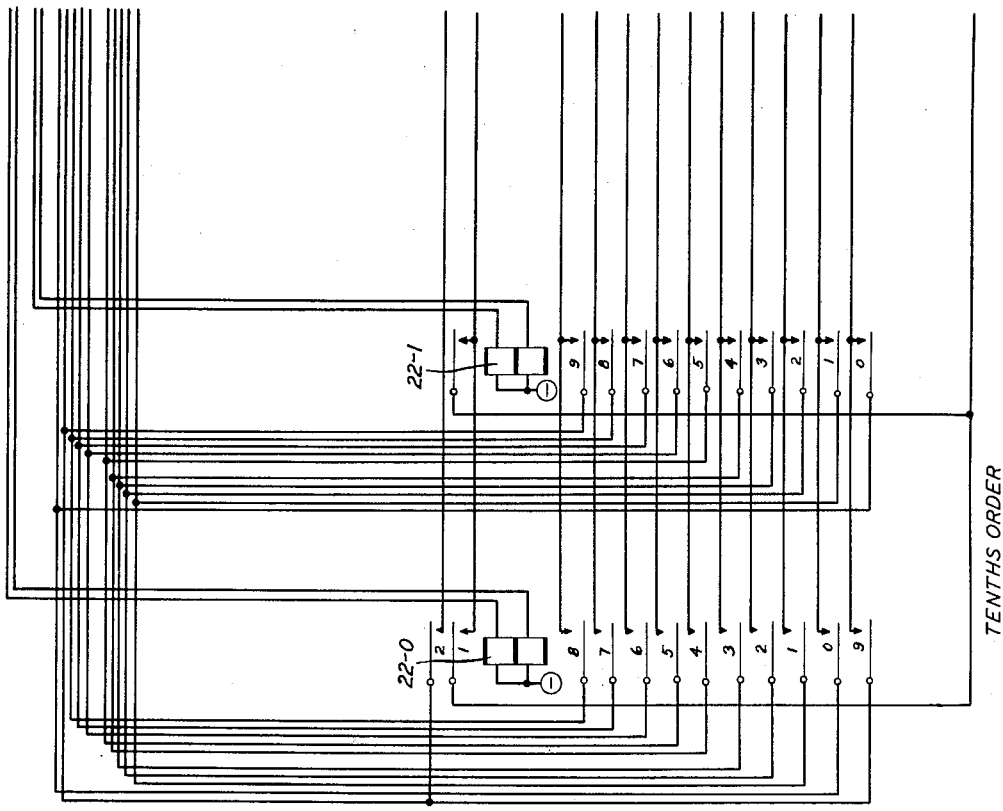
Figure 23:
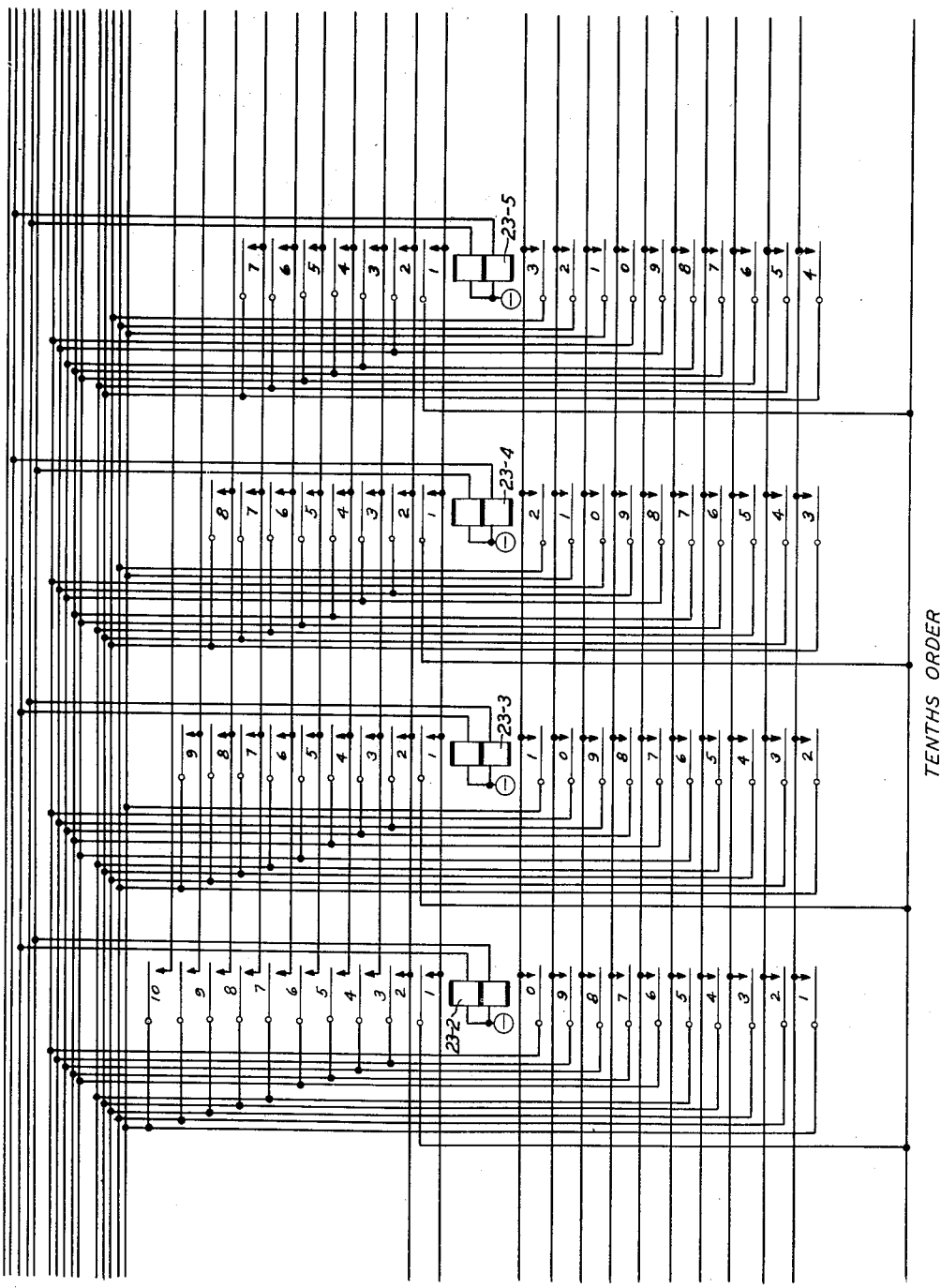
Figure 24:
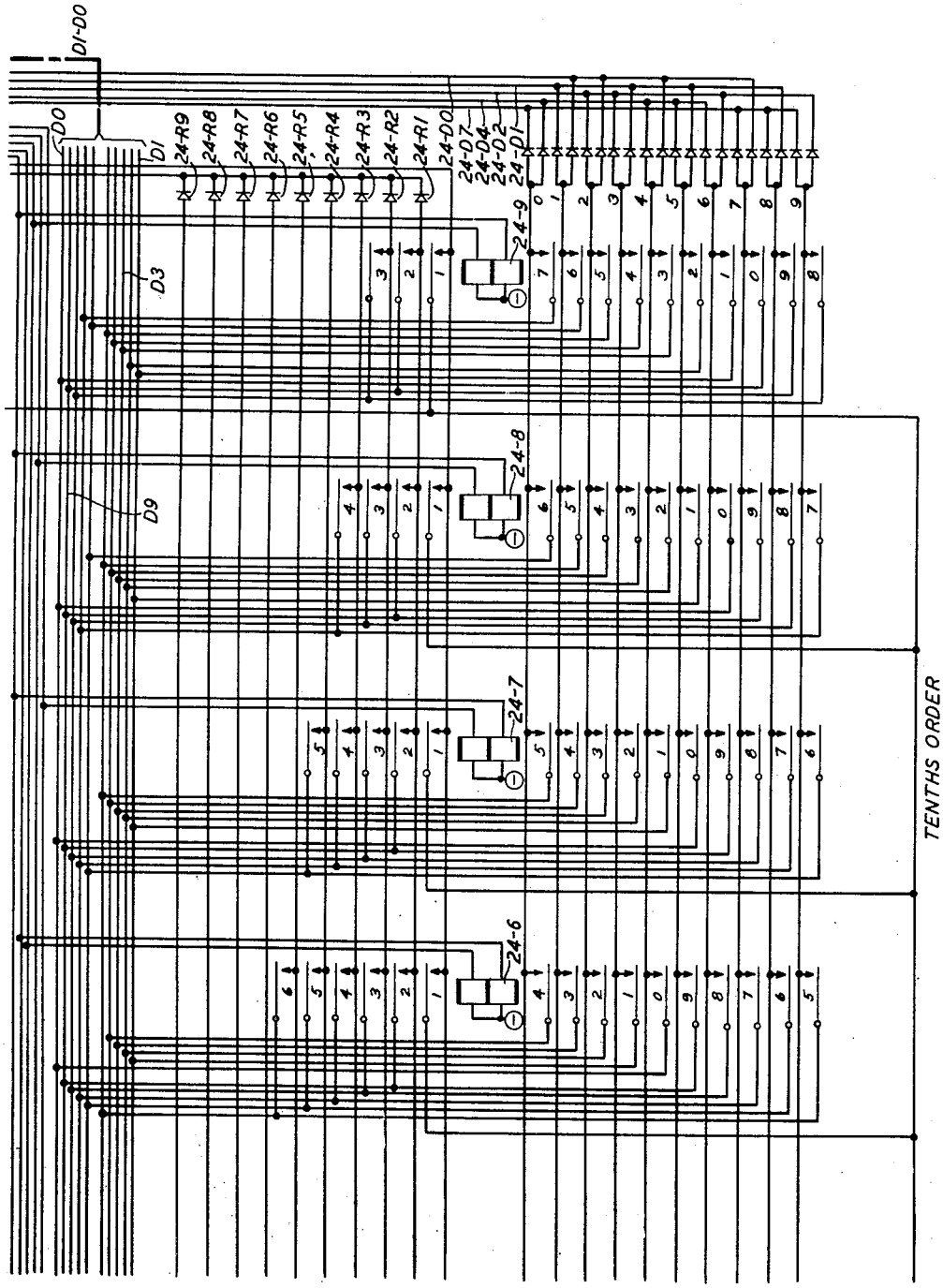

The tenths digit of 3 in the answer time causes the D reader pin contacts to apply a ground to lead D3 in the group of leads designated D1-D0 beginning on Fig. 4 and ending on Fig. 24. This ground on lead D3 is extended through contacts 3 of relay 23-5 operated, through the pair of diode rectifiers designated 0 to leads 24-D4 and 24-D7. The tenths order of the computer, shown in Figs. 22 through 24, is designed so that it will subtract 2 from the arithmetical difference between the tenths digit of the disconnect time and the tenths digit of the answer time. The arithmetical difference between the digit 5 in the tenths order of the disconnect time and the digit 3 in the tenths order of the answer time is 2. From this value of 2 this order of the computer subtracts 2, leaving an answer of 0.

The tenths order of the computer always subtracts two-tenths of a minute from the computed elapsed conversation time in order to give the calling subscriber an allowance for the short period of time required by the perforator recorders in the central office to perforate the answer and disconnect time for his call.

The ground potential on leads 24–D4 and 24–D7 is extended through make contacts 2 and 1, respectively, of relay COM, through contacts 12 and 11, respectively, of relay T0, through contacts 1 and 0, respectively, of relay U0, to the windings of relays 18–D4 and 18–D7, respectively, which now operate and lock over the ground furnished from the break contacts of relay SER. Operated relays 18–B0, 18–B2, 18–C0, 18–C2, 18–D4, and 18–D7 in register 00 manifest an adjusted chargeable conversation time of 22.0 minutes.

It has just been described how the chargeable conversation time of 22.0 minutes is computed when the disconnect entry is 55.5 and the answer entry is 33.3. In order to illustrate certain other functions of the computer, let it be assumed, for the moment, that the answer entry for the call just described is 39.9 instead of 33.3 and that the disconnect time of 55.5 remains unchanged. This disconnect time is transferred from register 00 to the translator circuit wherein relays 11–B1, 11–B4, 11–C1, 11–C4, 11–D1, and 11–D4 are operated as before described. The operation of these six relays, in turn, operates relays 16–5, 20–5, and 23–5 in the three orders of the computer, also as before described.

The answer entry of 39.9 causes the D reader pin contacts, which read the tenths digit of the answer time, to apply a ground over wire D9, through contacts 9 bottom of relay 23–5 operated, to the pair of diodes designated 4 in Fig. 24, to wires 24–D4 and 24–D0. Again as before, this order of the computer makes an allowance of two-tenths of a minute in favor of the calling subscriber and, therefore, the tenths digit of the computed elapsed conversation time is 4 rather than 6. The ground potential on wires 24–D4 and 24–D0 is extended through the contacts of relay COM operated, relay T0 operated, and relay U0 operated, in a manner similar to that already described, to operate relays 18–D4 and 18–D0.

The ground on lead D9 is also extended through contacts 2 top of relay 23–5, through diode rectifier 24–R1, to the winding of relay 21–11, which now operates. The operation of relay 21–11 performs a "borrow 1" operation in a manner described hereinafter.

The answer time entry of 39.9 causes the contacts associated with the C portion of the reader to extend a ground over wire C9, from Fig. 4 to Fig. 21, through contacts 9 bottom of relay 20–5, through make contacts 5 of relay 21–11, through the two diodes connected thereto, to wires 21–C4 and 21–C1. The ground potential through these two diodes manifests in the two-out-of-five code, the digit 5 as the units digit of the chargeable conversation time. The contacts of relay 21–11 operated cause the units digit of the computed chargeable conversation time to be reduced by the value of 1 to the next lower numerical value. For instance, if relay 20–11 was not operated at this time, the ground from relay 20–5 would be applied to contacts 6 rather than contacts 5 of relay SHT. However, since the tenths digit in the computer borrowed 1 from the units digit when subtracting 9 from 5, it is necessary that relay 21–11 in the units order be operated to reduce the normal numerical output of this order by a value of 1 to compensate for the borrowed 1. The ground potential on wires 21–C4 and 21–C1 is applied over the contacts of relays COM, T0 and U0 operated in a manner similar to that previously described, to operate relays 18–C4 and 18–C1 in register 00.

The ground potential on wire C9 in Fig. 21 is also extended through rectifiers 20–R5, through the contacts 2 top of relay 20–5 operated, to the winding of relay 17–11 which operated. The operation of relay 17–11 performs a "borrow 1" operation from the tens order of the computer in a manner described hereinafter.

The answer time of 39.9 contained in the entry now being read causes the contacts associated with the B portion of the reader to extend a ground over wire B3 from Fig. 4 to Fig. 17, through contacts 3 bottom of relay 16–5 operated, through make contacts 1 of relay 17–11 operated, through the two diode rectifiers connected thereto, to wires 17–B1 and 17–B0. The function of relay 17–11 is similar to the function of relay 21–11 in that the numerical output of the tens order of the computer is reduced by 1 when relay 21–11 is operated in order to compensate for the 1 borrowed by the units order in the subtracting 9 from 5.

The ground on wires 17–B1 and 17–B0 is extended through the contacts of relays COM, T0 and U0 operated, in a manner similar to that previously described, to operate relays 18–B1 and 18–B0 in register 00.

The operation of relays 18–B1, 18–B0, 18–C4, 18–C1, 18–D4, and 18–D0 in register 00 manifest a computed chargeable conversation time of 15.4 minutes for the assumed example wherein the disconnect entry time is 55.5 and the answer entry time is 39.9. This time of 15.4 includes an allowance of two-tenths of a minute made in favor of the calling subscriber.

The remainder of the circuit description will be made under the originally assumed conditions of a disconnect time of 55.5 and an answer time of 33.3, leaving an adjusted chargeable conversation time of 22.0 minutes in register 00 with relays 18–B0, 18–B2, 18–C0, 18–C2, 18–D4, and 18–D7 operated therein.

When computer relay 23–5 operates it closes a circuit to operate the release magnets RLS of rotary switches A, B, and C in Fig. 12. The path over which these magnets operate includes the following: ground on contacts 4 make of relay 18–B0, through contacts 4 break of relay 18–B1, through contacts 5 make of relay 18–B2, through contacts 4 break of relay 18–B4, through contacts 3 break of relay 18–B7, through contacts 3 make of relay 18–D7, through contacts 3 make of relay 18–D4, through contacts 3 break on relays 18–D2, 18–D1, and 18–D0, through contacts 3 break on relay 18–C7, through contacts 4 break on relay 18–C4, through contacts 5 make on relay 18–C2, through contacts 4 break of relay 18–C1, through contacts 4 make of relay 18–C0, through contacts 201 on relay U0, through contacts 31 on relay T0, through contacts 1 top on relay 23–5, through contacts 1 top on relay 20–5, through contacts 1 top of relay 16–5, to operate the release magnets RLS of rotary switches A, B, and C.

The above-described contacts in register 00 constitute what is commonly known as a two-out-of-five check circuit for each order of the register. This insures that a ground will be supplied to operate the release magnets on the rotary switches only if two relays in each of the B, C, and D sections of the register are operated. An examination of this circuit will show that this ground will not be supplied if a different number of relays are operated in any order of the register.

The operation of the RLS magnets releases switches A and B and causes them to return to their normal position. Rotary switch C is unaffected by the operation of its release magnet since it is already in a normal position. Relays TL0 and UL0 are also released.

The release of contacts 3 on relay TL0 removes the ground which held relay RBR (Fig. 7) operated so that it now releases and prepares a path to reconnect the E and F portions of the reader with relays T0 through T9 and U0 through U9. The release of rotary switches A and B causes wiper 2 on each switch to release relays T0 and U0, respectively, by opening the path over which they were held operated to the ground on the back contact of the release magnet RLS of each switch through make contacts 3 on relays TL0 and UL0, respectively.

The release of relays U0 and T0 opens the path over which relay INT in Fig. 18 was being held operated by the ground on contacts 3 break of relay BRC (Fig. 6)

thereby causing the release of relay INT. The closure of the back contacts of relay INT extends a ground through contacts 1 of relay B to operate relay BB, which locks over its contacts 3 make to a ground on the back contacts of relay RER. The operation of relay BB causes its contacts 1 break to remove the ground which was formerly supplied over contacts 3 make of relay B to various parts of the circuit, including relay COM (Fig. 6), the translator relays (Fig. 11), relay RMS (Fig. 12) and contacts of relays TL0 and UL0 in Fig. 12.

The release of relay COM breaks the circuit over which the relays in register 00 are interconnected with their corresponding relays in the translator circuit (Fig. 11), and reconnects the register relays to the contacts of relay STR in Fig. 6. The removal of the holding ground from the translator circuit (Fig. 11) as relay B releases, releases all the operated relays therein. The release of the translator relays in Fig. 11 releases relays 16–5, 20–5, and 23–5 in the computer.

The release of relay RMS (Fig. 12), in response to the removal of its holding ground, removes the ground which holds relay Step (Fig. 3) operated. As will be recalled, the operation of relay Step disabled the ratchet mechanism associated therewith so that the rotation of the reader motor does not advance the tape drum and the tape. Therefore, the release of relay Step, when relay RMS releases, re-engages the ratchet mechanism so that the rotation of the reader motor advances the tape drum and causes the tape to step to the next entry.

The entire circuit, with the exception of register 00, is now released and is in its normal condition. The operated relays in register 00 represent the chargeable conversation time. These relays remain in this condition until the reader encounters the initial entry for this particular call over trunk 00.

*Processing a two-line initial entry*

When relay Step is released, the tape drum and the tape advance and the machine processes the information contained in the succeeding tape entries. Nothing further of interest with respect to the present description occurs until an initial entry for trunk 00 is read. The assembler-computer may process many entries pertaining to other calls during the time interval between the processing of the answer entry for call 00 and the processing of the initial entry for the same call. The intervening entries on the tape contain information pertaining to calls established over other trunks during this time interval. If this time interval is short, the chances are remote that a completed call for another trunk will appear on the tape. If the time interval is long, there is a possibility that entries representing a complete call, or even a plurality of complete calls pertaining to one or more trunks, will appear on the tape between the answer entry for call 00 and the initial entry for the same call.

It is assumed for the purpose of discussion that the initial entry for the call handled by trunk 00 is a message unit two-line initial entry, as shown in Fig. 26B. This type of initial entry has in its first line an A digit of 2, and a B digit of 1. The E and F digits are 0 and represent the trunk number. The 2 in the C digit and 0 in the D digit are of no importance or significance to the present discussion.

The 0 in the E digit of the first line, which digit represents the tens digit of the trunk identity index, causes the contacts associated with the E reader pins to extend a ground through contacts 11 of relay RBR, to the winding of relay T0 which now operates. The operation of relay T0 causes its contacts to connect the winding of relays U0 through U9 with the F reader pin contacts. The operation of relay T0 also prepares a path over which register 00 is selectively interconnected with various portions of the circuit.

The 0 read by the F reader pins causes their contacts to extend a ground through contacts 1 of relay RBR, through contacts 1 of relay T0, to the winding of relay U0 which now operates. The operation of relay U0 interconnects register 00 with the rest of the circuit as hereinbefore described.

The operation of relays T0 and U0 closes a ground from break contacts 3 of relay BRC, through contacts 26 of relay T0, through contacts 15 of relay U0, to the winding of relay INT which now operates. The operation of relay INT closes a ground over its make contacts, through contacts 2 make of relays AA and BB, through contacts 2 break of relay CC, to the winding of relay C, which now operates and locks over its contacts 2 make to the ground on the break contacts of relay RER. The operation of relay C extends a ground from back contacts 1 of relay CC, through make contacts 3 of relay C, through contacts 18 of relay U0, through contacts 29 of relay T0, to break contacts 3 on relay PE (Fig. 10) and to other relays in Fig. 10 to prepare a circuit that is described later.

Figure 10:
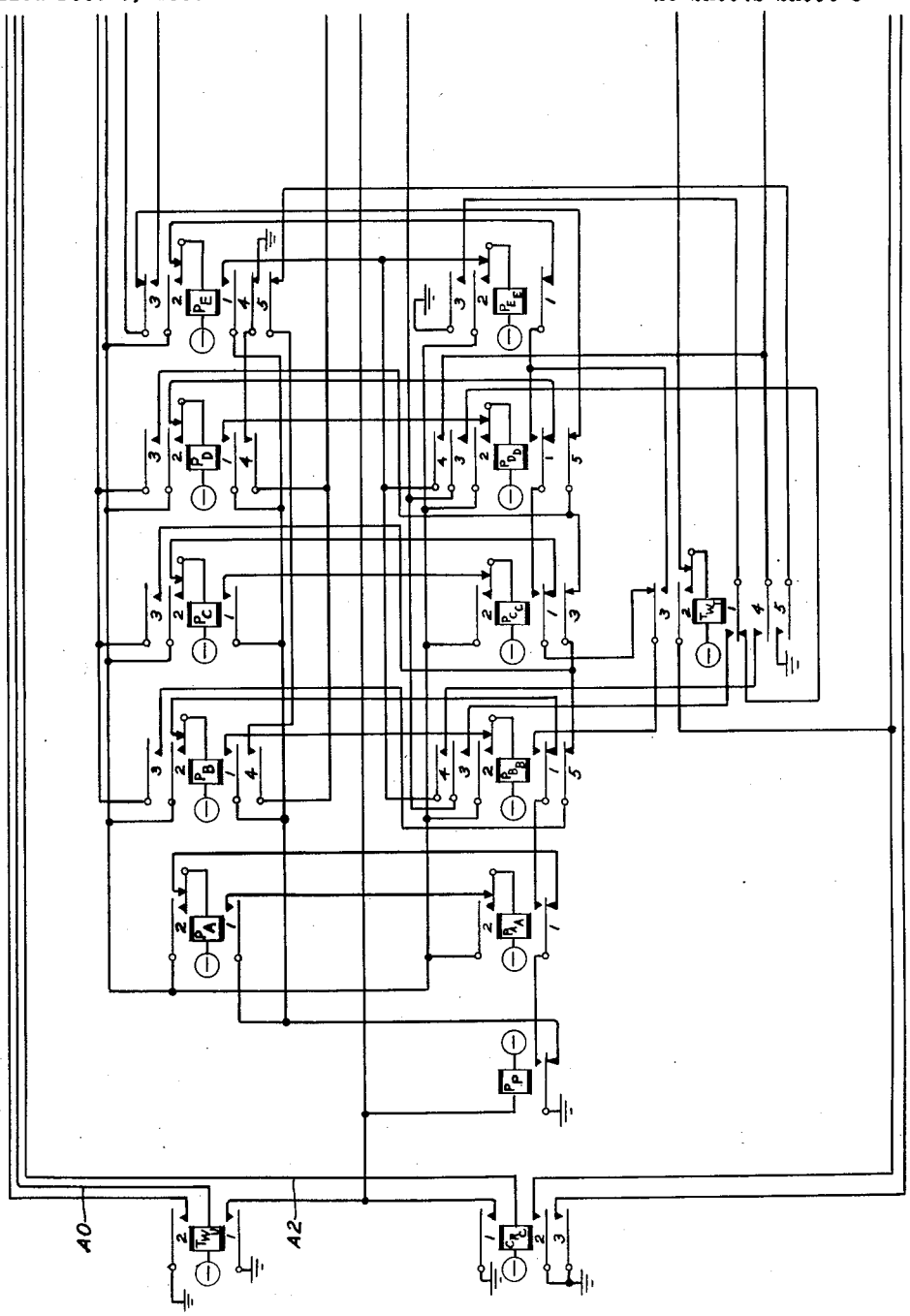

The digit 2 in the A section of the tape operates reader pin contacts A2, which extend a ground to operate relay CRC (Fig. 10). The digit 1 in the B section of the tape extends ground from reader pin contacts A2, through reader contacts B0 and B1 to operate relay TWT (Fig. 10) which locks to ground on contacts 22 of relay RBR operated, and on contacts 2 of relay CRC. The operation of relay CRC extends a ground from its contacts 3 to the winding of relay RMS. The operation of relay RMS operates relay Step to stop the tape drum from advancing the tape.

This ground also extends to the stepper magnets of rotary switches A and B through the break contacts 1 of relays TL0 and UL0, respectively. Both of these switches begin to step on a self-interrupted basis by virtue of the break contacts on the stepper magnets and continue to rotate until the wiper for arc 1 of each switch meets a ground on one of its contacts. Rotary switch A stops in its position 0 by virtue of the ground placed on its contacts 0 by the E reader pin contacts which are now reading a 0 in the tens digit of the trunk identity index. This path extends from the E reader pin contacts, through contacts 11 of relay RBR, to the contacts 0 on rotary switch A. This ground is extended through wiper 1 to the winding of relay TL0 which operates and locks to the ground on the break contacts of the release magnet RLS of rotary switch A. The operation of break contacts 1 of relay TL0 deenergizes the stepping circuit for rotary switch A so that it remains in position 0.

The contacts associated with the F reader pins, which are now reading 0 for the units digit of the trunk identity index, extend a ground through contacts 1 of relay RBR through the contacts in position 0 arc 1 of the B rotary switch, to the winding of relay UL0, which operates and locks to ground on the break contacts of release magnet RLS associated with the B rotary switch. The operation of break contacts 1 of relay UL0 breaks the path over which the step magnet of switch B was operated, thereby leaving it in its 0 position.

Contacts 3 make on relay TL0 extend a ground over an obvious path to operate relay RBR, which disconnects the contacts associated with the E and F sections of the reader from the rotary switches A and B and from the registers shown in Figs. 18 and 25. This same ground is also extended to Fig. 10 where it provides a holding ground for certain relays whose operation is described later.

Relay CRC (Fig. 10) which operated from the ground extended from the A2 reader pin contacts, closes its contacts 1 to operate relay PP over an obvious path. The operation of relay PP extends a ground over its make contacts, through break contacts 1 of relay PAA to operate relay PA which locks to the ground supplied over make contacts 3 on relay TL0 (Fig. 12).

No further circuit action takes place as this particular line is being read and, as has already been described, relay RMS and relay Step release as the reader pins are withdrawn from the tape, thereby allowing the tape to advance one position so that the second line of the two-line initial entry is now in position to be read by the reader pin contacts.

The opening of reader pin A2 removes the ground that operated relay CRC, thereby releasing it and, in turn, relay PP. The release of relay PP supplies a ground over its back contacts, through make contacts 1 on relay PA to operate relay PAA, which locks to the ground supplied through the make contacts 3 of relay TL9 from the break contact of the release magnet for rotary switch A.

The digit 0, which is contained in the A position of the second line as shown in Fig. 26B, causes the contacts associated with the reader pins 0 to extend a ground to operate relay SMS in Fig. 12 and relay TWU in Fig. 10. The operation of relay TWU closes a ground from its make contacts 1 to operate relay PP. The operation of relay PP closes a ground over its make contacts, through make contacts 1 of relay PAA, through break contacts 1 of relay PBB, to operate relay PB, which locks to the same ground holding relay PA operated. The ground from the reader pin contacts A0 is also extended through break contacts 5 of relay BRC (Fig. 6), through break contacts 1 of relay US0 to the step magnet associated with rotary switch C.

Relay SMS operated, locks through break contacts 4 of relay BRC, through make contacts 4 of relay PB, through break contacts 5 of relay PE, to the ground on make contacts 5 of relay TWT. The operation of relay SMS operates relay Step to prevent the tape and the tape drum from advancing.

The ground applied to the step magnet of rotary switch C causes it to commence a stepping action through the self-interrupting contacts on its step magnet. This action continues until the wiper for arc 1 of the switch finds a ground on its contacts. The contacts on arc 1 of this switch are connected to the F reader pin contacts so that a ground is placed on a particular contact when an F digit is read having a numerical value represented by the particular contact on arc 1.

Figure 5:
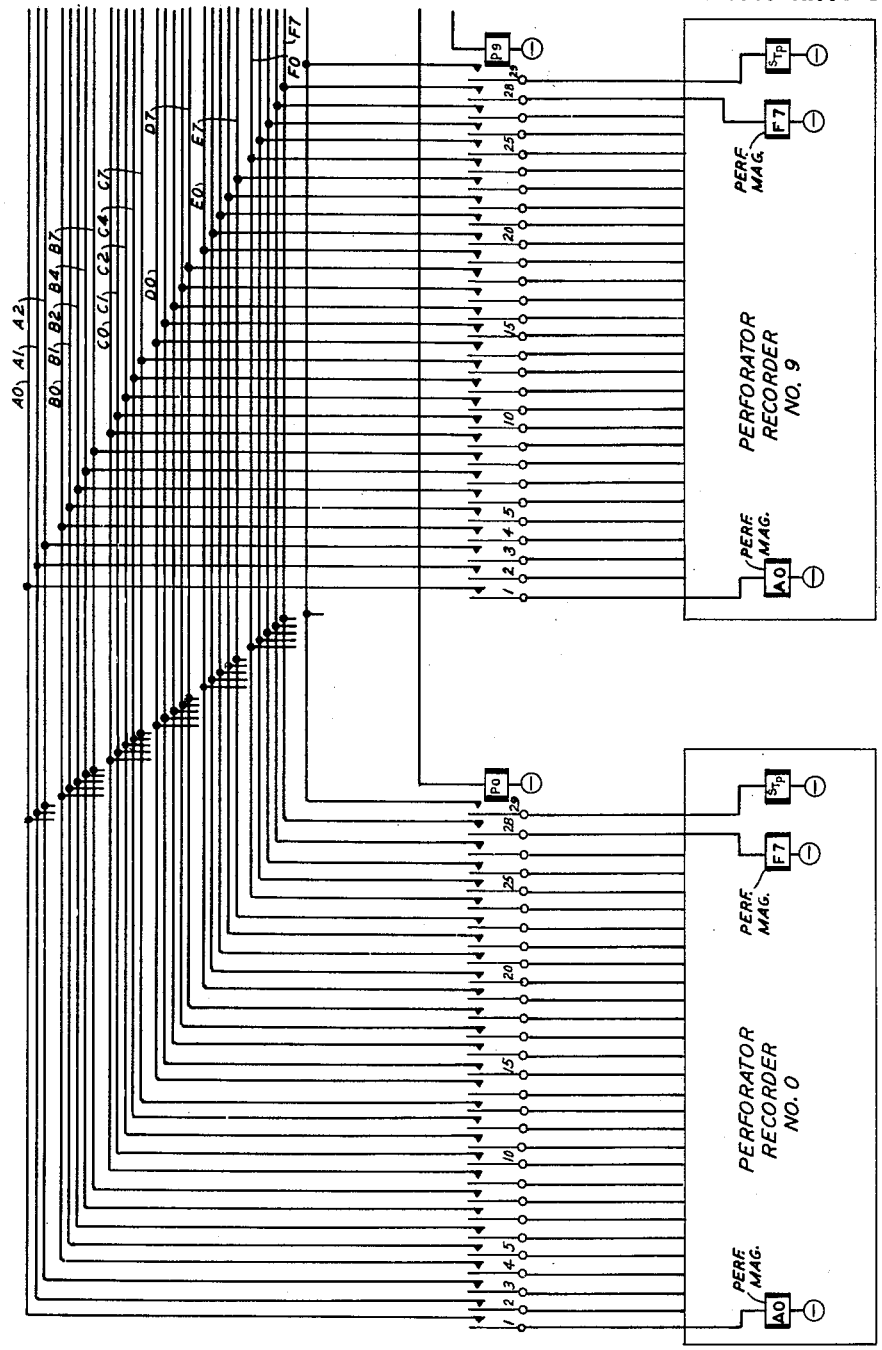
Fig. 5 shows ten output tape perforators.

The F digit in the second line of the two-line initial entry represents the units digit of the calling party's telephone number. Assuming this digit to be 9, a ground is now placed on contacts 9 on arc 1 of rotary switch C and, therefore, the step magnet for the rotary switch continues its stepping action until the wiper on arc 1 engages the ground on contacts 9. At this time the ground on contacts 9 is extended through arc 1, wiper 1 of the switch to the winding of relay US0 which now operates. The operation of break contacts 1 of relay US0 breaks the circuit over which step magnet of rotary switch C is energized thereby stopping the switch in its ninth position. Relay US0 operated locks over its contacts 2 make to the ground on the break contacts of the release magnet RLS of switch C. The operation of relay US0 extends a ground over its make contacts 3 to the arc 2 wiper of switch C which is now in its ninth position. This ground is further extended through the contact in position 9 to the winding of relay P9 of the perforator recorder No. 9 (Fig. 5). The operation of relay P9 prepares paths to interconnect perforator recorder 9 with the reader pin contacts.

The operation of relay PB closes a ground from break contacts 1 on relay CC (Fig. 18), through make contacts 3 on relay C, through contacts 18 of relay U0, through contacts 29 of relay T0, through break contacts 3 of relay PE in Fig. 10, through break contacts 5 of relay PDD, through break contacts 3 of relay PCC, through break contacts 5 of relay PBB, through make contacts 3 of relay PB, to the winding of relay XYZ (Fig. 3) which now operates and disconnects the reader pin contacts B—D from the contacts of relay RC1 and connects them to the input leads common to all the perforator recorders 1—9.

The operation of relay TWU by the A0 reader pins also extends a ground from its make contacts 1, through contacts 29 of relay P9 (Fig. 5), to the winding of relay STP in perforator recorder No. 9. The operation of this relay prepares a means to advance the recorder tape one step when relay STP releases.

The reader pin contacts are now closed through to their associated perforator magnets in perforator recorder No. 9 so that an exact duplicate of the second line of the input tape entry is now perforated on the output tape. The path over which the perforator magnets are operated includes ground on the operated pin contacts, through the associated contacts of relay XYZ operated, through the associated contacts of relay P9 operated, to the associated perforator magnets in perforator recorder No. 9.

When the reader pins disengage themselves from the tape perforations the reader pin contacts open and release the operated perforator magnets. The opening of reader pin contacts A0 removes the ground from the winding of relay TWU (Fig. 10) thereby releasing it. The release of contact 1 make of relay TWU removes the ground from the winding of relay PP thereby releasing it. Ground is now extended over the back contacts of relay PP, through make contacts 1 of relay PB to operate relay PBB which locks to the same ground that holds relay PA operated. The operation of break contacts 5 of relay PBB releases relay XYZ (Fig. 3) by removing the ground which was applied thereto through make contacts 3 on relay PB. The ground on break contacts 5 of relay PBB can be traced through break contacts 3 of relay PCC, through break contacts 5 of relay PDD, through break contacts 3 of relay PE, through make contacts 29 of relay T0, through make contacts 18 of relay U0, through make contacts 3 of relay C, to ground on break contacts 1 of relay CC. The opening of contacts 1 of relay TWU removes ground from relay STP in perforator recorder No. 9 to release it. The release of relay STP in said perforator causes the perforator tape associated therewith to advance one step.

The input tape does not step at this time since relay SMS is held operated over the path hereinbefore described to ground on contact 5 of relay TWT.

The reader pin contacts reclose as their associated reader pins reenter the perforations on the tape. The reclosure of reader pin contacts A0 extends a ground to reoperate relay TWU whose contacts 1 close a ground to reoperate relay PP. The reoperation of relay PP extends a ground over its make contacts, through make contacts 1 of relays PAA and PBB, through make contacts 3 of relay TWT, through break contacts 1 of relay PEE, to operate relay PE, which locks to the same ground that holds relay PA operated. The operation of relay TWU also extends a ground from its make contacts 1 to operate relay STP in perforator recorder No. 9. The operation of make contacts 3 of relay PE closes a ground from break contacts 1 of relay CC, through make contacts 3 of relay C, through make contacts 18 of relay U0, through make contacts 29 of relay T0, through make contacts 3 of relay PE to operate relay STR. The operation of relay STR interconnects the register relays in Fig. 18 to the perforator magnets of recorder No. 9 through the contacts of relay P9 operated.

Remembering that the chargeable conversation time of 22.0 minutes is manifested by the operated relays 18–B0, 18–B2, 18–C0, 18–C2, 18–D4, and 18–D7 in register 00, a ground is now closed through the winding of relay SER, through make contacts 2 on operated relays 18–B0, 18–B2, 18–C0, 18–C2, 18–D4, and 18–D7, through contacts 14, 12, 9, 7, 1, and 0, respectively, of relay U0, through contacts 25, 23, 20, 18, 12, and 11, respectively, of relay T0 operated, through contacts 15, 13, 10, 8, 2, and 1, respectively, of relay COM normal, through contacts 15, 13, 10, 8, 2, and 1, respectively, of relay STR operated, through contacts 14, 16, 19, 21, 27, and 28, respectively, of relay P9 operated, through the windings of the associated perforator magnets (not shown) in perforator recorder No. 9, to battery. This above-described circuit causes the six operated perforator recorder magnets to perforate the chargeable conversation time of 22.0 minutes in the D, E, and F sections, respectively, of the output tape. The perforator magnets associated with the A, B, and C sections of the output tape are not energized at this time and therefore no perforations are made in these sections of the tape.

The above-described paths over which the various perforator magnets operate cause a sufficient quantity of current to flow through the winding of relay SER so that it operates and, by means of its break contacts, opens the holding path for the operated registered relays in register 00 which now release.

An examination of the output tape in perforator recorder No. 9 shows that two lines have now been perforated therein. The first line is an exact duplicate of the second line of the initial entry while the second line has no perforations in its A, B, and C sections, but does have the chargeable conversation time perforated in its D, E, and F sections. These two lines of the output entry contain all the information pertaining to a call that is needed by the succeeding machines in the processing plan. This information includes the calling line number in the first line and the chargeable conversation time in the second line.

The reader pins now disengage themselves from the tape perforations and release the reader pin contacts associated therewith. The opening of reader pin contacts A0 releases relay TWU which, in turn, releases relay PP. The opening of contacts 2 of relay TWU releases relay SMS (Fig. 12). The release of relay SMS releases relay STEP which allows the tape and the tape reader to step.

The release of relay PP extends a ground over its back contacts, through make contacts 1 of relay PE, to operate relay PEE which locks to the same ground holding relay PA operated. The closure of contacts 3 of relay PEE extends a ground therefrom through make contacts 1 of relay TWT, through make contacts 3 of relay PBB, to the windings of the release magnets RLS in Fig. 12, all of which now operate and release the switches associated therewith. The operation of the release magnets releases relays TL0, UL0, and US0.

The release of relay TL0, as the release magnet associated therewith operates, removes the ground from its contacts 3 make which, in turn, remove the holding ground for relays PA, PAA, PB, PBB, PE, and PEE, thereby releasing them. The release of relay PE releases relay STR. The release of rotary switch A also releases relay T0. The release of rotary switch B releases relay U0. The release of relays T0 and U0 releases relay INT which, in turn, closes a ground over its back contacts through make contacts 1 of relay C to operate relay CC which locks over its contacts 3 make to ground on the back contacts of relay RER. The operation of relay CC closes a ground through the contacts 4 make of relays AA, BB, and CC to operate relay RER whose break contacts open and release relays A, B, C, AA, BB, and CC by opening their holding paths. The release of relay TL0 also releases relay RBR which, in turn, opens its contacts 21 which release relay TWT. Relay STP in recorder No. 9 releases when contacts 1 make of relay TWU open. The release of relay STP allows the recorder tape to step one step. The release of rotary switch C releases relay P9, thereby restoring recorder No. 9 to normal.

The above description of this call assumes that the units digit of the calling party's number is 9 and therefore the output entry is perforated in recorder No. 9. If the units digit of the calling party's number had been a digit other than a 9, the output entry would have been perforated by another one of the ten perforators.

All the relays are now released, with the exception of the relays in registers 01 through 99 serving other calls, and the machine, including register 00, is now ready to process additional calls. All of the other calls processed by the machine are similarly distributed to one of the ten perforators 0 through 9 in accordance with the units digit of the calling number so that at the end of the processing of a single input tape, the machine will have computed the chargeable conversation time for each call and will have distributed its output entries on to ten different tapes. These ten output tapes are removed from the perforators and spliced together in an ascending consecutive numerical sequence beginning with tape 0 for processing by further automatic message accounting machines.

*Processing a four-line initial entry*

The description so far has assumed that the initial entry of the call being processed was of the two-line type as shown in Fig. 26B. Such entries represent message unit calls or, as they are more commonly referred to, local calls. In order to describe certain additional features of the present invention, the operation of the machine will now be described in connection with the processing of a four-line initial entry of the type shown in Fig. 26A of the drawings. This type of entry represents a toll call to an area identified by a single digit.

The disconnect and answer entries for this call are no different than those of the local call previously described and, therefore, this portion of the description will not be repeated since the operation of the machine in processing these two entries has already been described. Therefore, the description for this type of call will begin at the point where the first line of the four-line initial entry is read by the reader. This line has an A digit of 2 and a B digit of 3. The A digit of 2 indicates that the entry now being read is an initial entry, while the B digit of 3 indicates that the entry now being read is a four-line initial entry rather than a two-line initial entry. The C and D digits of the first line are of no importance or significance to the present discussion. The E and F digits of this line are both a zero, since it has been assumed that this call was made over trunk 00.

The E digit of 0, which represents the tens digit of the trunk identity index, causes the E reader pin contacts to extend a ground through contacts 11 of relay RBR to operate relay T0. The operation of relay T0 interconnects the windings of relays U0 through U9 with the F reader pin contacts and also prepares a path over which register 00 is selectively interconnected with various portions of the circuit.

The 0 in the F portion of the tape, which represents the units digit of the call identity index, causes the F reader pin contacts to operate and extend a ground through contacts 1 of relay RBR through contacts 1 of relay T0 to operate relay U0. The operation of relay U0 completes a path to interconnect register 00 with the rest of the circuit. The operation of relays T0 and U0 closes a ground from back contacts 3 of relay BRC, through contacts 26 on relay T0, through contacts 15 on relay U0 to operate relay INT. The operation of relay INT closes a ground over its make contacts, through contacts 2 make of relays AA and BB, through contacts 2 break of relay CC to the winding of relay C, which operates and locks over its contacts 2 make to the ground on the break contacts of relay RER. The operation of relay C extends a ground from the back contacts 1 of relay CC, through make contacts 3 of relay C, through contacts 18 of relay U0, through contacts 29 of relay T0, to break contacts 3 of relay PE to prepare a circuit that is described hereinafter.

The A digit of 2 operates reader pin contacts A2 which extend a ground to operate relay CRC in Fig. 10. The operation of relay CRC extends a ground from its contacts 3 to the winding of relay RMS which now operates. This ground is also extended at this time to the stepper magnets of rotary switches A and B through break contacts 1 of relays TL0 and UL0, respectively. Both of these switches now commence a stepping action in the manner described hereinbefore. Relays TL0 and UL0 operate as their associated switches respectviely encounter the ground on the 0 terminal supplied from the E and F reader pin contacts, which are now reading the trunk identity index 00 for this call. Relays TL0 and UL0 operated lock and stop the stepping action of their associated switch in a manner described in connection with the processing of the two-line initial entry.

Contacts 3 make of relay TL0 operated extend a ground over an obvious path to operate relay RBR (Fig. 7) which disconnects the E and F reader pin contacts from the rotary switches A and B and also from the registers (Figs. 18 and 25). The same ground is also extended to Fig. 10 where it provides a holding ground for certain relays whose operation is described later.

The operation of relay RMS operates relay Step which stops the tape and tape drum of the reader from advancing.

Relay CRC (Fig. 10), which operated from the ground extended from the A2 reader pin contacts, closes its contacts 1 to operate relay PP over an obvious path. The operation of relay PP extends a ground over its make contacts, through break contacts 1 of relay PAA, to operate relay PA, which locks to the ground supplied over make contacts 3 of relay TL0 (Fig. 12).

No further circuit action takes place as this line is read and, as has already been described, relay CRC, relay RMS, and relay Step release as the reader pin contacts are withdrawn from the tape, thereby allowing the tape to advance one step so that the second line of the four-line initial entry for this call is now in position to be read by the reader pin contacts. The release of relay CRC releases relay PP which, in turn, supplies a ground over its back contacts, through contacts 1 make of relay PA to operate relay PAA, which locks to the ground supplied through the make contacts of relay TL0.

The digit 0, which is contained in the A position of the second line of the entry as shown in Fig. 26A, causes the contacts associated with the reader pin A0 to extend a ground to operate relay SMS in Fig. 12 and relay TWU in Fig. 10. The operation of relay TWU closes a ground from its make contacts 1 to operate relay PP. The operation of relay PP closes a ground over its make contacts, through make contacts 1 of relay PAA, through break contacts 1 of relay PBB, to operate relay PB, which locks to the same ground holding relay PA operated. The ground from the reader pin contact A0 is also extended through break contacts 5 of relay BRC (Fig. 6), through break contacts 1 of relay US0 to the step magnet associated with rotary switch C.

Relay SMS operated locks to the ground on make contacts 2 of relay TWU. The operation of relay SMS operates relay Step which prevents the tape drum from advancing the tape.

The ground applied to the step magnet of rotary switch C causes the switch to commence a stepping action through the self-interrupting contacts on its step magnet. This action continues until the wiper for arc 1 of the switch finds a ground. The contacts on arc 1 of this switch are connected to the F reader pin contacts so that a ground is placed on a particular contact when an F digit is read having the same numerical value as the contact.

The F digit in the second line of the four-line initial entry represents the units digit of the calling party's telephone number. Assuming this digit to be 9, a ground is now placed on contacts 9 on arc 1 of rotary switch C and, therefore, the step magnet for the rotary switch continues its stepping action until the wiper on arc 1 engages the ground on contacts 9. At this time the ground on contacts 9 is extended through arc 1, wiper 1 of the switch to the winding of relay US0 which now operates. The operation of break contacts 1 of relay US0 breaks the circuit over which step magnet of rotary switch C is energized and thereby stops the switch in its ninth position. Relay US0 operated locks over its contacts 2 make to the ground on the break contacts of the release magnet RLS for switch C. The operation of relay US0 also extends a ground over its make contacts 3 to the arc 2 wiper of switch C which is now in its ninth position. This ground is further extended through the contact in position 9 to the winding of relay P9 of the perforator recorder No. 9 (Fig. 5). The operation of relay P9 prepares paths to interconnect perforator recorder No. 9 with the reader pin contacts.

The operation of relay PB closes a ground from break contacts 1 on relay CC (Fig. 18), through make contacts 3 on relay C, through contacts 18 on relay U0, through contacts 29 on relay T0, through break contacts 3 on relay PE, through break contacts 5 on relay PDD, through break contacts 3 on relay PCC, through break contacts 5 on relay PBB, through make contacts 3 on relay PB, to the winding of relay XYZ (Fig. 3) which now operates and disconnects the reader pin contacts B—D from the contacts of relay RC1 and connects them to the input leads of the perforator recorder.

The operation of relay TWU by the A0 reader pin contact also extends a ground from its make contacts 1, through contacts 29 of relay P9 (Fig. 5) to the winding of relay STP in perforator recorder No. 9. The operation of this relay prepares a means to advance the recorder tape one step when it releases.

The reader pin contacts are now closed through to their associated perforator magnets in perforator recorder No. 9 so that an exact duplicate of the second line of input tape entry is now perforated on the output tape. The path over which the perforator magnets are operated includes ground on the operated reader pin contacts, through the associated contacts of relay XYZ operated, through the associated contacts of relay P9 operated, to the associated perforator magnets in perforator recorder No. 9.

The reader pin contacts open and release the operated perforator magnets when the reader pins disengage themselves from the tape perforations. The opening of reader pin contact A0 removes the ground from the winding of relay TWU (Fig. 10) thereby releasing it. The release of contacts 1 make of relay TWU removes the ground from the winding of relay PP thereby releasing it. Ground is now extended over the back contacts of relay PP, through make contacts 1 of relay PB to operate relay PBB, which locks to the same ground that holds relay PA operated. The operation of break contacts 5 of relay PBB releases relay XYZ (Fig. 3) by removing the ground which was applied thereto through make contacts 3 on relay PB. The ground on break contacts 5 of relay PBB can be traced through break contacts 3 of relay PCC, through break contacts 5 of relay PDD, through break contacts 3 of relay PE, through make contacts 29 of relay T0, through make contacts 18 of relay U0, through make contacts 3 of relay C, to ground on break contacts 1 of relay CC. The opening of contacts 1 of relay TWU removes ground from relay STP in perforator recorder No. 9 to release it. The release of relay STP causes the perforator tape associated therewith to advance one step.

The opening of contacts 2 of relay TWU removes the ground holding relay SMS (Fig. 12) operated so that it now releases and, in turn, releases relay Step to advance the input tape one step.

The reader pin contacts reclose as their associated reader pins reenter perforations on the next line of the tape, which is the third line of the entry. The reclosure of reader pin contact A0 extends a ground to reoperate relay TWU whose make contacts 1 close a ground to reoperate relay PP. The reoperation of relay PP extends a ground over its make contacts, through make contacts 1 of relay PAA and PBB, through break contacts 3 of relay TWT, through break contacts 1 of relay PCC to operate relay PC. Relay PC operated locks to the same ground holding relay PA operated.

The reclosure of reader pin contact A0 also extends ground over one obvious circuit to operate relay SMS (Fig. 12) which, in turn, operates relay Step to prevent the input tape from stepping while the current line is being read. Relay SMS operated locks to ground on contacts 2 of relay TWU operated.

The operation of relay PC closes a ground over its make contacts 3 to operate relay XYZ. The ground on contacts 3 of relay PC may be traced back through break contacts 3 of relay PCC, through break contacts 5 of relay PDD, through break contacts 3 of relay PE, to the ground on break contacts 1 of relay CC in a manner similar to that hereinbefore described in connection with the operation of relay XYZ in response to the operation of relay PB.

The closure of contacts 1 of relay TWU operates relay STP in perforator recorder No. 9 in a manner previously described. The operation of relay STP prepares means to advance the recorder tape when relay STP releases.

The various perforator magnets in perforator recorder No. 9 are now interconnected through the contacts of relay XYZ to the associated reader pins so that an exact duplicate of the third line initial entry now being read is perforated as a second line of the output entry.

The reader pins now withdraw from the tape perforations and release the associated reader pin contacts. The release of reader pin contact A0 releases relay TWU which, in turn, releases relay PP. The release of contacts 1 of relay TWU also releases relay STP in perforator recorder No. 9 thereby allowing its output tape to advance one step. The release of the operated B, C, D, E, and F reader pin contacts releases the operated perforator magnets in the perforator recorder.

The release of relay PP closed a ground through make contacts 1 of relay PC to operate relay PCC, which locks to the same ground holding relay PA operated. The operation of contacts 3 of relay PCC removes the ground formerly supplied through contacts 3 of relay PC to relay XYZ thereby releasing it. The release of contacts 2 of relay TWU releases relay SMS which, in turn, releases relay Step thereby allowing the reader input tape to advance one line so that it now prepares to read the fourth line of the initial entry.

The reader pins now reenter the perforations on the fourth line of the entry and thereby reclose the reader pin contacts. The reclosure of reader pin contact A0 reoperates relay TWU, the reoperation of which reoperates relay STP in perforator recorder No. 9 and relay PP (Fig. 9) in a manner hereinbefore described. The reoperation of relay PP closes a ground over its make contacts, through make contacts 1 on relays PAA and PBB, through break contacts 3 on relay TWT, through make contacts 1 on relay PCC, through break contacts 1 on relay PDD, to operate relay PD, which locks to the same ground holding relay PA operated.

The reoperated reader pin contact A0 also recloses a ground to reoperated relay SMS and, in turn, relay Step in a manner hereinbefore described, which prevents the input tape from stepping. Relay SMS operated locks, as before, to ground on contacts 2 of relay TWU operated.

Relay PD operated closes a ground over its make contacts 3 to operate relay XYZ. The ground on contacts 3 of relay PD may be traced back through break contacts 5 of relay PDD, to break contacts 3 of relay PE, to the ground on break contacts 1 of relay CC in the manner hereinbefore described in connection with the operation of relay XYZ in response to the operation of relay PB. The operation of relay XYZ interconnects the perforator magnets and perforator recorder No. 9 with the various reader pin magnets, so that an exact duplicate of the fourth line of the initial entry is reperforated as a third line of the output entry by the perforator recorder.

The reader pins now withdraw from the tape and release their operated reader pin contacts. Reader pin contact A0 opens and releases relay TWU and, in turn, relay PP in a manner described hereinbefore. The release of relay TWU releases relay STP in perforator recorder No. 9 so that the output tape advances one step. The release of relay PP closes a path over its back contacts, through make contacts 1 of relay PD, to operate relay PDD which locks to the ground holding relay PA operated.

Relay SMS does not release at this time since it is now being held over the following path: ground on break contacts 4 of relay PE, make contacts 4 of relay PD, break contacts 4 of relay BRC, to hold the contacts for relay SMS. Therefore, the input tape does not advance during the time the reader pins withdraw from the tape and then reenter it. The reclosure of reader pin contacts A0, when the reader pins reenter the perforations on the tape, reoperates relay TWU which, in turn, reoperates relay STP in perforator recorder No. 9 and relay PP, all in a manner as hereinbefore described. The reoperation of relay PP closes a ground from its make contacts, through make contacts 1 of relays PAA and PBB, through break contacts 3 of relay TWT, through make contacts 1 of relays PCC and PDD, through break contacts 1 of relay PEE, to operate relay PE, which locks to the same ground holding relay PA operated. The operation of relay PE closes a ground from break contacts 1 of relay CC, through break contacts 3 of relay C, through make contacts 18 of relay U0, through contacts 29 of relay T0, through make contacts 3 of relay PE, to operate relay STR (Fig. 6). The operation of relay STR interconnects the register relays (Fig. 18) to the perforator magnets of recorder No. 9 through the contacts of relay P9 operated.

Remembering that the chargeable conversation time of 22.0 minutes is manifested by the operated relays 18–B0, 18–B2, 18–C0, 18–C2, 18–D4, and 18–D7 in register 00, a ground is now closed through the winding of relay SER, through make contacts 2 on operated relays 18–B0, 18–B2, 18–C0, 18–C2, 18–D4, and 18–D7, through contacts 14, 12, 9, 7, 1, and 0, respectively, of relay U0, through contacts 25, 23, 20, 18, 12, and 11, respectively, of relay T0 operated, through contacts 15, 13, 10, 8, 2, and 1, respectively, of relay COM normal, through contacts 15, 13, 10, 8, 2, and 1, respectively, of relay STR operated, through contacts 14, 16, 19, 21, 27, and 28, respectively, of relay P9 operated, through the windings of the associated perforator magnets in perforator recorder No. 9 to battery. This above-described circuit causes the six operated perforator recorder magnets to perforate the chargeable conversation time of 22.0 minutes in the D, E, and F sections, respectively, of the output tape. The perforator magnets associated with the A, B, and C sections of the output tape are not energized at this time and therefore no perforations are made in these sections.

The above-described paths over which the various perforator magnets operate cause a sufficient quantity of current to flow through the winding of relay SER so that it operates and, by means of its break contacts, opens the holding path for the operated registered relays in register 00 which now release.

An examination of the output tape in perforator recorder No. 9 shows that four lines have now been perforated therein. The first three lines are exact duplicates of the second, third, and fourth lines, respectively, of the four-line initial entry. The fourth line of the output entry has no perforations in its A, B, and C sections, but it has the chargeable conversation time perforated in its D, E, and F sections. These four lines of the output entry contain all the information pertaining to a toll call that is needed by the succeeding machines in the processing plan.

The reader pins now disengage themselves from the tape perforations and release the reader pin contacts associated therewith. The opening of reader pin contact A0 releases relay TWU which, in turn, releases relay PP. The opening of contacts 2 of relay TWU releases relay SMS (Fig. 12). The release of relay SMS releases relay Step which allows the tape and the tape reader to step.

The release of relay PP extends a ground over its back contacts, through make contacts 1 of relay PE, to operate relay PEE which locks to the same ground holding relay PA operated. The closure of contacts 3 of relay PEE extends a ground through break contacts 1 of relay TWT, through make contacts 3 of relay PDD, to the windings of the release magnets RLS (Fig. 12), all of which now operate and release the switches associated therewith. The operation of the release magnets releases relays TL0, UL0, and US0.

The release of relay TL0, as the release magnet RLS associated therewith operates, removes the ground from its contacts 3 make, which, in turn, remove the holding ground for relays PA, PAA, PB, PBB, PC, PCC, PD, PDD, PE, and PEE thereby releasing them. The release of relay PE releases relay STR. The release of rotary switch A also releases relay T0. The release of rotary switch B releases relay U0. The release of relays T0 and U0 releases relay INT which, in turn, closes a ground over its back contacts through make contacts 1 of relay C to operate relay CC which locks over its contacts 3 make to ground on the back contacts of relay RER. The operation of relay CC closes a ground through contacts 4 make of relays AA, BB, and CC to operate relay RER, whose break contacts open and release relays A, B, C, AA, BB, and CC by opening their holding paths. The release of rotary switch A also releases relay RBR. Relay STP in recorder No. 9 releases when contacts 1 make of relay TWU open. The release of relay STP allows the recorder tape to step one step. The release of rotary switch C releases relay P9.

The above description of this call assumed that the units digit of the calling party's number is 9 and therefore the output entry is perforated in recorder No. 9. If the units digit of the calling party's number had been a digit other than 9, the output entry would have been perforated by another one of the ten perforators.

All the relays are now released, with the exception of the relays in registers serving other calls, and the machine, including register 00, is now ready to process additional calls. All of the other calls processed by the machine are similarly distributed to one of the ten perforators in accordance with the units digit of the calling number so that at the end of the processing of a single input tape, the machine will have computed the chargeable conversation time for each call thereon and will have distributed its output entries on to ten different tapes. These ten output tapes are removed from the perforators and spliced together in an ascending consecutive numerical sequence beginning with tape 0 for processing by further automatic message accounting machines.

Discard of a two-line initial entry

Provision is also made in this machine whereby it will discard either a two-line initial entry, as shown in Fig. 26B, or a four-line initial entry, as shown in Fig. 26A, if a calling subscriber completes the dialing for a call and then restores his receiver before the called party answers. In this situation, an initial entry is perforated on the central office tape in the usual manner, but no answer or disconnect entry is perforated for the incompleted call. Such calls are recognized by the assembler-computer by virtue of the fact that no disconnect or answer entry is read before the initial entry for the same call is read. This results in the associated register being unoperated when the initial entry is processed, instead of being operated in accordance with the computed chargeable conversation time. Accordingly, when the initial entry is encountered for a call for which the machine has not already processed a disconnect and an answer entry, certain circuits are energized to recognize the fact that the initial entry now being read represents an incompleted call and should be discarded.

When the reader pins engage the first line of the two-line initial entry, as shown in Fig. 26B, the closure of the reader pin contacts in the E and F sections of the tape operates relay T0 through contact 11 of relay RBR. Relay U0 operates in response to the operation of relay T0 from the ground supplied by reader pin contacts F4 and F7 operated, through contacts 1 of relay RBR, through contacts 1 of relay T0.

The reader pin contacts A2 close and supply a ground through contacts 30 of relay T0, through contacts 19 of relay U0, through break contacts 4 of relays A and B, to the winding of relay BRC to operate it. Relay BRC operated, locks the ground on contacts 21 of relay RBR when it operates. Contacts 3 of relay BRC operated prevent relay INT (Fig. 18) from operating by removing the ground from its operating path.

Reader pin contacts A2, B0, and B1 close by virtue of the digit 2 in the A portion of the tape and digit 1 in the B portion of the tape. Relay TWT (Fig. 10) operates in response to the closure of reader pin contacts B1, B0, and A2. Relay CRC (Fig. 10) operates from the ground supplied by reader pin contacts A2 operated. Contacts 2 of relay CRC operated supply a ground to hold relay TWT operated. Contacts 1 of relay CRC operated, operate relay PP, which, in turn, supplies a ground over its make contacts through break contacts 1 of relay PAA, to operate relay PA. The closure of contacts 3 of relay CRC supplies a ground to operate relay RMS which operates relay Step to prevent the input tape from advancing. This ground is extended through contacts 1 of relays TL0 and UL0 to initiate the stepping action of switches A and B, respectively. Assuming that this incompleted call was handled by trunk 00, rotary switches A and B step until they reach the contact in position 0 on their respective No. 1 banks, which contacts are supplied with a ground through the contacts of relay RBR from the reader pin contacts E4, E7, F4, and F7 operated. The ground on the 0 contacts of these switches operates relays TL0 and UL0 which halts their stepping action and lock operated over their make contacts 2 to the ground on the back contacts of the associated release relays RLS. A ground is now extended from the release magnet RLS of switch A, through make contacts 3 of relay TL0 to hold relay PA operated. This same ground also operates relay RBR. The operation of relay RBR supplies a ground over its contacts 21 to hold relay BRC, and through contacts 22 to hold relay TWT. The ground on the contacts of the release magnets RLS for switches A and B is extended through make contacts 3 of relays TL0 and UL0, respectively, through the contact in position 0 on arc 2 of their banks, to provide a holding ground for relays T0 and U0, respectively.

As the reader pins withdraw from the perforations on the tape they release their operated reader pin contacts. Reader pin contacts A2 release relay CRC. The release of this relay releases relay PP which, in turn, supplies a ground over its back contact through contacts 1 of relay PA operated to operate relay PAA. Relay PAA operated locks to the ground holding relay PA operated.

The release of relay CRC releases relay RMS which, in turn, releases relay Step to allow the input tape to advance one step.

As the reader pins enter the next line of the entry, reader pin contact A0 closes and operates relay TWU and relay SMS. Relay SMS operated operates relay Step to prevent the input tape from stepping. Relay TWU operated operates relay PP which, in turn, supplies a ground over its make contacts, through make contacts 1 of relay PAA, through break contacts 1 of relay PBB, to operate relay PB, which locks to the ground holding relay PA operated. Rotary switch C is prevented from stepping because contacts 5 of relay BRC are open to break its operating path.

Relays TWU and SMS release when the reader pin contact A0 withdraws from the tape. The release of relay SMS releases relay Step which allows the input tape to advance. Relay TWU released, releases relay PP which supplies a ground over its back contacts, through contacts 1 of relay PB operated to operate relay PBB. At this time a ground is extended from contacts 2 on relay BRC operated, through contacts 4 on relay TWT operated, through contacts 4 of relay PBB operated to operate relay PEE which locks operated to the ground holding relay PA operated. Ground is now extended from contacts 3 on relay PEE operated, through contacts 1 of relay TWT operated, through contacts 3 of relay PBB operated, to operate the release magnet for rotary switches A and B both of which now release. The operation of these release magnets also releases relays TL0 and UL0. The release of the two rotary switches releases relays T0 and U0.

Relay RBR, which was held operated from the ground on contacts 3 of relay TL0 operated, releases. Contacts 21 of relay RBR released release relay BRC. Contacts 22 of relay RBR released release relay TWT. Rotary switch A released removes the ground holding relays PA, PB, PAA, PBB, and PEE thereby and allows them to release. The entire circuit is in a normal condition and is ready to process additional entries on the tape.

Discard of a four-line initial entry

This portion of the specification describes how the circuit discards a four-line initial entry for an incompleted toll call. This entry, as shown in Fig. 26A of the drawings, contains an A digit of 2 and a B digit of 3 in the first line thereof. It is assumed that the incompleted call was served by trunk 00 and therefore the E and F digits of the first line are both 0.

Reader pin contacts A2 operated, operate relay CRC which operates relay PP and, in turn, relay PA in a manner hereinbefore described. The closure of contacts 3 of relay CRC operates relay RMS, which operates relay Step to prevent the tape from stepping. Relays T0 and U0 operate as has been previously described, from ground on the operated E and F reader pin contacts. The closure of reader pin contacts A2 also supplies a ground, as described in connection with the discard of a two-line initial entry, to operate relay BRC.

The closure of contacts 3 on relay CRC causes rotary switches A and B to step to their position 0, at which time relays TL0 and UL0 operate to stop the stepping action in the manner hereinbefore described. The operation of contacts 3 of relay TL0 supplies a ground from contacts on the release relay RLS of rotary switch A to operate relay RBR. Contacts 21 of relay RBR supply a ground to hold relay BRC operated. Contacts 11 and contacts 1 of relay RBR operated open the operation path for relays T0 and U0, respectively. Both of these relays, however, remain operated to the ground on contacts 0 in bank No. 2 of rotary switches A and B, respectively.

Reader pin contacts A2 release when the reader pins withdraw from the tape. The release of reader pin contacts A2 releases relay CRC which releases relay PP and, in turn, operates relay PAA in a manner described hereinbefore. The release of relay CRC also releases relay RMS, and, in turn, relay STEP so that the input tape can advance one step.

Reader pin contacts A0 closes as the reader pins read the second line of the four-line entry. Reader pin contacts A0 operated operates relay TWU which operates relay PP and, in turn, relay PB in a manner hereinbefore described. The closure of reader pin contact A0 operates relay SMS, which locks to ground on contacts 2 to the relay TWU operated.

Reader pin contacts A0 releases as the pin withdraws from the tape. The opening of the reader pin contacts releases relay TWU which releases relay PP and which, in turn, operates relay PBB in a manner hereinbefore described.

The release of relay TWU and the opening of reader pin contacts A0 releases relay SMS which, in turn, releases relay STEP so that the tape can advance one line.

Reader pin contacts A0 close when the reader pin reads the third line of the entry. The reclosure of these contacts reoperates relays TWU and SMS. Relay SMS operated locks to ground on contacts 2 of relay TWU operated and reoperates relay STEP to prevent the tape from advancing. Relay TWU operated operates relay PP which, in turn, operates relay PC in the manner hereinbefore described.

Reader pin contacts A0 release when the reader pins withdraw from the tape and, in doing so, release relays TWU and SMS. Relay SMS released, releases relay STEP so that the input tape can advance one step. Relay TWU released, releases relay PP which extends a ground over its back contacts, through contacts 1 of relay PC operated, to operate relay PCC, which holds to the same ground that holds relay PA operated.

Reader pin contacts A0 reclose as the fourth line of the enry is read and in doing so operate relays TWU and SMS which locks, as before, to relay TWU. Relay SMS reoperates relay STEP to prevent the input tape from advancing. Relay TWU reoperated reoperates relay PP which operates relay PD in a manner hereinbefore described. Relay PD operated locks to the ground holding relay PA operated.

Reader pin contacts A0 release when the reader pins withdraw from the fourth line of the entry and in doing so release relays TWU and SMS. Relay SMS releases relay STEP so that the input tape can advance. Relay TWU released, releases relay PP which extends a ground over its back contacts, through make contacts 1 of relay PD operated, to operate relay PDD, which locks to the ground holding relay PA operated. At this time a ground is extended from contacts 2 of relay BRC operated, through contacts 4 of relay PDD operated, to operate relay PEE, which locks to the ground holding relay PA operated.

At this time a ground is also extended from make contacts 3 of relay PEE, through back contacts 1 of relay TWT, through make contacts 3 of relay PDD, to operate the release magnets RLS of rotary switches A and B, both of which now release. The operation of these release magnets releases relays TL0 and UL0. The release of the rotary switches releases relays T0 and U0 as well as relay RBR. The release of contacts 21 of relay RBR releases relay BRC. The release of contacts 3 of relay TL0 releases relays PA, PB, PC, PD, PE, PAA, PBB, PCC, PDD, and PEE. All the relays are now unoperated and the machine is in a normal position to process the succeeding entries of the tape.

It is to be understood that the above-described arrangements are merely illustrative of the application of the principles of the invention. Numerous other arrangements may be devised by those skilled in the art without departing from the spirit and scope of the invention. For example, the present invention is not limited to use in a telephone system and could be used to process tapes from any source which perforates three separate tape entries pertaining to the same transaction or computation.

What is claimed is:

1. In a computer having a plurality of orders, input circuits comprising five wires in each order by means of which numerical data is supplied from each input circuit to its related order of the computer on a two-out-of-five code basis, a plurality of relays in said computer, there being ten of said relays in each order with each relay representing one digit in the series of digits 0 through 9, a pair of windings on each of said relays with each relay being operable only when both of its windings are energized, interconnections between the windings of the relays in each order and the five input wires for each order whereby the transmission of data on a two-out-of-five code basis over said five input wires in each order operates the one relay in each order that represents the digital value of the data transmitted over its associated input wires.

2. In combination, a register having a plurality of operating leads, a computer, means for entering a variable quantity A into said register by applying a potential of a certain polarity to a first combination of said operating leads, said first combination being determined by the magnitude of the quantity A, means for entering a variable quantity B into said computer, means for interconnecting said register and said computer whereby the register applies a potential of said certain polarity over said first combination of its operating leads to enter the quantity A into said computer, means in said computer for computing a quantity D by subtracting $B+C$ from A where C is a predetermined fixed quantity and means operable under control of said computer for entering said quantity D into said register by applying a potential of said certain polarity to a second combination of said plurality of operating leads, said second combination of operating leads being determined by the magnitude of the quantity D.

3. In combination, a register having a plurality of operating leads, a computer, means for entering a variable quantity A into said register by applying a potential of a certain polarity to a first combination of said operating leads, said first combination being determined by the magnitude of the quantity A, means for entering a variable quantity B into said computer, means for interconnecting said register and said computer whereby the register applies a potential of said certain polarity over said first combination of its operating leads to transfer the quantity A from said register to said computer, means in said computer for computing a quantity D by subtracting $B+C$ from A where C is a predetermined fixed quantity, and means operable under control of said computer for entering said quantity D into said register by applying a potential of said certain polarity to a second combination of said plurality of operating leads, said second combination of operating leads being determined by the magnitude of the quantity D.

4. In combination, a register comprising a plurality of storage means, a plurality of operating leads each of which is connected to a different storage means, a computer, means for entering a variable quantity A into said register by applying a potential of a certain polarity to a first combination of operating leads to operate the storage means associated with said first combination of operating leads, said first combination of leads being determined by the magnitude of the quantity A, means for entering a variable quantity B into said computer, means for interconnecting said register and said computer whereby the register applies a potential of said certain polarity over said first combination of operating leads to transfer the quantity A from said register to said computer and to release the operated storage means in said register, means in said computer for computing the quantity D by subtracting $B+C$ from A where C is a predetermined fixed quantity, and means operative under control of said computer for entering said quantity D into said register by applying a potential of said certain polarity over a second combination of said plurality of operating leads to operate the storage means associated with each of said second combination of operating leads, said second combination of operating leads being determined by the magnitude of the quantity D.

5. In a computer having a plurality of orders, an input circuit for each order comprising five wires in each order by means of which numerical data is supplied from each input circuit to its related order on a two-out-of-five code basis, a plurality of relays in said computer, there being ten of said relays in each order with each relay representing one digit in the series of digits 0 through 9, interconnections between the ten relays in each order and the five input wires for each order whereby the transmission of digital information over two-out-of-five wires in each order operates the one relay in each order that represents the value of the digital information transmitted over its related two-out-of-five wires, a second input circuit including ten wires for each order with each wire representing one digit in the series of digits 0 through 9, an output circuit for each order comprising ten wires whereby each wire represents one digit in the series of digits 0 through 9, means whereby a signal on a wire in the second input circuit in a plurality of said orders is transmitted through the contacts of said operated relay in each order to a wire in the output circuit for each of said plurality of orders that represents the numerical difference between the value of the digit applied to the said second input circuit and the value of the digit applied to said first input circuit for each of said plurality of orders.

6. In a computer having a plurality of orders, a first input circuit for each order comprising five wires in each order by means of which numerical data is supplied to each order on a two-out-of-five code basis, a plurality of relays in said computer, there being ten of said relays in each order with each relay representing one digit in the series of digits 0 through 9, interconnections between the ten relays in each order and the five input wires for each order whereby the transmission of digital information over two-out-of-five wires in each order operates the one relay in each order that represents the value of the digital information transmitted over its related two-out-of-five wires, a second input circuit including ten wires for each order with each wire representing one digit in the series of digits 0 through 9, an output circuit for each order comprising ten wires whereby each wire represents one digit in the series of digits 0 through 9, means whereby a signal on one wire in the second input circuit in a plurality of said orders is transmitted through the contacts of the operated relay in each order to one wire in the output circuit for said plurality of orders that represents the numerical difference between the value of the digit applied to said second input circuit and the value of the digit applied to said first input circuit for each of said plurality of orders, and means whereby a signal on one wire in the second input circuit for one of said orders is transmitted through the contacts of the operated relay in said one order to the one wire in the output circuit for said one order that represents the numerical difference between the value of the sum of the digit applied to the second input circuit for said one order plus a constant and the value of the digit applied to the first input circuit for said order.

7. In a record controlled accounting system adapted to record on an output medium the computed chargeable time of customer uses of facilities in response to the sensing of an input record containing data pertaining to (1) the time each use of said facilities commenced, (2) the time each use of said facilities terminated, (3) the identification of the particular facility utilized during each use, and (4) the identification of the customer for each use, said system including a computer and a plurality of registers with each register being individually associated with a different facility, means for sensing data on an input record, switching means operable in response to said sensing means sensing data pertaining to the time the use of a certain facility was terminated and to the identification of said certain facility to enter the data pertaining to the time said use was terminated into the register associated with said certain facility, additional switching means operable in response to said sensing means sensing data pertaining to the time the use of said certain facility commenced and to the identification of said certain facility to enter the data pertaining to the time said use commenced into said computer and to enter the data currently stored in said last-named register into said computer, means operable under control of said computer for computing the chargeable time for the use of said facility and for entering said chargeable time into said last-named register, additional means operable in response to said sensing means sensing data pertaining to the identification of the customer that utilized said certain facility and to the identification of said certain facility to record on an output medium both the chargeable time data entered in said last-named register and the data comprising the identification of said customer.

8. In a record controlled accounting system adapted to record on one of a plurality of output media the computed chargeable time of customer uses of facilities in response to the sensing of an input record containing data pertaining to (1) the time each use of said facilities commenced, (2) the time each use of said facilities terminated, (3) the identification of the particular facility utilized during each use, and (4) the identification of the customer for each use, the data pertaining to the identification of the customer comprising a plurality of digits, said system including a computer and a plurality of registers with each register being individually associated with a different facility, means for sensing data on an input record, switching means operable in response to said sensing means sensing data pertaining to the time the use of a certain facility was terminated and to the identification of said certain facility to enter the data pertaining to the time said use was terminated into the register associated with said certain facility, additional switching means operable in response to said sensing means sensing data pertaining to the time the use of said certain facility commenced and to the identification of said certain facility to enter the data pertaining to the time said use commenced into said computer and to enter the data currently stored in said last-named register into said computer, means operable under control of said computer for computing the chargeable time for the use of said facility and for entering said chargeable time into said last-named register, additional means operable in response to said sensing means sensing one of the digits comprising the identification of the customer that utilized said certain facility and in response to said sensing means sensing data pertaining to the identification of said certain facility for selecting one of said plurality of media in accordance with the value of said digit, and means responsive to the operation of said media selecting means for recording on said selected medium the chargeable time entered in said last-named register and the digits comprising the identification of said customer.

9. In a record controlled accounting system adapted to record on an output medium the computed chargeable time of customer uses of facilities in response to the sensing of an input record containing data pertaining to (1) the time each use of said facilities commenced, (2) the time each use of said facilities terminated, (3) the identification of the particular facility utilized during each use, and (4) the identification of the customer for each use, said system including a computer and a plurality of registers with each register being individually associated with a different facility, means for sensing data on an input record, switching means operable in response to said sensing means sensing data pertaining to the time the use of a certain facility was terminated and to the identification of said certain facility to enter the data pertaining to the time said use was terminated into the register associated with said certain facility, additional switching means operable in response to said sensing means sensing data pertaining to the time the use of said certain facility commenced and to the identification of said certain facility to enter the data pertaining to the time said use commenced into said computer and to enter the data currently stored in said last-named register into said computer, said computer including means for subtracting the time the use of said certain facility commenced from the time the use of said certain facility was terminated to obtain the duration of the use of said certain facility, further means in said computer for subtracting a previously fixed amount of time from the length of time said certain facility was used to obtain the chargeable time for which the customer that utilized said certain facility is to be billed, means operable under control of said computer for entering said chargeable time into said last-named register, additional means operable in response to said sensing means sensing data pertaining to the identification of the customer that utilized said certain facility and pertaining to the identification of said certain facility to record on an output medium both the chargeable time data entered in said last-named register and the data comprising the identification of said customer.

10. In a record controlled accounting system adapted to record on one of a plurality of output media the computed chargeable time of customer uses of facilities in response to the sensing of an input record containing data pertaining to (1) the time each use of said facilities commenced, (2) the time each use of said facilities terminated, (3) the identification of the particular facility utilized during each use, and (4) the identification of the customer for each use, the data pertaining to the identification of the customer comprising a plurality of digits, said system including a computer and a plurality of registers with each register being individually associated with a different facility, means for sensing data on an input record, switching means operable in response to said sensing means sensing data pertaining to the time the use of a certain facility was terminated and to the identification of said certain facility to enter the data pertaining to the time said use was terminated into the register associated with said certain facility, additional switching means operable in response to said sensing means sensing data pertaining to the time the use of said certain facility commenced and to the identification of said certain facility to enter the data pertaining to the time said use commenced into said computer and to enter the data currently stored in said last-named register into said computer, said computer including means for subtracting the time the use of said certain facility commenced from the time the use of said certain facility was terminated to obtain the duration of the use of said certain facility, further means in said computer for subtracting a previously fixed amount of time from the length of time said certain facility was used to obtain the chargeable time for which the customer that utilized said certain facility is to be billed, means operable under control of said computer for entering said chargeable time into said last-named register, additional means operable in response to said sensing means sensing one of the digits comprising the identification of the customer that utilized said certain facility and in response to said sensing means sensing data pertaining to the identification of said certain facility for selecting one of said plurality of media in accordance with the value of said digit, and means responsive to the operation of said media selecting means for recording on said selected medium the chargeable time entered in said last-named register and the digits comprising the identification of said customer.

11. In a record controlled accounting system adapted to record on an output medium the computed chargeable time of customer uses of facilities in response to the sensing of an input record containing data pertaining to (1) the time each use of said facilities commenced, (2) the time each use of said facilities terminated, and (3) the identification of the customer for each use, said system including a computer and a register, means for sensing data on an input record, switching means operable in response to said sensing means sensing data pertaining to the time the use of a certain facility was terminated to enter said last-named data into said register, additional switching means operable in response to said sensing means sensing data pertaining to the time the use of said certain facility commenced to enter said last-named data into said computer and to enter the data currently stored in said register into said computer, means operable under control of said computer for computing the chargeable time for which the customer that utilized said certain facility is to be billed for the use of said facility and for entering said chargeable time into said register, and additional means operable in response to said sensing means sensing data pertaining to the identification of said customer to record on an output medium both said last-named data and the chargeable time entered in said register.

12. In a record controlled accounting system including a computer adapted to compute the chargeable time of customer uses of facilities in response to the sensing on an input record containing data pertaining to (1) the time each use of said facilities commenced, and (2) the time each use of said facilities terminated, said system including a register, means for sensing data on an input record, switching means operable in response to said sensing means sensing data pertaining to the time the use of a certain facility was terminated to enter said last-named data into said register, additional switching means operable in response to said sensing means sensing data pertaining to the time the use of said certain facility commenced to enter said last-named data into said computer and to enter the data currently stored in said register into said computer, and means under control of said computer for computing the chargeable time for which the customer that utilized said certain facility is to be billed for the use of said facility and for entertaining said chargeable time into said register.

13. In a record controlled accounting system adapted to record on one of a plurality of output media the computed chargeable time of customer uses of facilities in response to the sensing of an input record containing data pertaining to (1) the time each use of said facilities commenced, (2) the time each use of said facilities terminated, and (3) the identification of the customer for each use, said data pertaining to the identification of the customer comprising a plurality of digits, said system including a computer and a register, means for sensing data on an input record, switching means operable in response to said sensing means sensing data pertaining to the time the use of a certain facility was terminated to enter said last-named data into said register, additional switching means operable in response to said sensing means sensing data pertaining to the time the use of said certain facility commenced to enter said last-named data into said computer and to enter the data currently stored in said register into said computer, means operable under control of said computer for computing the chargeable time for the use of said facility and for entering said chargeable time into said register, additional means operable in response to said sensing means sensing one of the digits comprising the identification of the customer that utilized said certain facility and in response to said sensing means sensing data pertaining to the identification of said certain facility for selecting one of said plurality of media in accordance with the value of said digit, and means responsive to the operation of said media selecting means for recording on said selected medium the chargeable time entered in said last-named register and the digits comprising the identification of said customer.

14. In a record controlled accounting system including a computer adapted to compute the chargeable time of customer uses of facilities in response to the sensing of an input record containing data pertaining to (1) the time each use of said facilities commenced, and (2) the time each use of said facilities terminated, said system including a register, means for sensing data on an input record, switching means operable in response to said sensing means sensing data pertaining to the time the use of a certain facility was terminated to enter said last-named data into said register, additional switching means operable in response to said sensing means sensing data pertaining to the time the use of said certain facility commenced to enter said last-named data into said computer and to enter the data currently stored in said register into said computer, said computer including means for subtracting the time the use of said certain facility was initiated from the time the use of said certain facility was terminated to obtain the duration of the use of said certain facility, further means in said computer for subtracting a previously fixed amount of time from the length of time said certain facility was used to obtain a chargeable time for which the customer that utilized said certain facility is to be billed, means under control of said computer for entering said chargeable time into said register.

15. In a record controlled accounting system adapted to record on one of a plurality of output media the computed chargeable time of customer uses of facilities in response to the sensing of an input record containing data pertaining to (1) the time each use of said facilities commenced, (2) the time each use of said facilities terminated, and (3) the identification of the customer for each use, said system including a computer and a register, means for sensing data on an input record, switching means operable in response to said sensing means sensing data pertaining to the time the use of a certain facility was terminated to enter said last-named data into said register, additional switching means operable in response to said sensing means sensing data pertaining to the time the use of said certain facility commenced to enter said last-named data into said computer and to enter the data currently stored in said register into said computer, said computer including means for subtracting the time the use of said certain facility was initiated from the time the use of said certain facility was terminated to obtain the duration of the use of said certain facility, further means in said computer for subtracting a previously fixed amount of time from the length of time said certain facility was used to obtain a chargeable time for which the customer that utilized said certain facility is to be billed, means operable under the control of said computer for entering said chargeable time into said register, additional means operable in response to said sensing means sensing data pertaining to the identification of said customer to record both said last-named data and the chargeable time data entered in said register onto a selected one of said output media under control of said data pertaining to the identification of said customer.

16. In a record controlled accounting system adapted to record on an output medium the computer chargeable time of customer uses of facilities in response to the sensing of an input record containing data pertaining to (1) the time each use of said facilities commenced, (2) the time each use of said facilities terminated, and (3) the identification of the customer for each use, said system including a computer and a register, means for sensing data on an input record, switching means operable in response to said sensing means sensing data pertaining to the time the use of a certain facility was terminated to enter said last-named data into said register, additional switching means operable in response to said sensing means sensing data pertaining to the use of said certain facility commenced to enter said last-named data into said computer and to enter the data currently stored in said register into said computer, said computer including means for subtracting the time the use of said certain facility commenced from the time the use of said certain facility was terminated, to obtain the duration of the use of said certain facility, further means in said computer for subtracting a previously fixed amount of time from the length of time said certain facility was used to obtain the chargeable time for which the customer that utilized said certain facility is to be billed, means operable under control of said computer for entering said chargeable time into said register, and additional means including switching means operable in response to said sensing means sensing data pertaining to the identification of said customer to record on an output medium both said last-named data and the chargeable time data entered in said register.

17. In a machine adapted to record on an output medium the computed chargeable time of telephone calls in response to receipt of data pertaining to (1) the answer time for each call, (2) the disconnect time for each call, (3) the number of the trunk that served each call, and (4) the digits of the calling line number for each call, said machine including a computer and a plurality of registers, each of said registers being individually associated with a different trunk, switching means operable in response to the receipt of data pertaining to the disconnect time for a particular call and to the number of the trunk that served said particular call to enter said disconnect time data into said register associated with the trunk that served said particular call, additional switching means operable in response to the receipt of data pertaining to the answer time for said particular call and to the number of the trunk that served said particular call to enter said answer time data into said computer and to enter the disconnect time data from said last-named register into said computer, means operable under control of said computer for computing the chargeable time for said particular call and for entering said chargeable time into said last-named register, additional means including switching means operable in response to the receipt of data pertaining to the digits of the calling line number and to the number of the trunk that served said particular call to record on an output medium both the chargeable time data now in said last-named register and the digits comprising the calling line number.

18. In a machine adapted to record on one of a plurality of output media the computed chargeable time of telephone calls in response to the receipt of data pertaining to (1) the answer time for each call, (2) the disconnect time for each call, (3) the number of the trunk that served each call, and (4) the digits of the calling line number for each call, said machine including a computer and a plurality of registers, each of said registers being individually associated with a different trunk, switching means operable in response to the receipt of data pertaining to the disconnect time for a particular call and to the number of the trunk that served said particular call to enter the data pertaining to the disconnect time into the register associated with the trunk that served said particular call, additional switching means operable in response to the receipt of data pertaining to the answer time of said particular call and to the number of the trunk that served said particular call to enter the data pertaining to the answer time into said computer and to enter the disconnect time data currently stored in said last-named register into said computer, means operable under control of said computer for computing the chargeable time for said call and for entering said chargeable time into said last-named register, and additional means operable in response to the receipt of data pertaining to the digits of the calling line number and pertaining to the number of the trunk that served said particular call to select one of a plurality of output media in accordance with the value of a digit in said calling line number, and means responsive to the operation of said media selecting means to record on said selected medium both the chargeable time data entered in said last-named record and the digits comprising the calling line number.

19. In a machine adapted to record on an output medium the computed chargeable time of telephone calls in response to the receipt of data pertaining to (1) the answer time for each call, (2) the disconnect time for each call, (3) the number of the trunk that served each call, and (4) the digits of the calling line number for each call, said machine including a computer and a plurality of registers, each of said registers being individually associated with a different trunk, switching means operable in response to the receipt of data pertaining to the disconnect time for a particular call and to the number of the trunk that served said particular call to enter the data pertaining to the disconnect time into the register associated with the trunk that served said particular call, additional switching means operable in response to the receipt of data pertaining to the answer time for said particular call and to the number of the trunk that served said particular call to enter the data pertaining to the answer time into said computer and to enter the disconnect time data currently stored in said last-named register into said computer, said computer including means for subtracting the answer time from the disconnect time to obtain the duration of said particular call, further means in said computer for subtracting a predetermined amount of time from the time duration of said call to obtain a chargeable time for said call, means operable under control of said computer for entering said chargeable time into said last-named register, additional means operable in response to the receipt of data pertaining to the digits of the calling line and to the number of the trunk that served said particular call to record on an output medium both the chargeable time data now in said last-named register and the digits of the calling line number.

20. In a machine adapted to record on one of a plurality of output media the computed chargeable time of telephone calls in response to the receipt of data pertaining to (1) the answer time for each call, (2) the disconnect time for each call, (3) the number of the trunk that served each call, and (4) the digits of the calling line number for each call, said machine including a computer and a plurality of registers, each of said registers being individually associated with a different trunk, switching means operable in response to the receipt of data pertaining to the disconnect time for a particular call and to the number of the trunk that served said particular call to enter the data pertaining to the disconnect time into the register associated with the trunk that served said particular call, additional switching means operable in response to the receipt of data pertaining to the answer time for said particular call and to the number of the trunk that served said particular call to enter the data pertaining to the answer time into said computer and to enter the disconnect time data currently stored in said last-named register into said computer, said computer including means for subtracting the answer time from the disconnect time to obtain the time duration of said particular call, further means in said computer for subtracting a predetermined amount of time from the time duration of said particular call to obtain the chargeable time for which the customer that made said particular call is to be billed, means operable under control of said computer for entering said chargeable time into said last-named register, and additional means operable in response to the receipt of data pertaining to the digits of the calling line number and pertaining to the number of the trunk that served said particular call to select one of a plurality of output media in accordance with the value of a digit in said calling line number, and means responsive to the operation of said media selecting means to record on said selected medium both the chargeable time data entered in said last-named record and the digits comprising the calling line number.

21. In a machine adapted to record on an output medium the chargeable time of telephone calls in response to the receipt of data pertaining to (1) the answer time of each call, (2) the disconnect time of each call, and (3) the digits of the calling number for each call, said machine including a computer and a register, switching means operable in response to the receipt of data pertaining to the disconnect time for a particular call to enter said disconnect time data into said register, additional switching means operable in response to the receipt of data pertaining to the answer time for said particular call to enter said answer time data into said computer and to enter the disconnect time data currently stored in said register into said computer, means operable under control of said computer for computing the chargeable time for said particular call and for entering said chargeable time into said register, and additional means operable in response to the receipt of data pertaining to the digits of the calling line number to record on an output medium both said last-named data and the chargeable time data entered in said register.

22. In a machine for computing the chargeable time of telephone calls in response to the receipt of information pertaining to (1) the answer time for each call, and (2) the disconnect time for each call, said machine including a computer and a register, switching means operable in response to the receipt of information pertaining to the disconnect time for a particular call to enter said disconnect time information into said register, additional switching means operable in response to the receipt of information pertaining to the answer time for said particular call to enter said answer time information into said computer and to enter the disconnect time information currently stored in said register into said computer, means operable under control of said computer for computing the chargeable time for said particular call and for entering said chargeable time into said register.

23. In a machine adapted to record on one of a plurality of output media the computed chargeable time of telephone calls in response to the receipt of information pertaining to (1) the answer time for each call, (2) the disconnect time for each call, and (3) the digits of the calling line number for each call, said machine including a computer and a register, switching means operable in response to the receipt of information pertaining to the disconnect time of a particular call to enter said disconnect time information into said register, additional switching means operable in response to the receipt of information pertaining to the answer time for said particular call to enter said answer time information into said computer and to enter the disconnect time information currently stored in said register into said computer, means operable under control of said computer for computing the chargeable time for said call and for entering said chargeable time into said register, and additional means operable in response to the receipt of data pertaining to the digits of the calling line number and pertaining to the number of the trunk that served said particular call to select one of a plurality of output media in accordance with the value of a digit in said calling line number, and means responsive to the operation of said media selecting means to record on said selected medium both the chargeable time data entered in said last-named record and the digits comprising the calling line number.

24. In a machine for computing the chargeable time for telephone calls in response to the receipt of information pertaining to (1) the answer time for each call, (2) the disconnect time for each call, said machine including a computer and a register, switching means operable in response to the receipt of information pertaining to the disconnect time for a particular call to enter said disconnect time information into said register, additional switching means operable in response to the receipt of information pertaining to the answer time for said particular call to enter said answer time information into said computer and to enter the disconnect time information currently stored in said register into said computer, said computer including means for subtracting the answer time from the disconnect time to obtain the time duration for said particular call, further means in said computer for subtracting a predetermined amount of time from the time duration of said particular call to obtain a chargeable time for said call, and means under control of said computer for entering said chargeable time into said register.

25. In a machine adapted to record on one of a plurality of output media the computed chargeable time of telephone calls in response to the receipt of information pertaining to (1) the answer time for each call, (2) the disconnect time for each call, and (3) the digits of the calling line number for each call, said machine including a computer and a register, switching means operable in response to the receipt of information pertaining to the disconnect time of a particular call to enter said disconnect time information into said register, additional switching means operable in response to the receipt of information pertaining to the answer time for said particular call to enter said answer time information into said computer and to enter the disconnect time information currently stored in said register into said computer, said computer including means for subtracting the answer time data from the disconnect time data to obtain the time duration of said particular call, further means in said computer for subtracting a predetermined amount of time from the time duration for said particular call to obtain a chargeable time for said call, means operable under control of said computer for entering said chargeable time into said register, additional means operable in response to the receipt of information pertaining to the digits of the calling line number to record both said last-named data and the chargeable time information entered in said register onto a selected one of said output media under the control of a digit in said calling line number.

26. In a machine adapted to record on an output medium the chargeable time of telephone calls in response to the receipt of data pertaining to (1) the answer time of each call, (2) the disconnect time of each call, and (3) the digits of the calling line number for each call, said machine including a computer and a register, switching means operable in response to the receipt of data pertaining to the disconnect time for a particular call to enter said disconnect time data into said register, additional switching means operable in response to the receipt of data pertaining to the answer time for said particular call to enter said answer time data into said computer and to enter the disconnect time data currently stored in said register into said computer, said computer including means for subtracting the answer time data from the disconnect time data to obtain the time duration of said particular call, further means in said computer for subtracting a predetermined amount of time from the time duration of said particular call to obtain a chargeable time for said call, means operable under control of said computer for entering said chargeable time in said register, and additional means operable in response to the receipt of data pertaining to the digits of the calling line number to record on an output medium both said last-named data and the chargeable time data entered in said register.

27. In a machine adapted to record on an output medium the computed chargeable time of telephone calls in response to the receipt of data pertaining to (1) the answer time for each call, (2) the disconnect time for each call, (3) the number of the trunk that served each call, and (4) the digits of the calling line number for each call, said machine including a computer and a plurality of registers each of which has a plurality of operating leads and each of which is individually associated with a different trunk, switching means operable in response to the receipt of data pertaining to the disconnect time for a particular call and to the number of the trunk that served said particular call to enter said disconnect time data into said register associated with the trunk that served said particular call by applying a potential of a certain polarity to a first combination of said operating leads, said first combination of operating leads being determined by the magnitude of the data pertaining to the disconnect time, additional switching means operable in response to the receipt of data pertaining to the answer time of said particular call and to the number of the trunk that served said particular call to enter said answer time data into said computer and to enter the disconnect time data from said last-named register into said computer by applying a potential of said certain polarity to said first combination of operating leads, means operable under control of said computer for computing the chargeable time for said call and for entering said chargeable time into said last-named register by applying a potential of said certain polarity to a second combination of said plurality of operating leads, said second combination of operating leads being determined by the magnitude of said chargeable time data, additional means operable upon the receipt of data pertaining to the digits of the calling line number and pertaining to the number of the trunk which served said particular call to record on an output medium both the chargeable time data entered in said last-named register and the data pertaining to the digits of the calling line number.

28. In a machine adapted to record on an output medium the computed chargeable time of telephone calls upon the receipt of data pertaining to (1) the answer time for each call, (2) the disconnect time for each call, (3) the number of the trunk that served each call, and (4) the digits of the calling line number for each call, said machine including a computer and a plurality of registers with each register being individually associated with a different trunk, a plurality of storage means in each register, a plurality of operating leads in each register with each lead being connected to a different storage means, switching means operable in response to the receipt of data pertaining to the disconnect time for a particular call and pertaining to the number of the trunk that served said particular call to enter said disconnect time data into the register associated with the trunk that served said particular call by applying a potential of a certain polarity to a first combination of the operating leads in said last-named register to operate the storage means associated with said first combination of said operating leads, said first combination being determined by the magnitude of the data pertaining to the disconnect time, additional switching means operable in response to the receipt of data pertaining to the answer time for said particular call and pertaining to the number of the trunk that served said particular call to enter said answer time data into said computer and to interconnect said last-named register and said computer whereby said register applies a potential of said certain polarity to said first combination of said operating leads to transfer the disconnect time data from said register into said computer and to release the operated storage means in said last-named register, means under control of said computer for computing the chargeable time for said particular call and for entering said chargeable time into said last-named register by applying a potential of said certain polarity to a second combination of said plurality of operating leads to operate the storage means associated with each of said second combination of operating leads, said second combination of operating leads being determined by the magnitude of said chargeable time data, additional means operable in response to the receipt of data pertaining to the digits of the calling line number and pertaining to the number of the trunk which served said particular call to record on an output medium the chargeable time data entered in said last-named register.

29. In a record controlled accounting system including a computer adapted to record on an output medium the computed chargeable time of customer uses of facilities in response to the sensing of an input record containing data pertaining to (1) the time each use of said facilities commenced, (2) the time each use of said facilities terminated, (3) the identification of the particular facility utilized during each use, and (4) the identification of the customer for each use, said system including a plurality of registers each of which is individually associated with a different facility, a plurality of orders in said computer, a first computer input circuit comprising five wires in each order by means of which data is supplied to each order on a two-out-of-five code basis, a plurality of relays in said computer, there being ten of said relays in each order with each relay representing one digit in the series of digits 0 through 9, interconnections between the ten relays in each order and the five input wires for each order whereby the transmission of digital information over two-out-of-five wires in each order operates the one relay in each order that represents the value of the digital information transmitted thereto over its related two-out-of-five wires, a second input circuit for said computer including ten wires for each order with each wire representing one digit in the series of digits 0 through 9, an output circuit for each order comprising ten wires whereby each wire represents one digit in the series of digits 0 through 9, means for sensing data on an input record, switching means operable in response to the sensing of data pertaining to the time the use of a certain facility was terminated and pertaining to the identification of said certain facility to enter the data pertaining to the time at which the use was terminated into the register associated with said certain facility, additional switching means operable in response to the sensing of data pertaining to the time the use of said certain facility commenced and pertaining to the identification of said certain facility to interconnect said register and said computer whereby said register transmits the data entered therein to the two-out-of-five wires in each order of said computer to operate one relay in each order therein as determined by the magnitude of the data applied to each order, further means operable in response to the operation of said additional switching means for applying the data pertaining to the time the use of said certain facility commenced to said second input circuit whereby a signal on the one wire in each order in the second input circuit is transmitted through the contacts of the operated relay in each order to a one wire in the output circuit for each of said orders whereby the wires in the output circuits that contain said signals represent the chargeable time for which the customer is to be billed for the use of said facility, means under control of said output circuit for entering the chargeable time into said last-named register, additional means including switching means operable when said sensing means senses data pertaining to the identification of the customer that utilized said certain facility and pertaining to the identification of said certain facility to record on an output medium both the chargeable time data entered in said last-named register and the data pertaining to the identification of said customers.

References Cited in the file of this patent

UNITED STATES PATENTS 2,701,095    Stibitz _____ Feb. 1, 1955